(12) United States Patent
Nakano et al.

(10) Patent No.: US 10,195,881 B2
(45) Date of Patent: Feb. 5, 2019

(54) RECORDING APPARATUS

(71) Applicant: SEIKO EPSON CORPORATION, Tokyo (JP)

(72) Inventors: Yosuke Nakano, Matsumoto (JP); Atsuhiko Takeuchi, Matsumoto (JP); Tomoko Shirai, Suwa (JP); Yoshiyuki Okazawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/905,403

(22) Filed: Feb. 26, 2018

(65) Prior Publication Data

US 2018/0244089 A1 Aug. 30, 2018

(30) Foreign Application Priority Data

Feb. 27, 2017 (JP) .................................. 2017-035196
Aug. 10, 2017 (JP) .................................. 2017-155674

(51) Int. Cl.
| | |
|---|---|
| B41J 29/38 | (2006.01) |
| B41J 2/045 | (2006.01) |
| B41J 2/165 | (2006.01) |
| B41J 13/03 | (2006.01) |
| B41J 23/02 | (2006.01) |
| F16H 1/22 | (2006.01) |

(52) U.S. Cl.
CPC ............. *B41J 29/38* (2013.01); *B41J 2/0451* (2013.01); *B41J 2/04551* (2013.01); *B41J 2/04586* (2013.01); *B41J 2/16511* (2013.01); *B41J 2/16544* (2013.01); *B41J 13/03* (2013.01); *B41J 23/025* (2013.01); *F16H 1/22* (2013.01); *B41J 2002/16514* (2013.01)

(58) Field of Classification Search
CPC .. B41J 2/0451; B41J 2/04551; B41J 2/04586; B41J 13/03; B41J 23/025; B41J 2/16511; B41J 2/16544; B41J 29/38; B41J 2/14202; B41J 2202/14491; B41J 2002/16514; F16H 1/22
See application file for complete search history.

(56) References Cited

U.S. PATENT DOCUMENTS

| | | | | |
|---|---|---|---|---|
| 5,090,827 | A | * | 2/1992 | Hirano .................... B41J 23/025 400/120.16 |
| 2009/0284565 | A1 | | 11/2009 | Shinagawa et al. |
| 2014/0318922 | A1 | | 10/2014 | Shinagawa et al. |
| 2018/0264825 | A1 | * | 9/2018 | Strom ...................... B41J 2/175 |

FOREIGN PATENT DOCUMENTS

| | | |
|---|---|---|
| JP | 2008-173940 A | 7/2008 |
| JP | 2009-274304 A | 11/2009 |

* cited by examiner

*Primary Examiner* — Thinh H Nguyen
(74) *Attorney, Agent, or Firm* — Workman Nydegger

(57) ABSTRACT

A recording apparatus includes a switching mechanism which switches a motive force transmission state from a motive force source, includes a sun gear which is driven by the motive force source, a planet gear which performs planetary motion around the sun gear, a rotational movement member which causes the planet gear to perform planetary motion by rotationally moving, and a regulating member which engages with a regulated portion which is provided in the rotational movement member to restrict the rotational movement of the rotational movement member.

10 Claims, 36 Drawing Sheets

FIG. 12
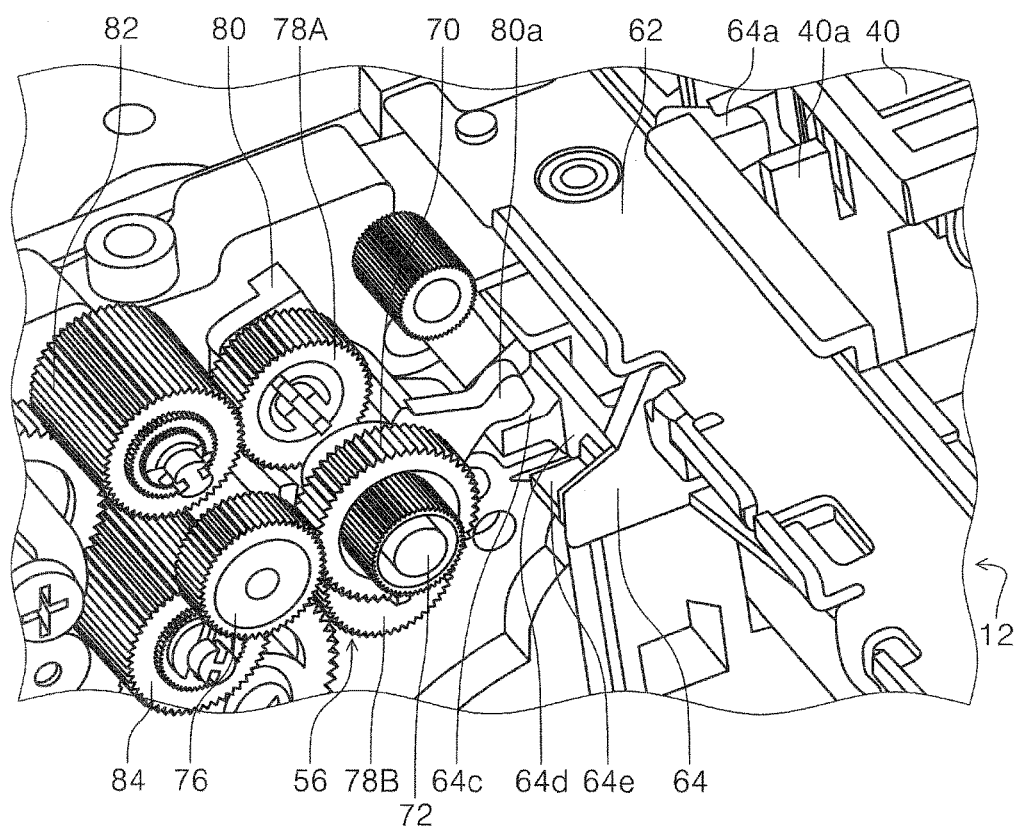
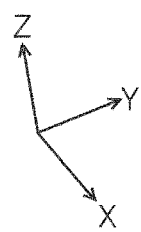

FIG. 15
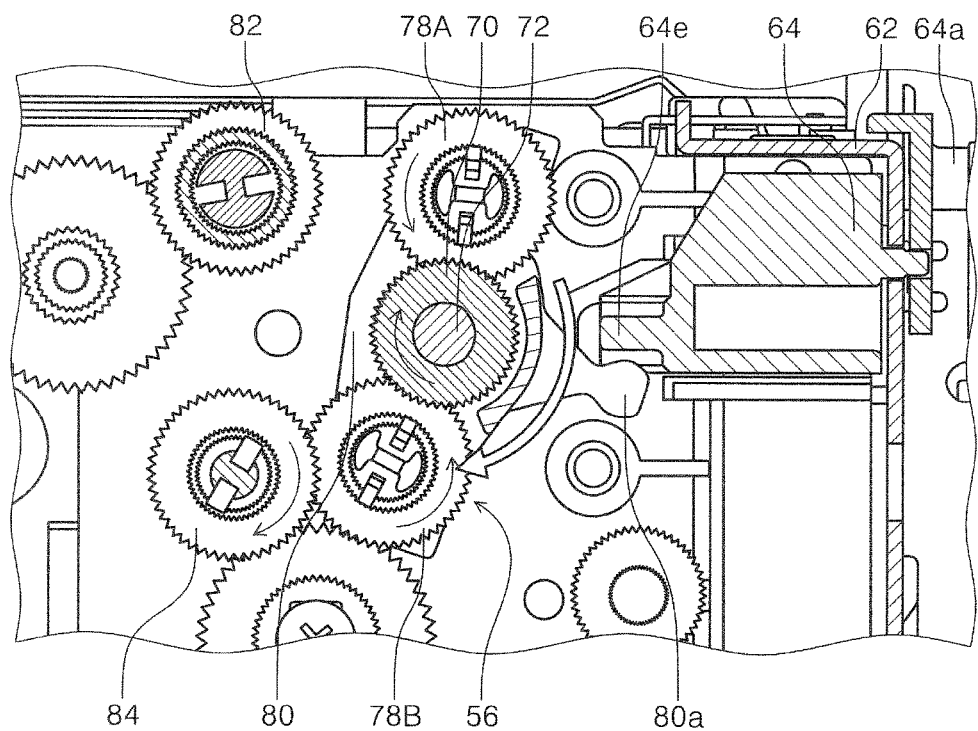
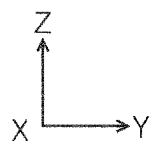

FIG. 30
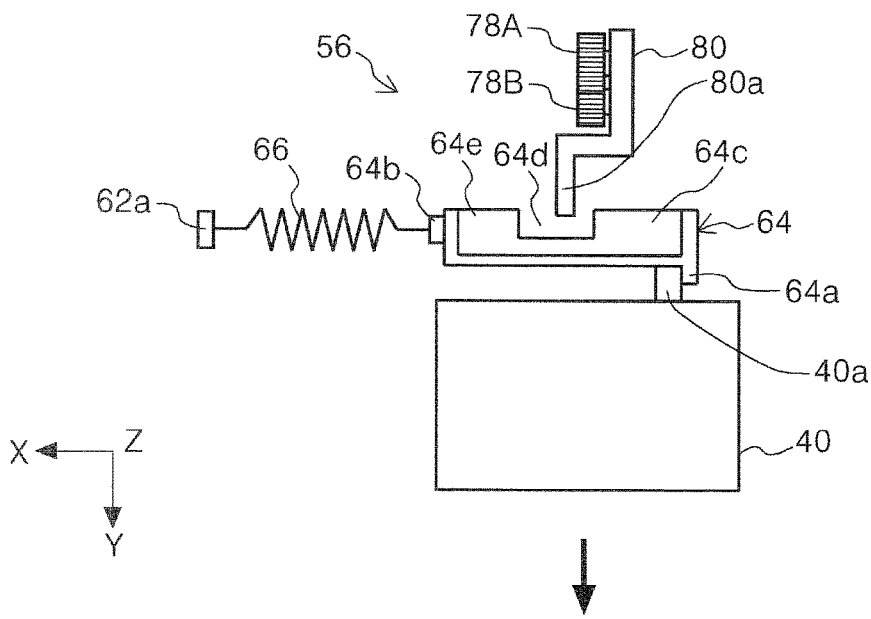
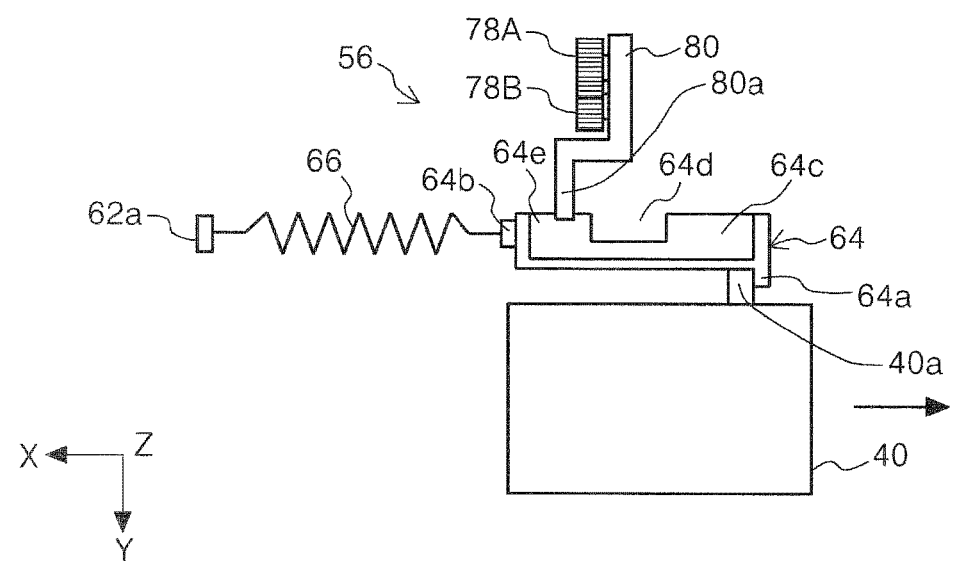

RECORDING APPARATUS

BACKGROUND

1. Technical Field

The present invention relates to a recording apparatus which performs recording on a medium.

2. Related Art

In a printer which is an example of the recording apparatus, in order to suppress an increase in the cost and an increase in the size of the apparatus, a configuration is adopted in which a plurality of driving targets are driven by a shared drive source (for example, a motor). In such a printer, a switching mechanism which switches a motive force transmission state according to which of a plurality of driving targets the drive from a drive source is to be transmitted (for example, refer to JP-A-2009-274304).

A motive force transmission switching device described in JP-A-2009-274304 is provided with a motive force transmission unit which is displaced between a first position and a second position and a coil spring which biases the motive force transmission unit toward the first position. The motive force transmission switching device is configured such that the motive force transmission unit moves to the second position due to a carriage pushing the motive force transmission unit. The first position is a position at which the drive force is transmitted from the drive source to the driving targets, and the second position is set as a position at which the motive force transmission from the drive source to the driving targets is cut off and the driving target is switched (selected).

Since the motive force transmission unit is biased by the coil spring to the first position which is a position at which the drive force is transmitted from the drive source to the driving targets, even when the carriage separates from the home position and is at a printing region side, the motive force transmission unit is capable of maintaining the first position, that is, a state in which the drive force is transmitted from the drive source to the driving targets is maintained.

Incidentally, the first position of the motive force transmission unit is a position at which the drive force is transmitted from the drive source to the driving targets, and since a pump device is included in the plurality of driving targets, when the carriage is positioned at the home position, the motive force transmission unit is positioned at the first position.

Therefore, it is necessary to move the carriage further to the outside from the home position in order to move the motive force transmission unit to the second position which is a position for switching the driving target, that is, the movement region of the carriage is expanded, leading to an increase in the size of the apparatus.

SUMMARY

An advantage of some aspects of the invention is to obtain a configuration capable of maintaining a transmission state of a drive force even if a carriage separates from a home position and is at a printing region side while suppressing an increase in the size of the apparatus.

According to an aspect of the invention, a recording apparatus includes a carriage which includes a recording head that performs recording on a medium and which moves in a first direction and a second direction that is an opposite direction from the first direction, a motive force source which is shared by a plurality of driving targets, and a switching mechanism which switches a motive force transmission state from the motive force source, in which the switching mechanism includes a sun gear which is driven by the motive force source, a planet gear which is driven by the sun gear, a rotational movement member which causes the planet gear to perform planetary motion, and a regulating member which engages with a regulated portion which is provided in the rotational movement member to regulate rotational movement of the rotational movement member and is capable of moving in the first direction and the second direction, in which the regulating member includes, in order from the first direction side toward the second direction side a first regulating portion which is capable of engaging with the regulated portion, an operation allowance portion which allows an operation of the regulated portion, and a second regulating portion which is capable of engaging with the regulated portion, in which the carriage is provided to be capable of engaging with the regulating member and displaces the regulating member according to movement of the carriage, in which the regulating member is positioned at a first position at which the second regulating portion is capable of engaging with the regulated portion when the carriage is positioned at an end portion of the first direction which is a standby position of the carriage, and, as the carriage moves from the end portion of the first direction to the second direction, is displaced in order of a second position at which the operation allowance portion is capable of receiving the regulated portion and a third position at which the first regulating portion is capable of engaging with the regulated portion, in which in a case in which the regulating member is at the third position, based on a rotation direction of the sun gear, for the motive force transmission state, a first motive force transmission state or a second motive force transmission state is assumed, and in which in a case in which the regulating member is at the first position, based on the rotation direction of the sun gear, for the motive force transmission state, a third motive force transmission state or a fourth motive force transmission state is assumed.

According to this configuration, the regulating member is configured such that when the carriage is positioned at the end portion of the first direction, the regulating member is positioned at the first position at which the second regulating portion is capable of engaging with the regulated portion, and as the carriage moves from the end portion of the first direction to the second direction, the regulating member is displaced in order of the second position at which the operation allowance portion is capable of receiving the regulated portion (that is, a position at which it is possible to switch the motive force transmission state) and the third position at which the first regulating portion is capable of engaging with the regulated portion. In other words, since the second position of the regulating member at which it is possible to switch the motive force transmission state can be assumed when the carriage moves from the end portion of the first direction to the second direction side, it is not necessary for the carriage to move further to the outside than the end portion of the first direction when switching the motive force transmission state and it is possible to suppress the enlargement of the movement region of the carriage.

The recording apparatus may further include a biasing unit which biases the regulating member in the second direction.

According to this configuration, since the biasing unit which biases the regulating member in the second direction is provided, the regulating member is capable of reliably maintaining the first position even in a state in which the engagement between the regulating member and the carriage is released, in other words, even in a state in which the carriage moves from the end portion of the first direction to the second direction side. In other words, it is possible to reliably maintain the motive force transmission state.

The recording apparatus may further include a first planet gear and a second planet gear as the planet gears, and a first meshed gear which meshes with the first planet gear to obtain motive force and a second meshed gear which meshes with the second planet gear to obtain motive force, in which switching between a first meshing state in which the first planet gear meshes with the first meshed gear and a second meshing state in which the second planet gear meshes with the second meshed gear due to rotational movement of the rotational movement member is possible, in which the first motive force transmission state is assumed in a case in which the sun gear rotates forward in the first meshing state and the second motive force transmission state is assumed in a case in which the sun gear rotates in reverse in the first meshing state, and in which the third motive force transmission state is assumed in a case in which the sun gear rotates forward in the second meshing state and the fourth motive force transmission state is assumed in a case in which the sun gear rotates in reverse in the second meshing state.

According to this configuration, since it is possible to switch between the first, second, third, and fourth motive force transmission states, it is possible to form various motive force transmission states using the single motive force source.

In the recording apparatus, the rotation direction of the sun gear in the first motive force transmission state and the fourth motive force transmission state may be a rotation direction in which the regulated portion comes into contact with the first regulating portion or the second regulating portion, and a controller which controls the motive force source may switch the rotation direction of the motive force source to a reverse direction in a case in which the regulating member is displaced in a direction in which the operation allowance portion passes through a position of the regulated portion in at least one of the first motive force transmission state and the fourth motive force transmission state.

In the first motive force transmission state and the fourth motive force transmission state, since the regulated portion pushes against the first regulating portion or the second regulating portion, when the regulating member is displaced in this state, there is a concern that the regulated portion will enter the operation allowance portion and assume a locked state in this state or that the regulated portion will leave the operation allowance portion and be unintentionally switched to another motive force transmission state.

Hereinafter, a force which is generated between the regulated portion and the first regulating portion or the second regulating portion when the regulated portion pushes against the first regulating portion or the second regulating portion will be referred to as "surface pressure".

According to this configuration, since the controller which controls the motive force source switches the rotation direction of the motive force source to the reverse direction in a case in which the regulating member is displaced in a direction in which the operation allowance portion passes through the position of the regulated portion in at least one of the first motive force transmission state and the fourth motive force transmission state, it is possible to reduce or lose the surface pressure, and as a result, it is possible to anticipate the avoidance of the problem which is described above.

In the recording apparatus, the plurality of driving targets may include an intermediate roller which is provided on an upstream side of a transport roller which transports the medium to a recording position of the recording head and transports the medium toward the transport roller, the intermediate roller may be driven in a rotation direction which transports the medium to a downstream side in at least the first motive force transmission state, and the controller may be capable of performing bending control in which bending is formed in the medium between the intermediate roller and the transport roller and in at least the first motive force transmission state, may increase a reverse rotation driving amount, which is a driving amount when the motive force source is caused to rotate in the reverse direction, as the degree of bending becomes greater.

When bending is formed in the medium between the intermediate roller and the transport roller, the torque increases and the surface pressure increases when driving the intermediate roller and the reverse rotation driving amount which is necessary for causing the surface pressure to be lost also increases.

Therefore, according to this configuration, since the reverse rotation driving amount is increased the greater the degree of the bending, the controller is capable of appropriately causing the surface pressure to be lost.

In the recording apparatus, the controller may increase the reverse rotation driving amount after recording onto the medium is completed to an amount greater than the reverse rotation driving amount during performance of the recording onto the medium.

According to this configuration, since the controller increases the reverse rotation driving amount after recording onto the medium is completed to an amount greater than the reverse rotation driving amount during performance of the recording onto the medium, it is possible to more reliably cause the surface pressure to be lost. In addition, since the reverse rotation driving amount is increased after the recording onto the medium is completed is increased, the recording quality is not adversely influenced.

The recording apparatus may further include a carriage drive motor which is a drive source of the carriage, in which the controller may monitor a drive load of the carriage drive motor in a case in which the regulating member is displaced in a direction in which the operation allowance portion passes through a position of the regulated portion by driving the carriage drive motor in a first rotation direction to move the carriage, and in a case in which the drive load exceeds a predetermined threshold, a retry operation may be performed once the carriage drive motor is driven by a predetermined amount in a second rotation direction which is the reverse of the first rotation direction.

When the regulating member is displaced by moving the carriage, there is a concern that when the regulated portion enters the operation allowance portion, the carriage will be unable to move any further, enter a locked state, and it may become impossible to perform further recording operations.

According to this configuration, the controller monitors the drive load of the carriage drive motor, and since the controller performs the retry operation in a case in which the drive load exceeds a predetermined threshold, a return to the ordinary state, that is, relief from the state in which the regulated portion enters the operation allowance portion and is locked can be anticipated.

The retry operation entirely means the driving of the drive source for causing the regulated portion to leave the operation allowance portion.

In the recording apparatus, the retry operation which is performed when in the first motive force transmission state may include an operation of causing the motive force source to rotate in reverse after the drive source is driven in a direction in which the motive force transmission state is switched to the third motive force transmission state.

When the drive source is caused to rotate in reverse from the state in which the regulated portion enters the operation allowance portion, there is a concern that the first motive force transmission state will be exceeded and the motive force transmission state will be switched to the second motive force transmission state. Such a situation is not preferable in a configuration in which the transporting of the medium is adversely influenced when the motive force transmission state is switched from the first motive force transmission state to the second motive force transmission state during the recording. In a configuration in which the third motive force transmission state does not influence the transporting of the medium, it is preferable to use the lack of influence of the third motive force transmission state on the transporting of the medium.

Therefore, in a case in which the control unit performs the retry operation and instead of causing the drive source to rotate in reverse right away, switches to the third motive force transmission state once and then causes the drive source to rotate in reverse. Once the motive force transmission state is switched to the third motive force transmission state once, it is possible to set the appropriate reverse rotation driving amount for causing the regulated portion to leave the operation allowance portion in an ordinary manner without switching to the second motive force transmission state. As a result, it is possible to appropriately perform the retry operation.

The recording apparatus may further include a frame which supports the motive force source, in which the frame may be provided to be capable of rotating centered on a shaft which supports the sun gear such that the sun gear is capable of rotating and is fixed due to the rotation which is centered on the shaft being stopped by a fixing unit.

According to this configuration, the recording apparatus further includes a frame which supports the motive force source and the frame is provided to be capable of rotating centered on a shaft which supports the sun gear such that the sun gear is capable of rotating and is fixed due to the rotation which is centered on the shaft being stopped by a fixing unit, and thus, the positional relationship between the motive force source and the sun gear is stabilized. Therefore, in a configuration in which the drive gear is provided in the motive force source and the drive gear is caused to mesh with the sun gear, the positional relationship between the drive gear and the sun gear is stabilized and so it is possible to obtain operational effects such as the capability to suppress unwanted sound during the rotation.

In the recording apparatus, the motive force source may be positioned on a rear side with respect to the recording head in the apparatus depth direction, may be positioned closer to a top side than the head surface of the recording head in the apparatus height direction, and may be positioned inside a passage region on a medium of a maximum size in the apparatus width direction.

BRIEF DESCRIPTION OF THE DRAWINGS

The invention will be described with reference to the accompanying drawings, wherein like numbers reference like elements.

FIG. 12 is a perspective view illustrating a state in which the regulated portion of the rotational movement member is engaged with the first regulating portion.

FIG. 15 is a view illustrating a third motive force transmission state in a switching mechanism.

FIG. 30 is a schematic diagram explaining the retry operation.

DESCRIPTION OF EXEMPLARY EMBODIMENTS

Figure 1:
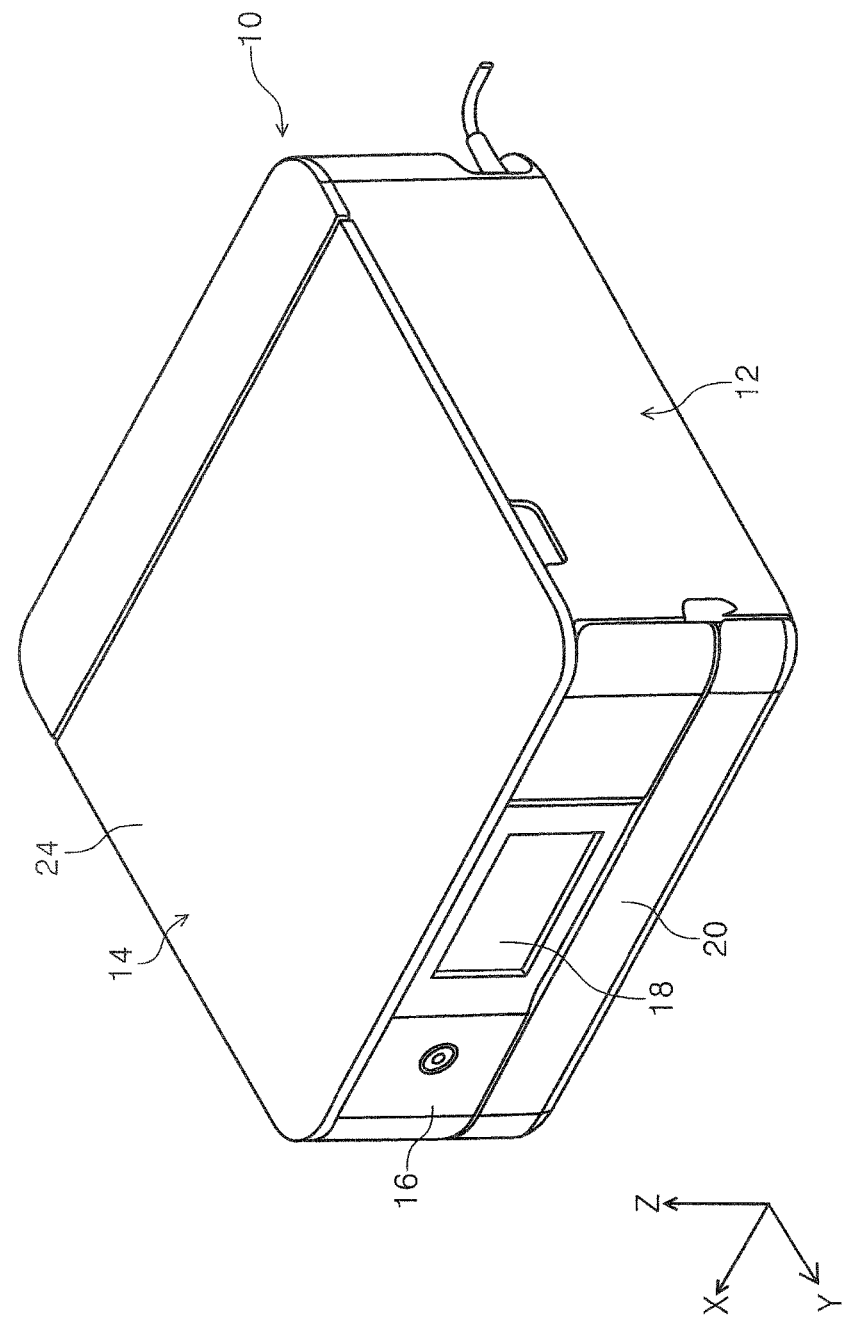
FIG. 1 is an external perspective view of a printer according to the present example.

Hereinafter, a description will be given of an embodiment of the invention based on the drawings. Regarding configurations which are the same in the examples, the same reference numerals will be given, a description will be given only in the first example, and the description of the configurations will be omitted in the following examples.

Figure 2:
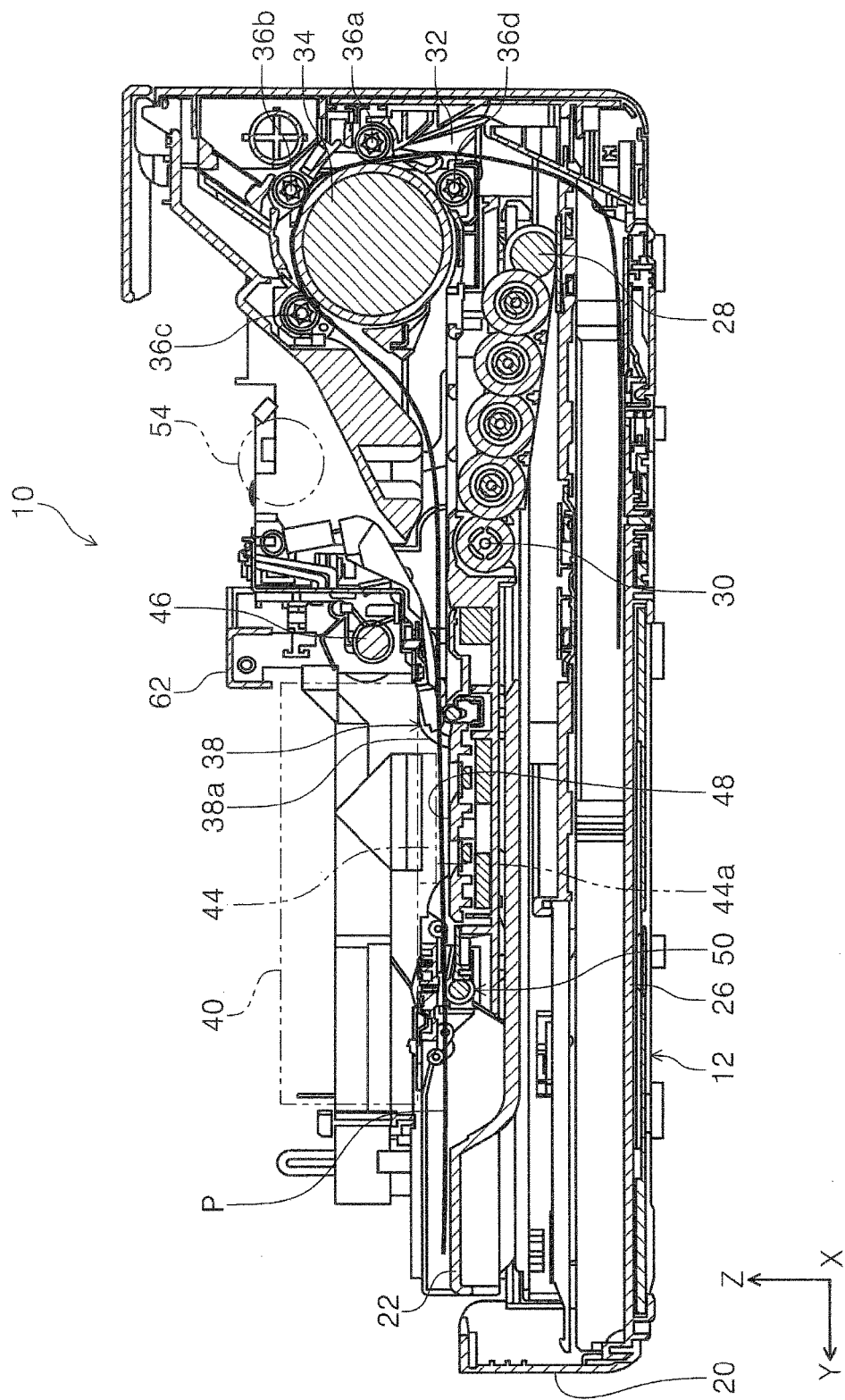
FIG. 2 is a lateral sectional diagram illustrating a medium transport path of the printer according to the present example.
Figure 3:
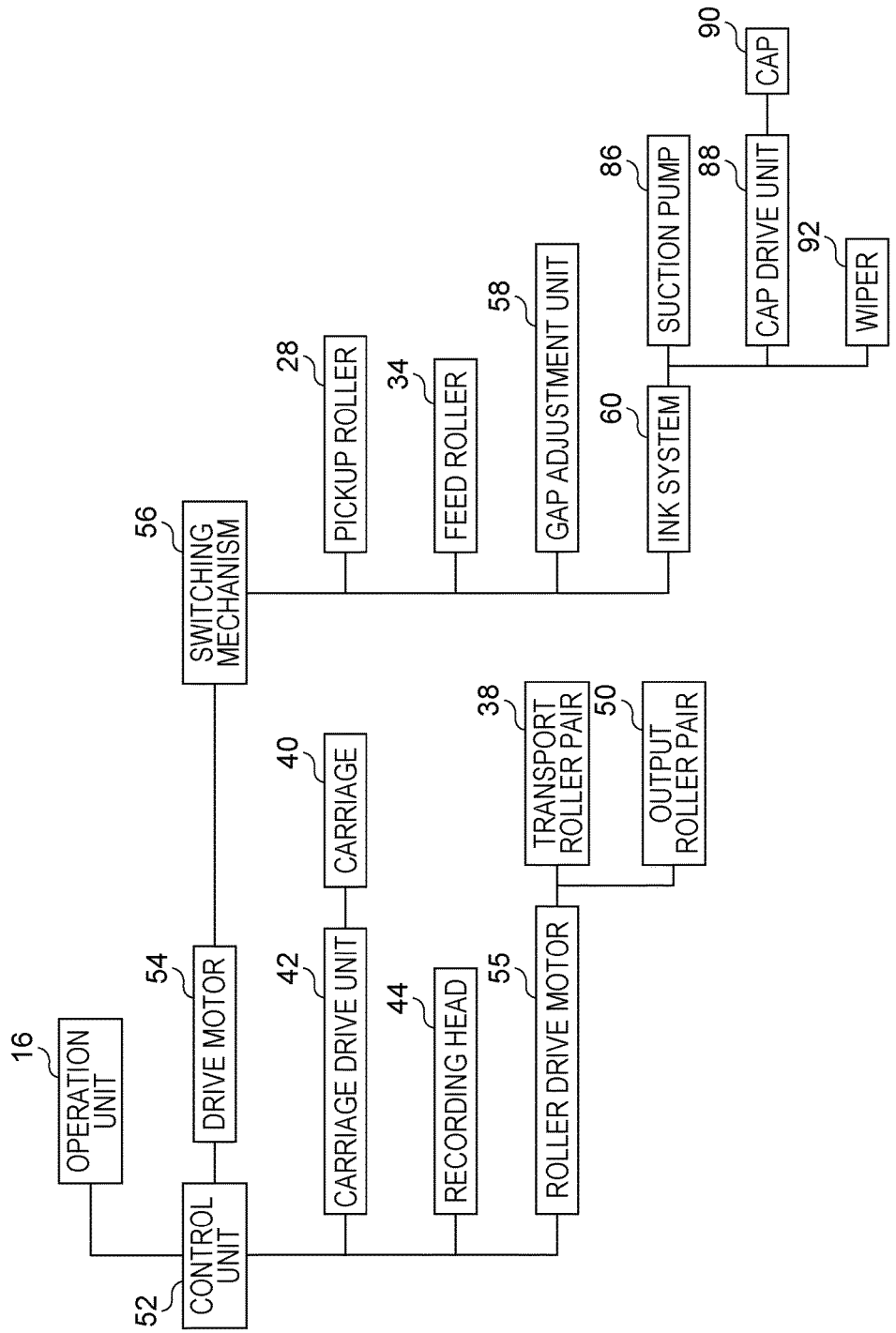
FIG. 3 is a block diagram illustrating a configuration of the printer according to the present example.
Figure 4:
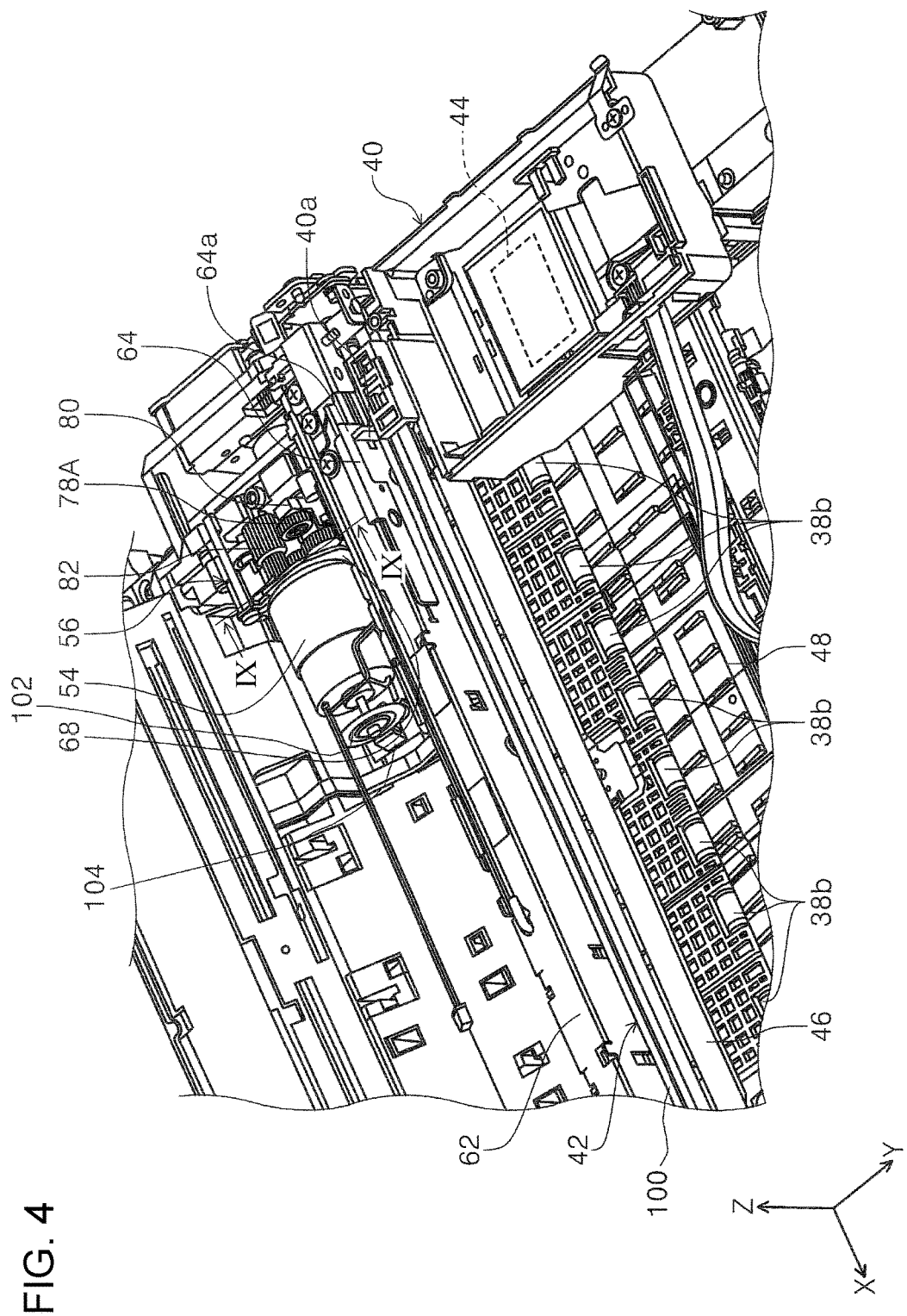
FIG. 4 is a perspective view illustrating the relationship between a carriage, a regulating member, a switching mechanism, and a drive motor.
Figure 5:
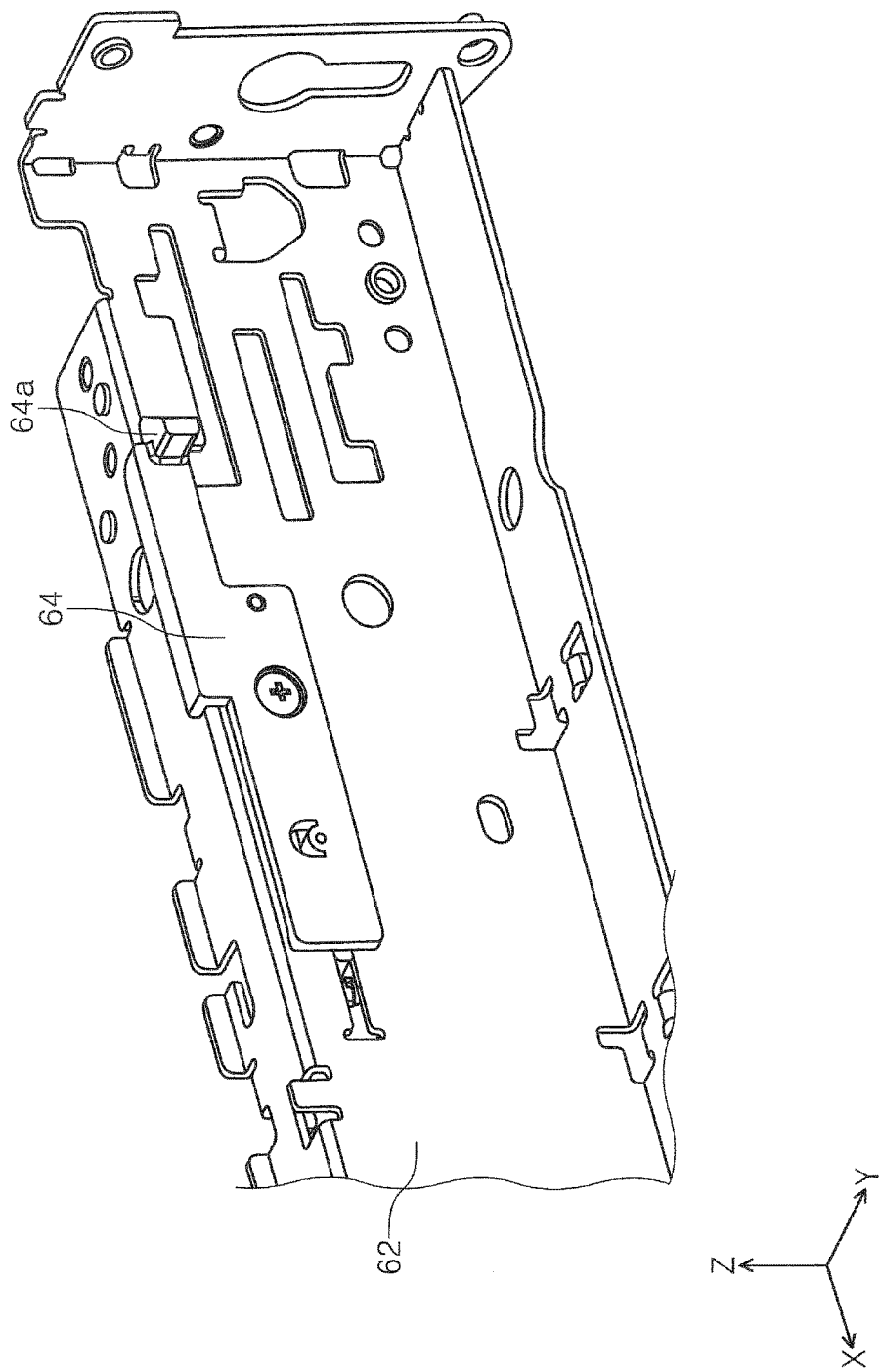
FIG. 5 is a perspective view illustrating the regulating member.
Figure 6:
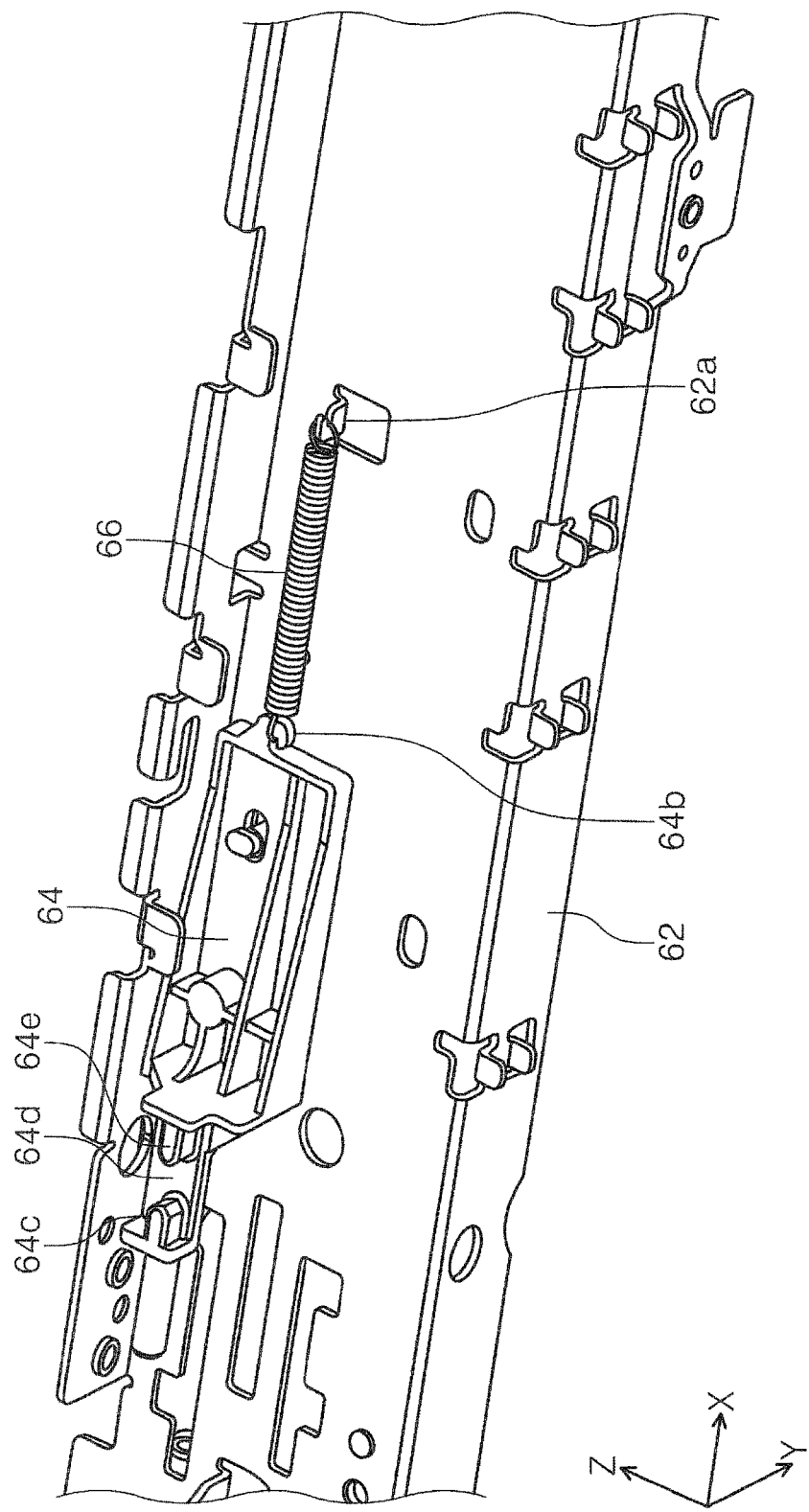
FIG. 6 is a perspective view illustrating the regulating member.
Figure 7:
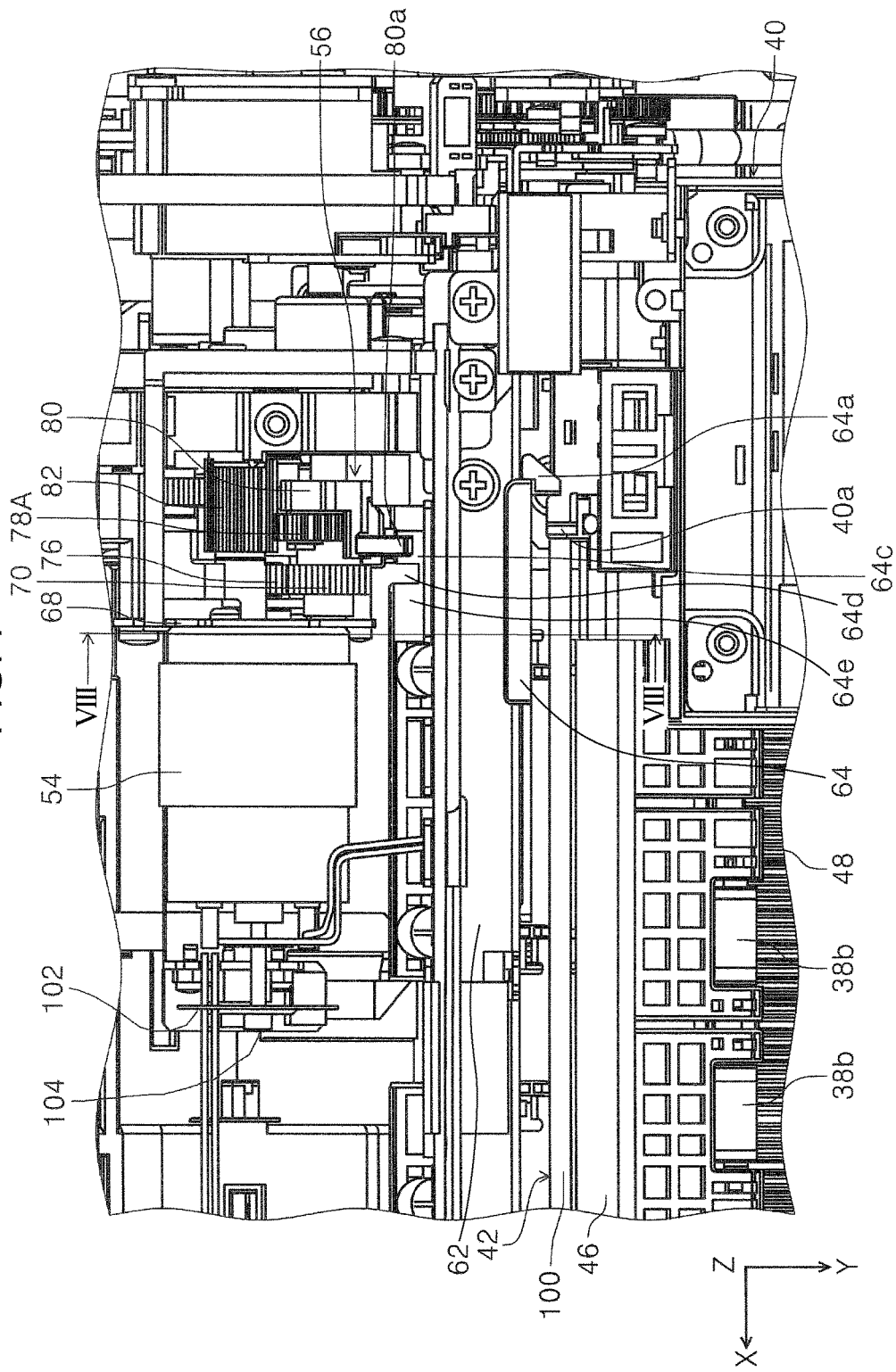
FIG. 7 is a plan view of a state in which a regulated portion of a rotational movement member is engaged with a first regulating portion of the regulating member.

FIG. 1 is an external perspective view of a printer according to the present example, FIG. 2 is a lateral sectional diagram illustrating a medium transport path of the printer according to the present example, FIG. 3 is a block diagram illustrating a configuration of the printer according to the present example, FIG. 4 is a perspective view illustrating the relationship between a carriage, a regulating member, a switching mechanism, and a drive motor, FIG. 5 is a perspective view illustrating the regulating member, FIG. 6 is a perspective view illustrating the regulating member, and FIG. 7 is a plan view of a state in which a regulated portion of a rotational movement member is engaged with a first regulating portion of the regulating member.

Figure 8:
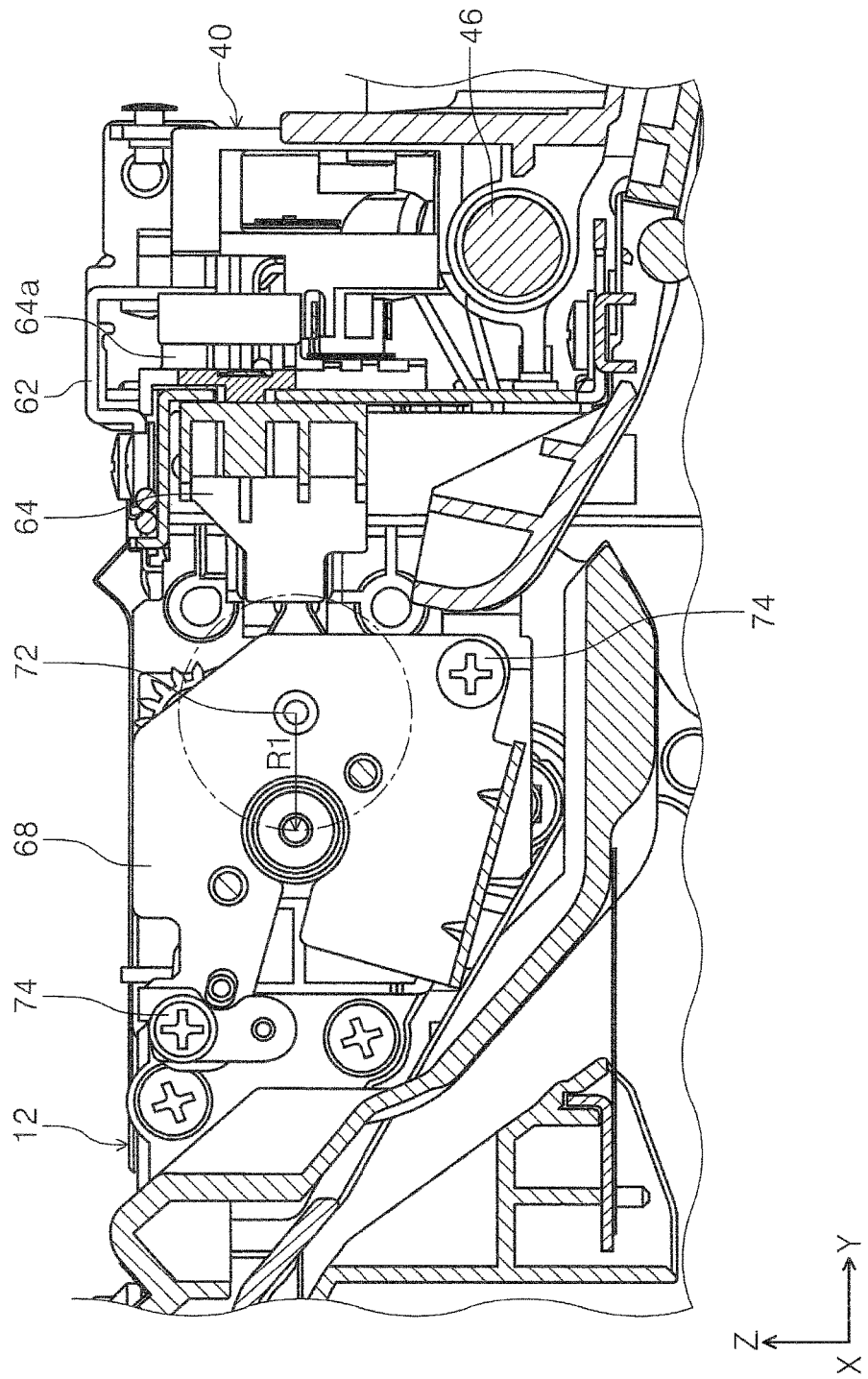
FIG. 8 is a sectional diagram taken along a VIII-VIII sectional line in FIG. 7.
Figure 9:
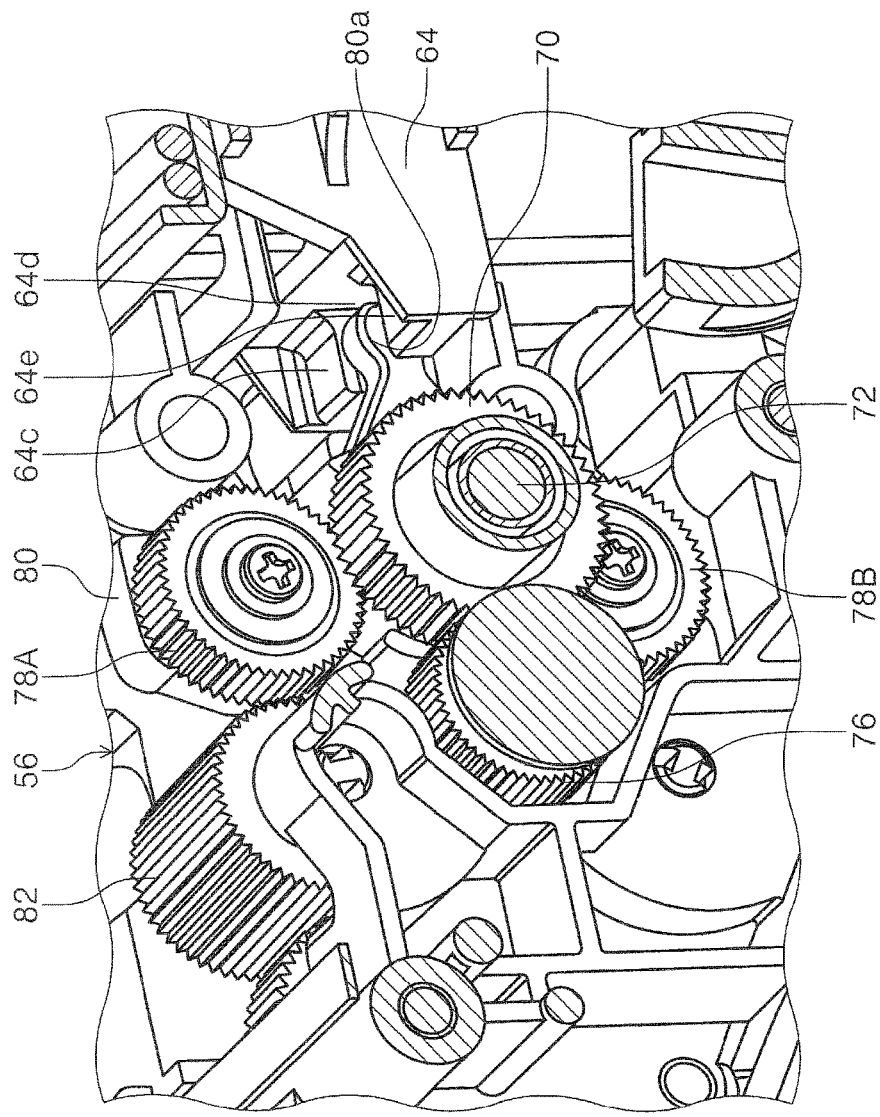
FIG. 9 is a sectional perspective diagram taken along an IX-IX sectional line in FIG. 4.
Figure 10:
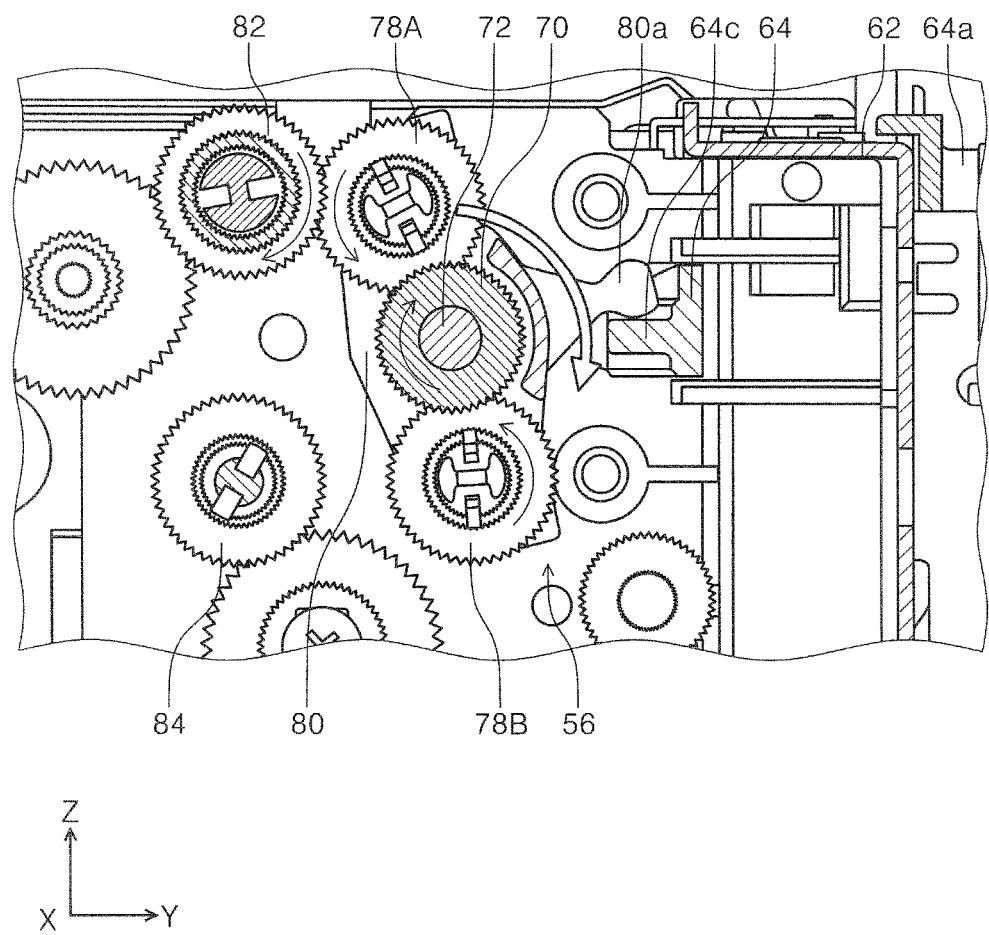
FIG. 10 is a view illustrating a first motive force transmission state in a switching mechanism.
Figure 11:
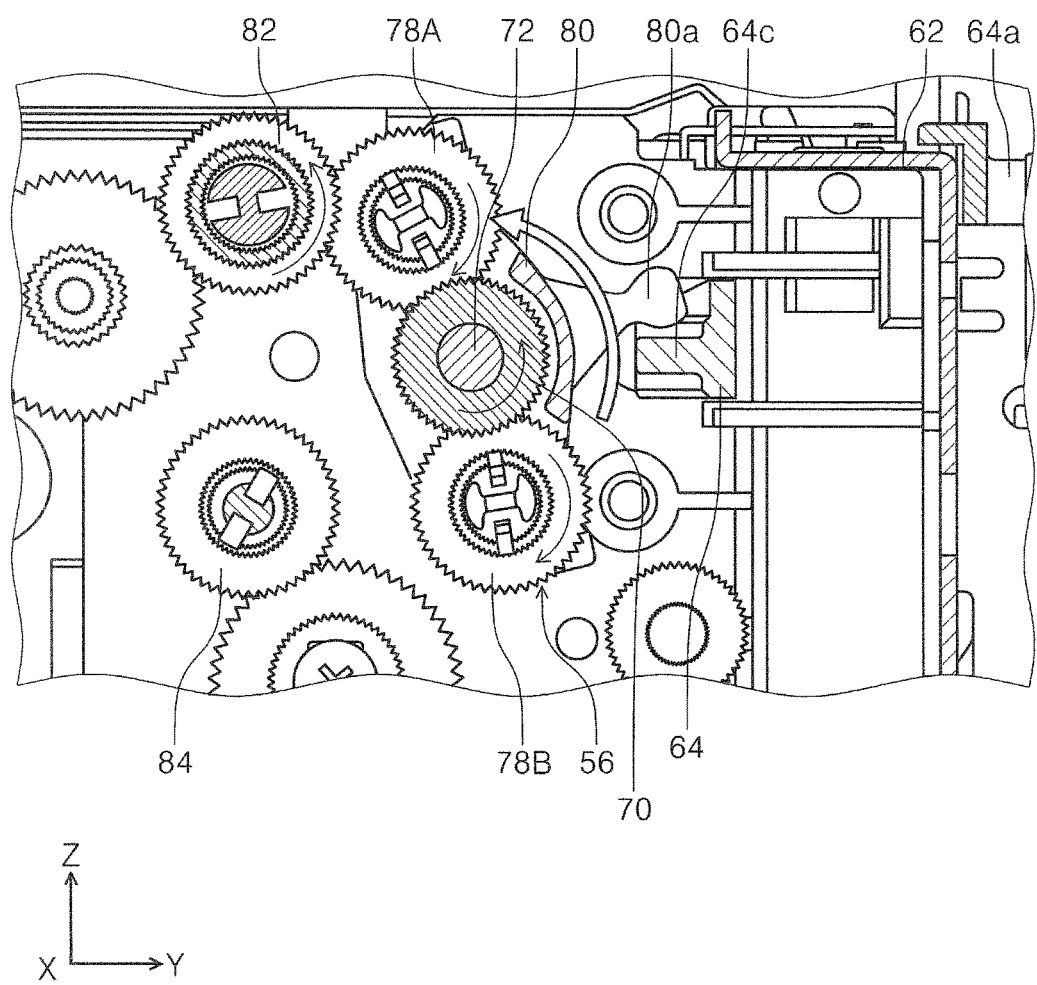
FIG. 11 is a view illustrating a second motive force transmission state in the switching mechanism.
Figure 13:
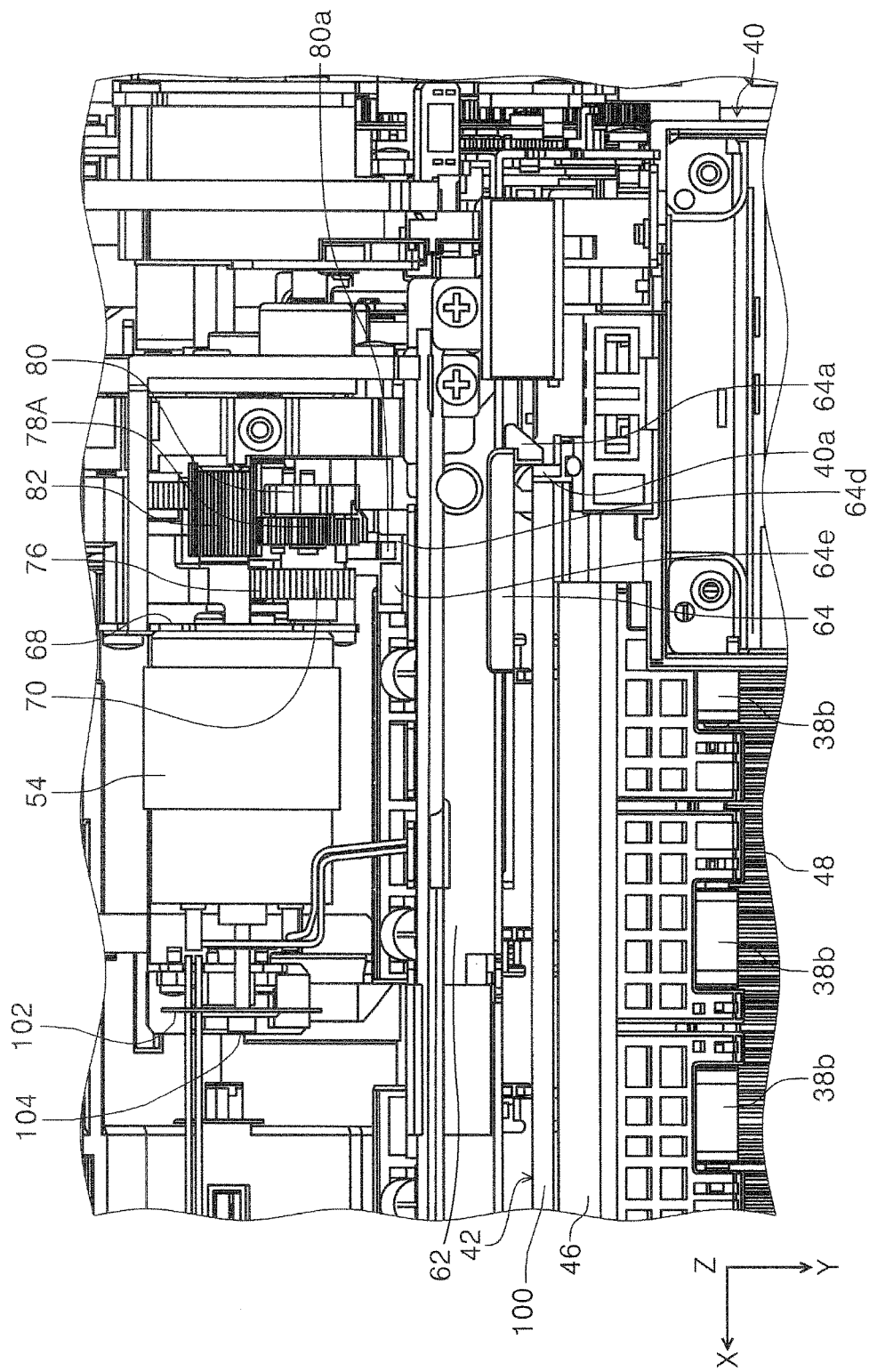
FIG. 13 is a plan view illustrating a state in which the regulated portion of the rotational movement member is positioned at an operation allowance portion.

FIG. 8 is a sectional diagram taken along a VIII-VIII sectional line in FIG. 7, FIG. 9 is a sectional perspective diagram taken along an IX-IX sectional line in FIG. 4, FIG. 10 is a view illustrating a first motive force transmission state in a switching mechanism, FIG. 11 is a view illustrating a second motive force transmission state in the switching mechanism, FIG. 12 is a perspective view illustrating a state in which the regulated portion of the rotational movement member is engaged with the first regulating portion, and FIG. 13 is a plan view illustrating a state in which the regulated portion of the rotational movement member is positioned at an operation allowance portion.

Figure 14:
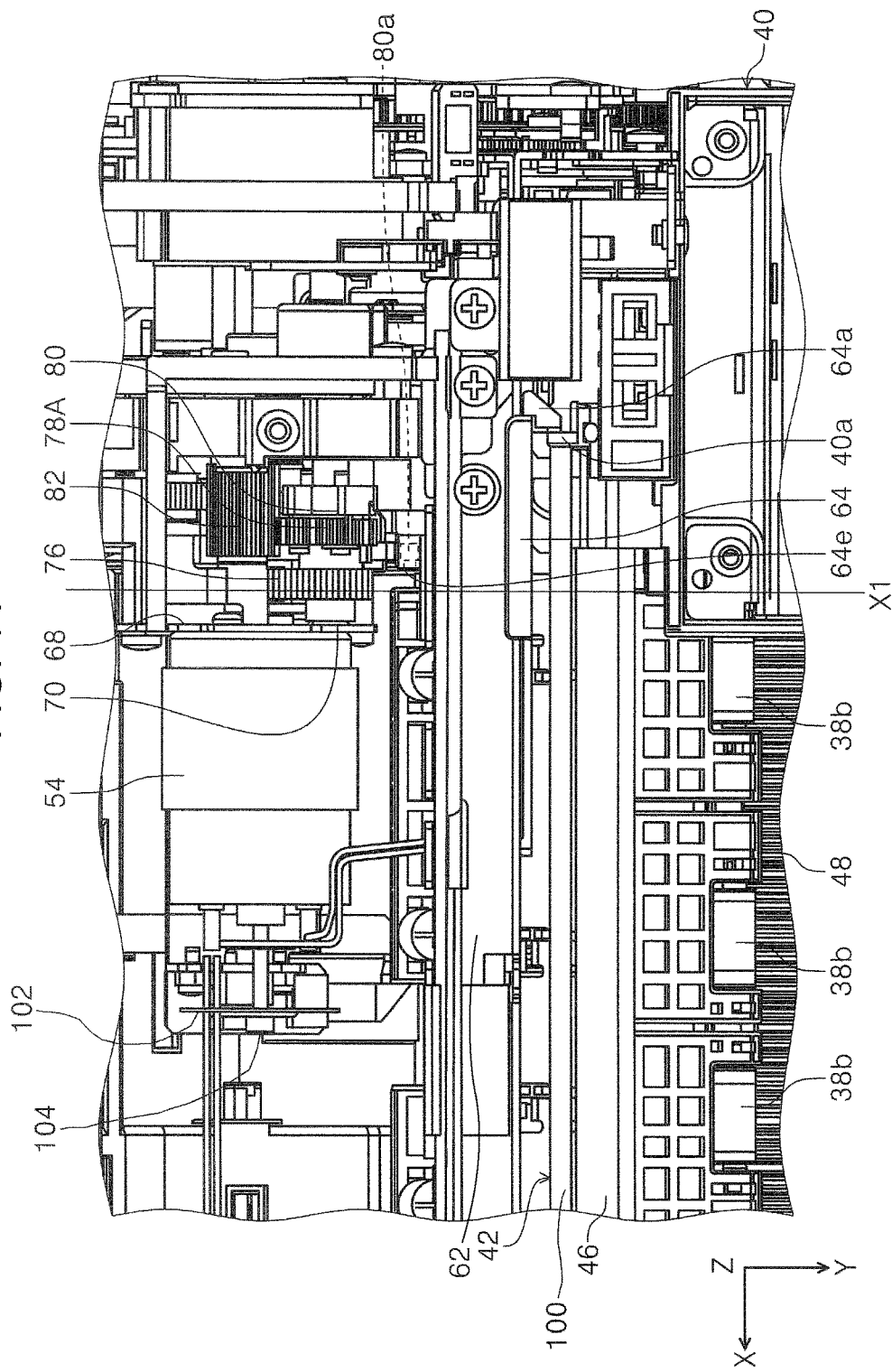
FIG. 14 is a plan view illustrating a state in which the regulated portion of the rotational movement member is engaged with a second regulating portion.
Figure 16:
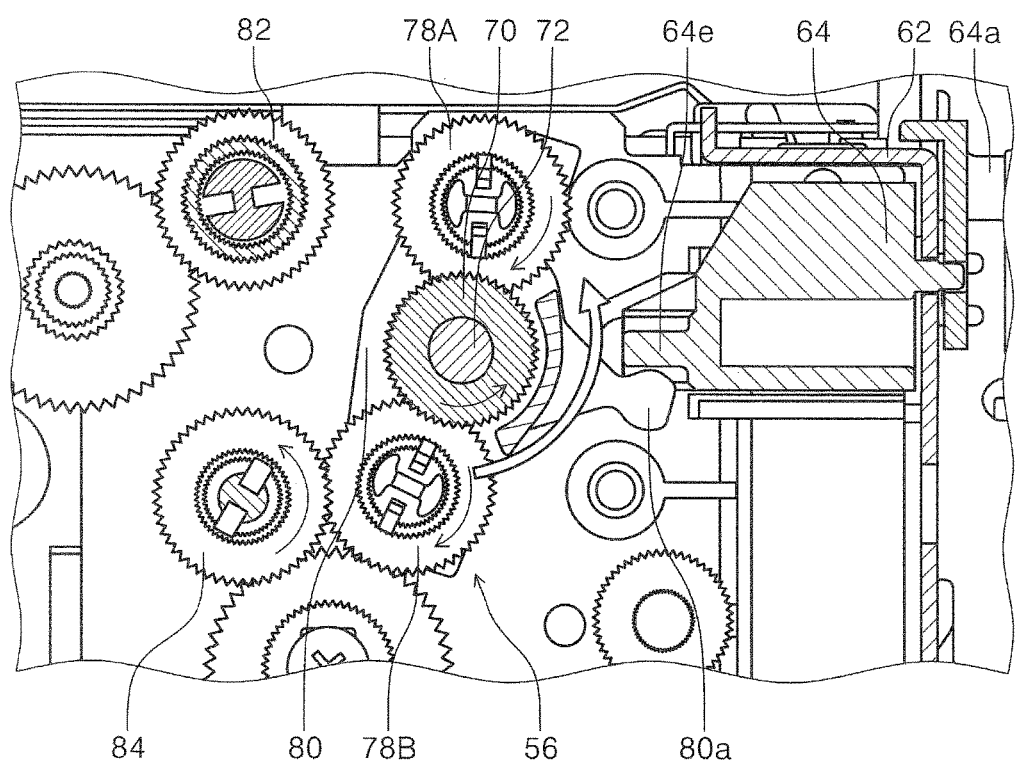
FIG. 16 is a view illustrating a fourth motive force transmission state in a switching mechanism.
Figure 17:
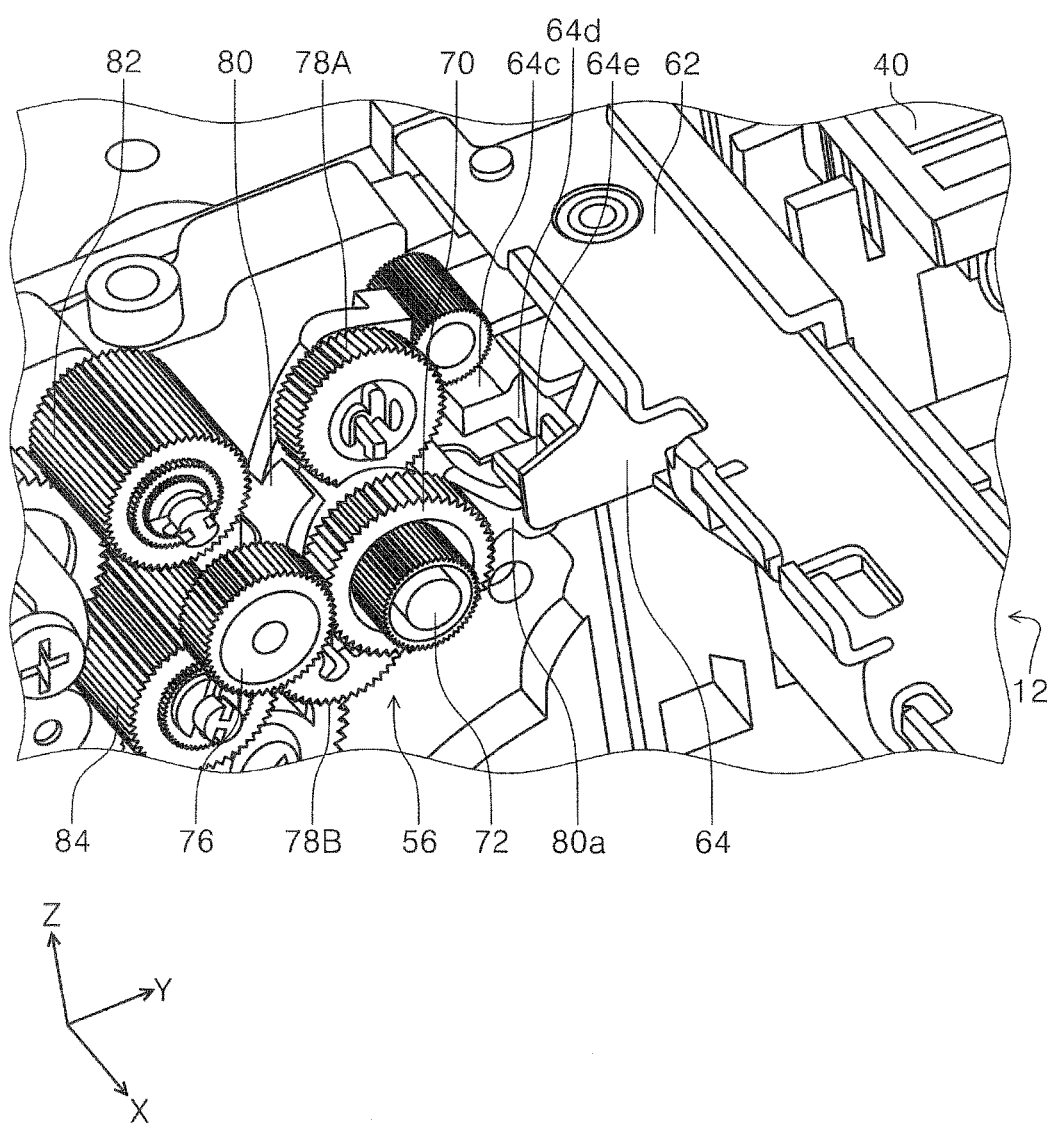
FIG. 17 is a perspective view illustrating a state in which the regulated portion of the rotational movement member is engaged with the second regulating portion.
Figure 18:
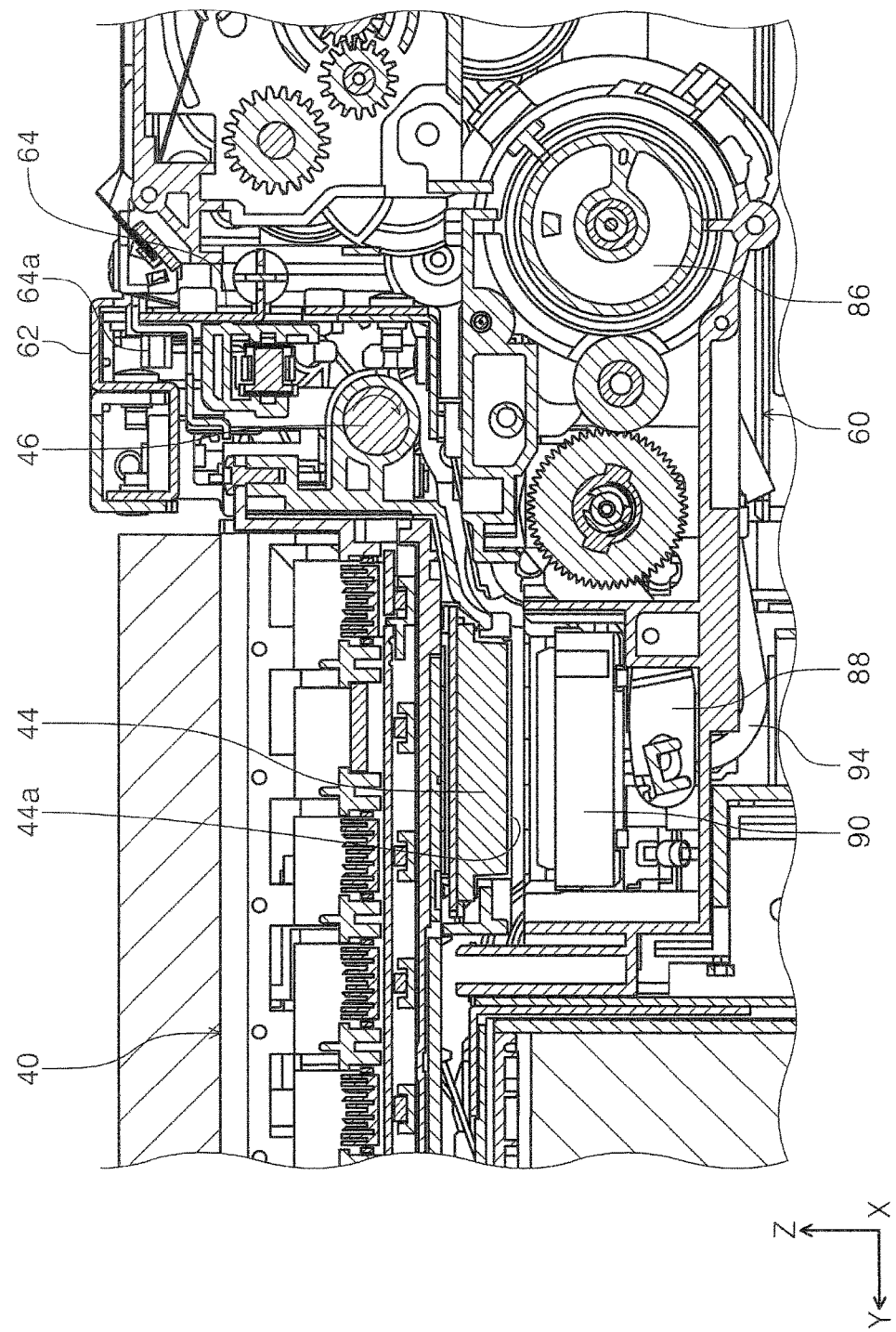
FIG. 18 is a lateral sectional diagram illustrating a state in which a cap is separated from a recording head.
Figure 19:
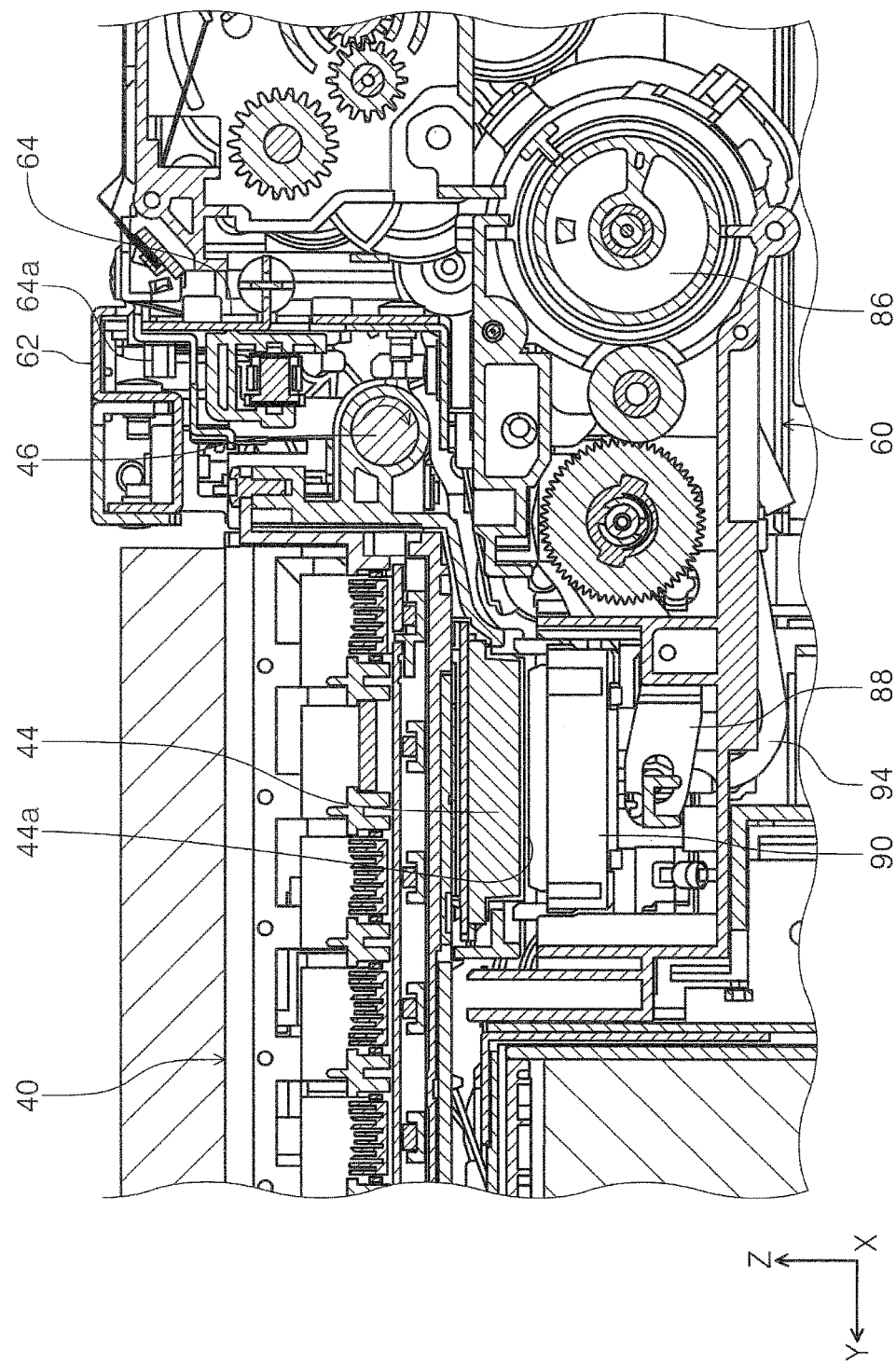
FIG. 19 is a lateral sectional diagram illustrating a state in which the cap is in contact with the recording head.
Figure 20:
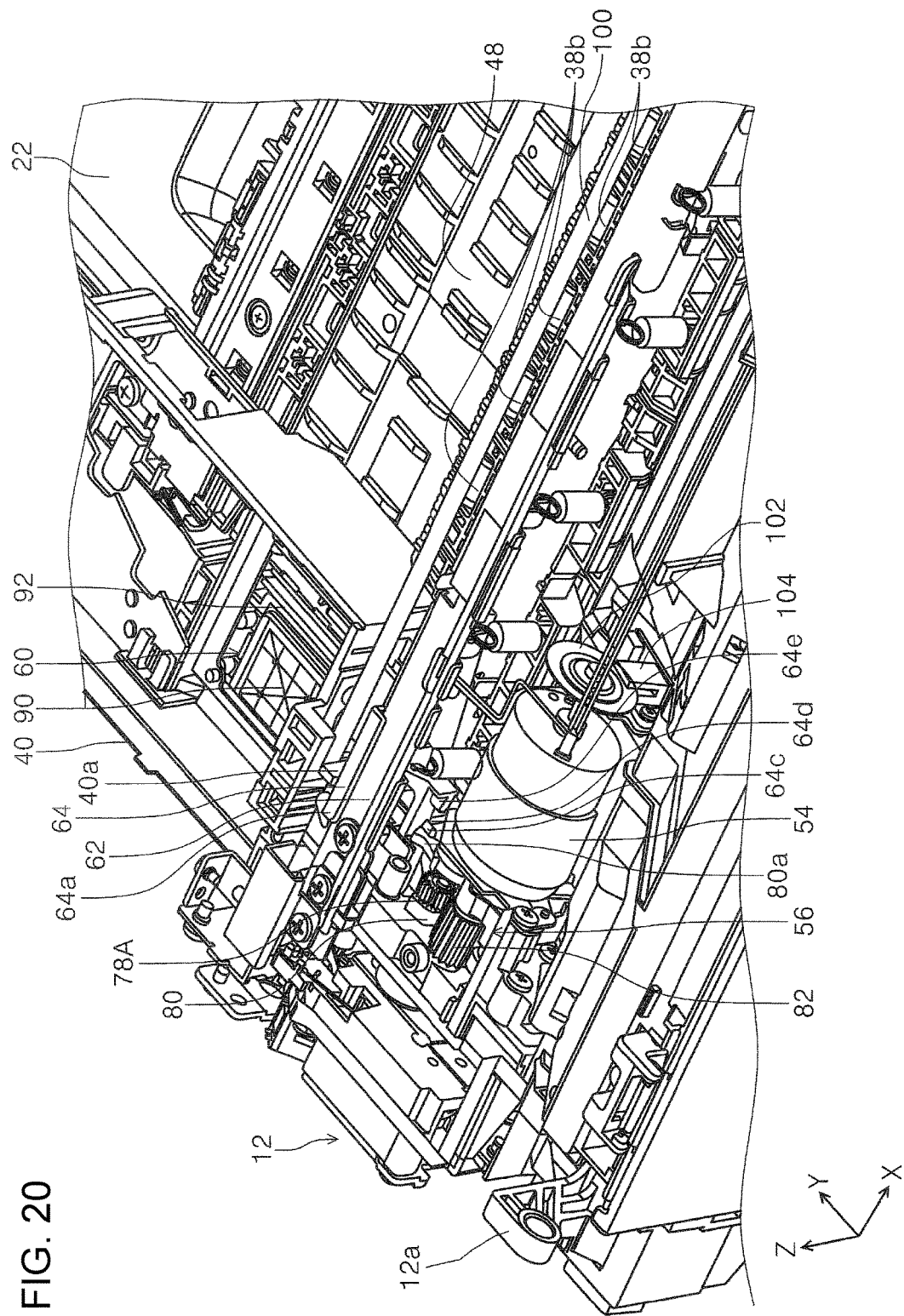
FIG. 20 is a perspective view illustrating the relationship between the carriage, the regulating member, the switching mechanism, the drive motor, and an ink system.
Figure 21:
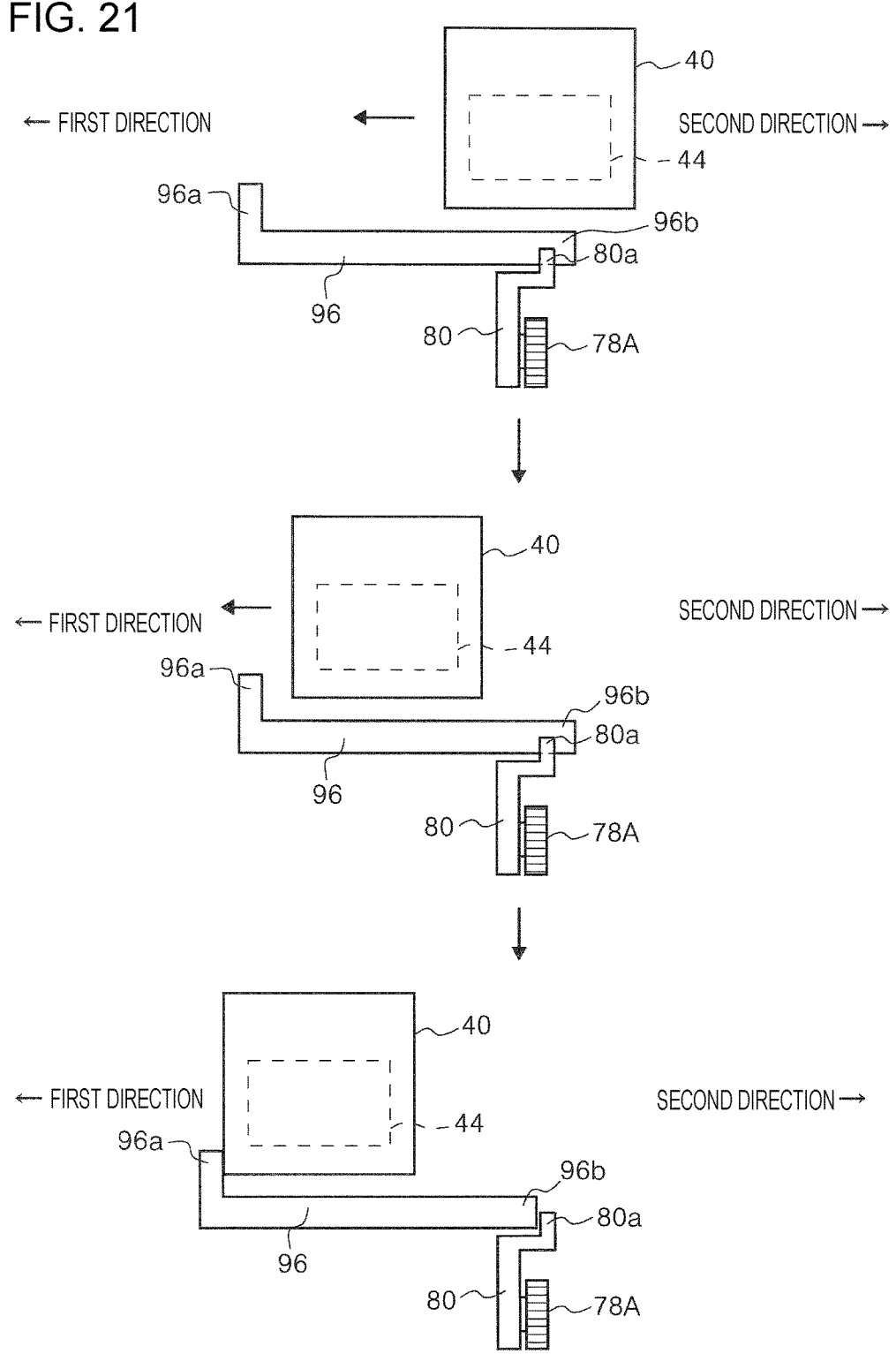
FIG. 21 is a schematic diagram of a switching operation of the motive force transmission state in a switching mechanism which is not provided with an operation allowance portion.

FIG. 14 is a plan view illustrating a state in which the regulated portion of the rotational movement member is engaged with a second regulating portion, FIG. 15 is a view illustrating a third motive force transmission state in a switching mechanism, FIG. 16 is a view illustrating a fourth motive force transmission state in a switching mechanism, FIG. 17 is a perspective view illustrating a state in which the regulated portion of the rotational movement member is engaged with the second regulating portion, FIG. 18 is a lateral sectional diagram illustrating a state in which a cap is separated from a recording head, FIG. 19 is a lateral sectional diagram illustrating a state in which the cap is in contact with the recording head, FIG. 20 is a perspective view illustrating the relationship between the carriage, the regulating member, the switching mechanism, the drive motor, and an ink system, and FIG. 21 is a schematic diagram of a switching operation of the motive force transmission state in a switching mechanism which is not provided with an operation allowance portion.

Figure 22:
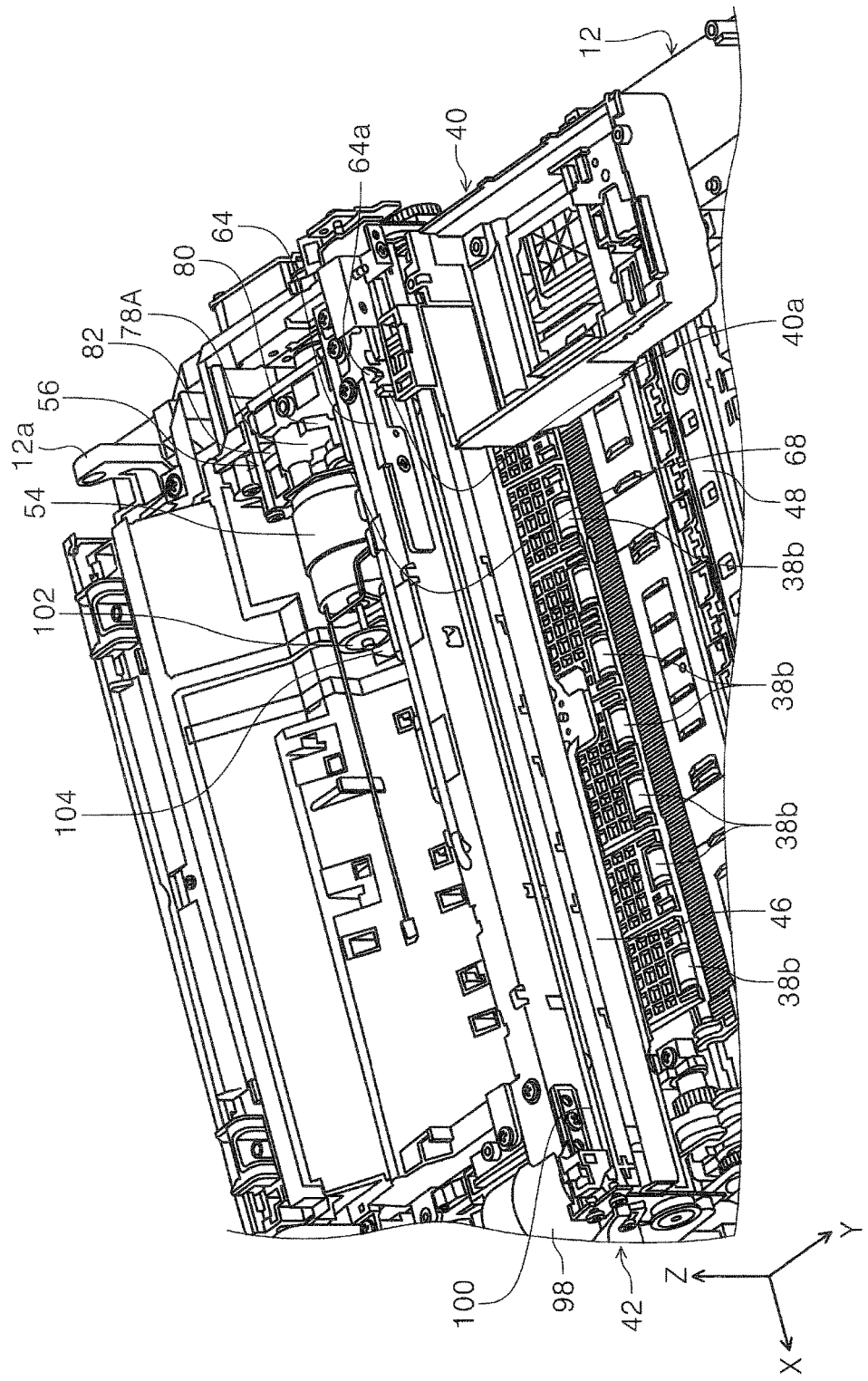
FIG. 22 is a perspective view illustrating the carriage and a carriage drive unit.
Figure 23:
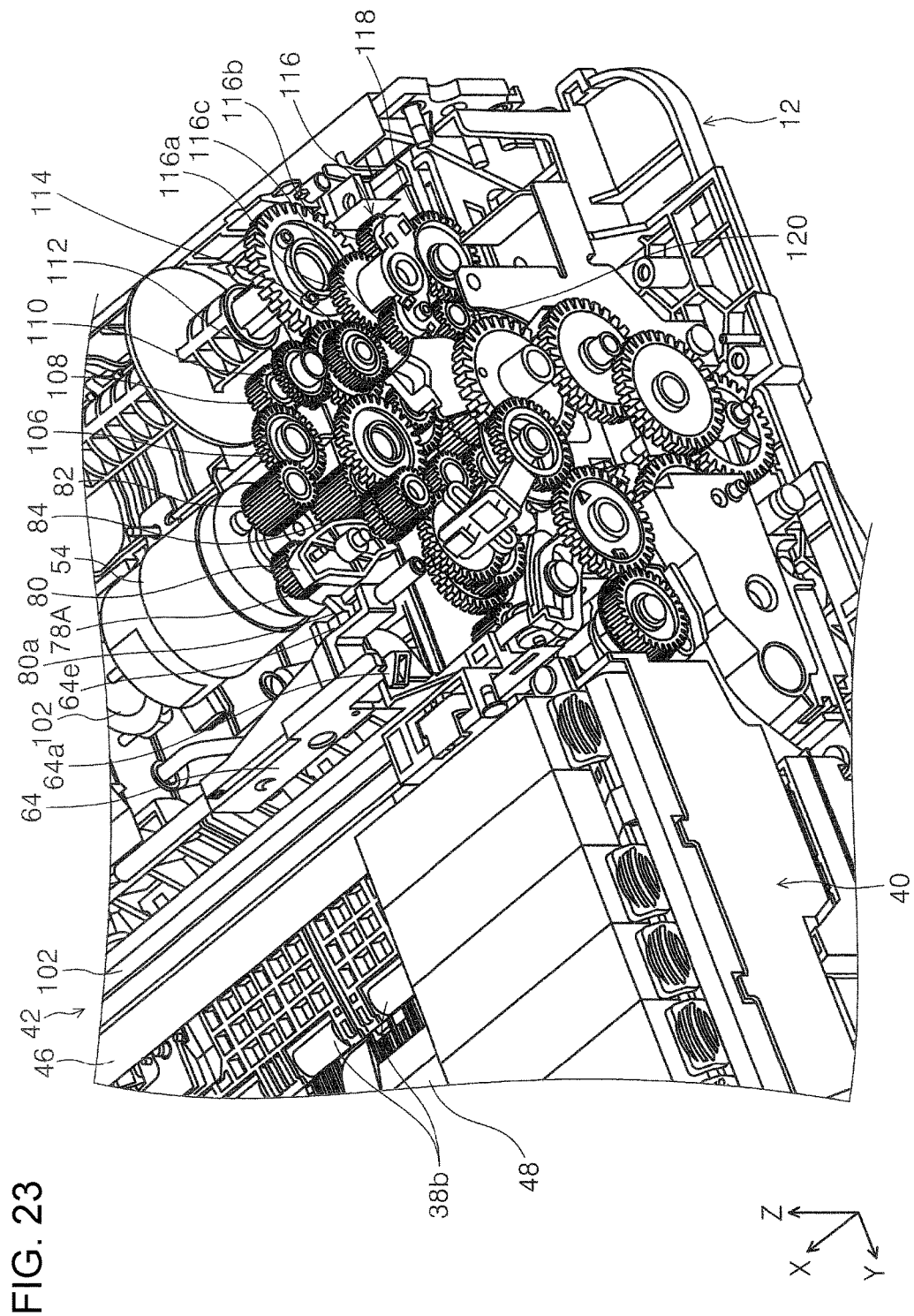
FIG. 23 is a perspective view illustrating the relationship between the carriage, the regulating member, the switching mechanism, the drive motor, and a feed roller drive gear.
Figure 24:
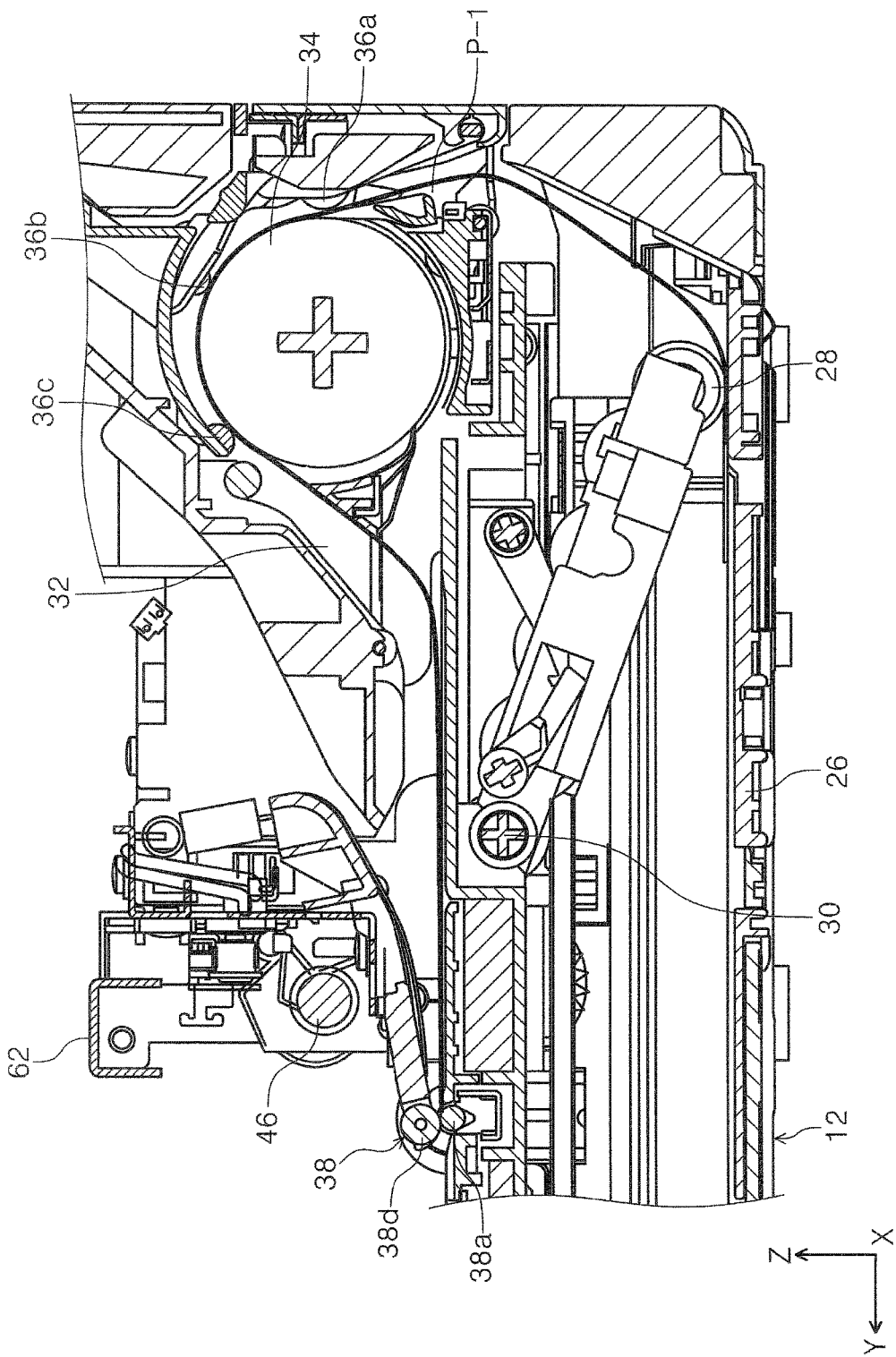
FIG. 24 is a lateral sectional diagram illustrating an example of bending control between the feed roller and a transport roller pair in the medium transport path.

FIG. 22 is a perspective view illustrating the carriage and a carriage drive unit, FIG. 23 is a perspective view illustrating the relationship between the carriage, the regulating member, the switching mechanism, the drive motor, and a feed roller drive gear, and FIG. 24 is a lateral sectional diagram illustrating an example of bending control between the feed roller and a transport roller pair in the medium transport path.

Figure 25:
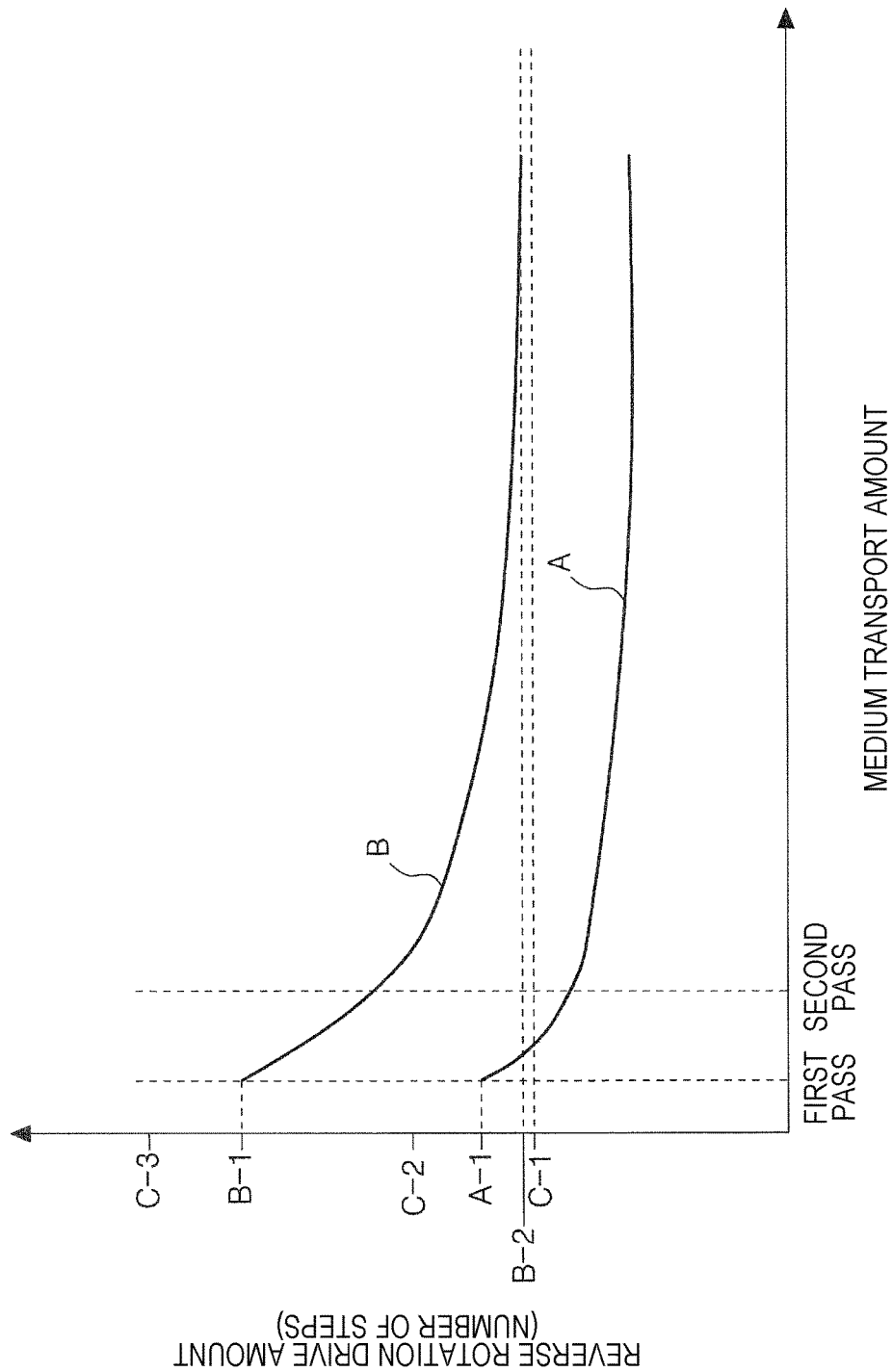
FIG. 25 is a graph explaining a reverse rotation driving amount of the drive motor when surface pressure is released.
Figure 26:
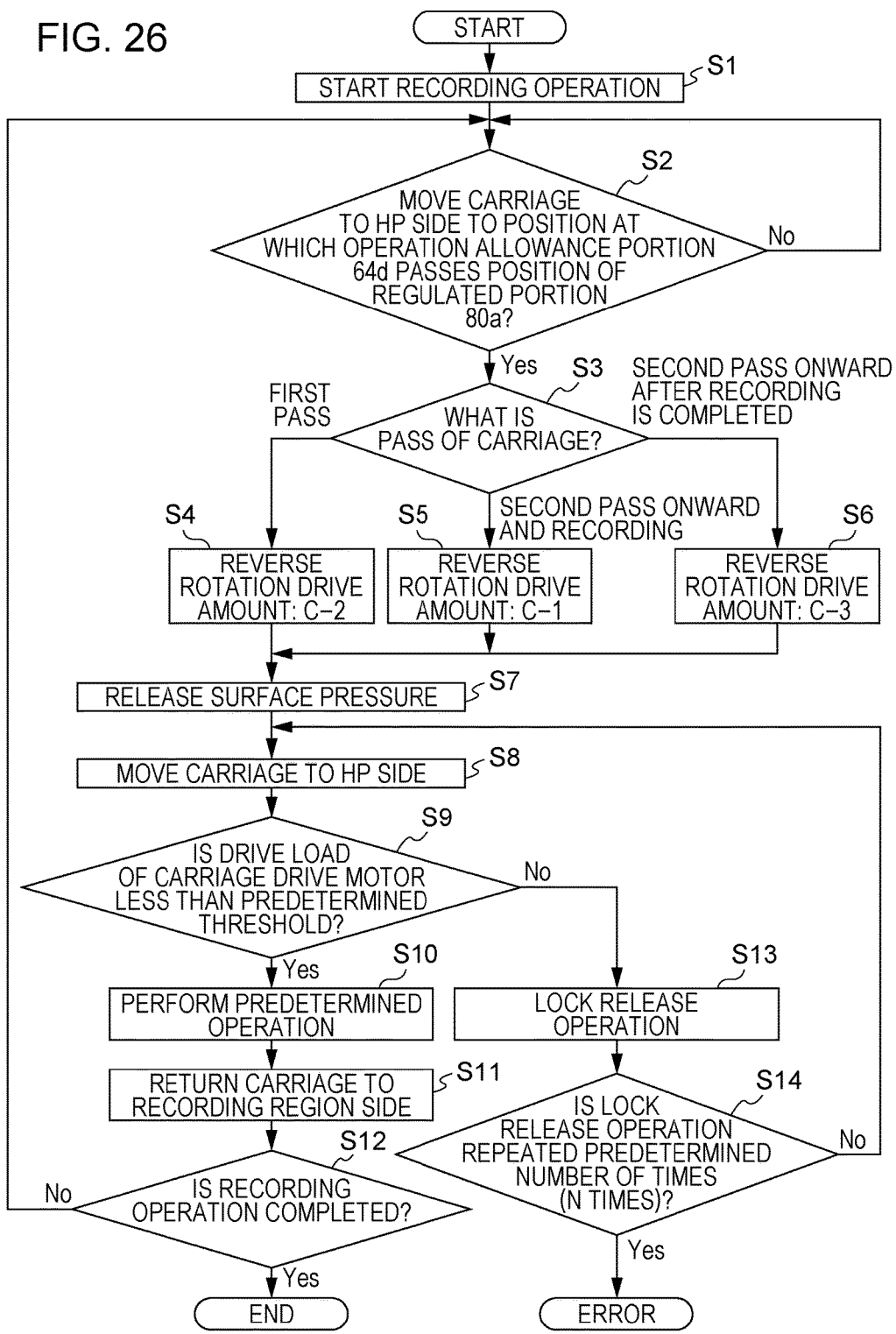
FIG. 26 is a flowchart of the control of the release of the surface pressure of the first motive force transmission state when a recording operation of a medium is performed.
Figure 27:
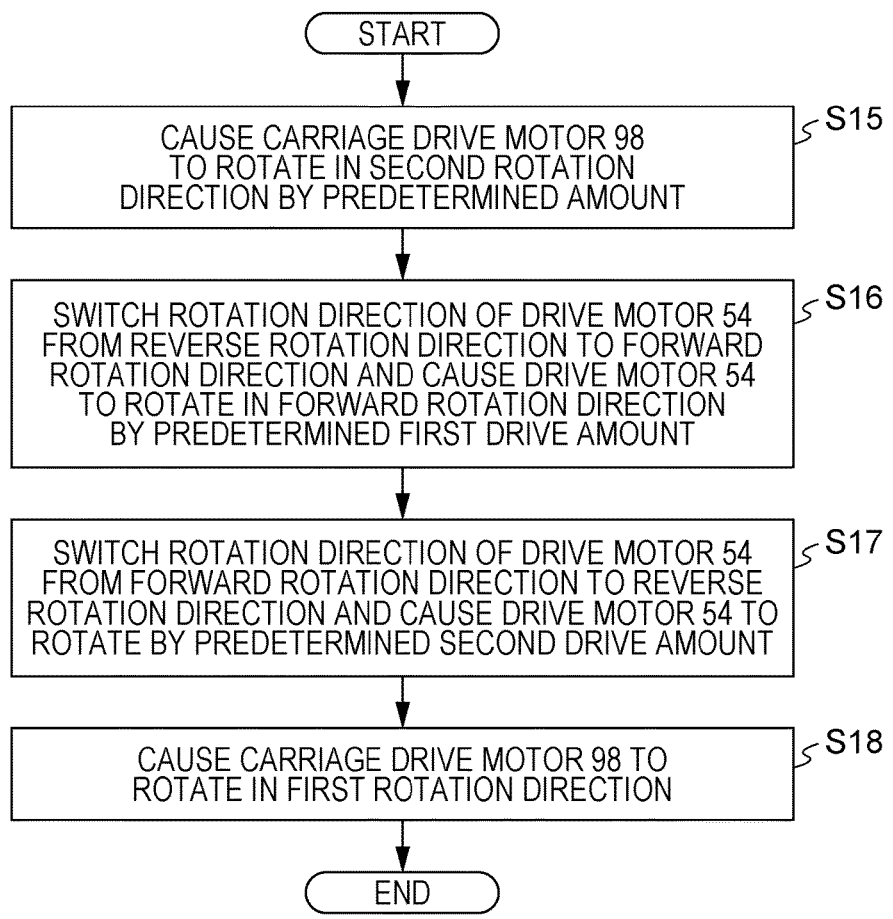
FIG. 27 is a flowchart of a retry operation.
Figure 28:
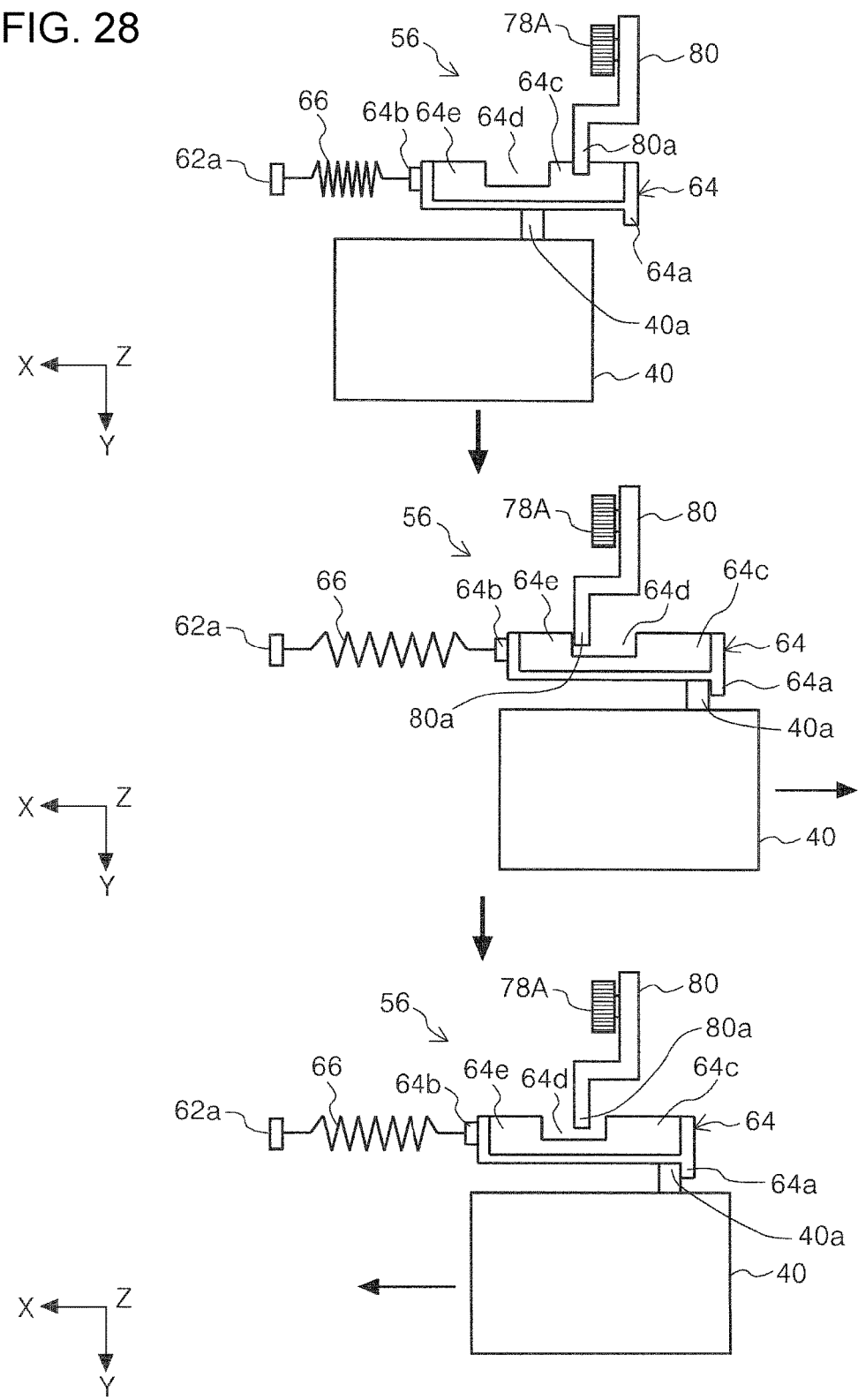
FIG. 28 is a schematic diagram explaining the retry operation.
Figure 29:
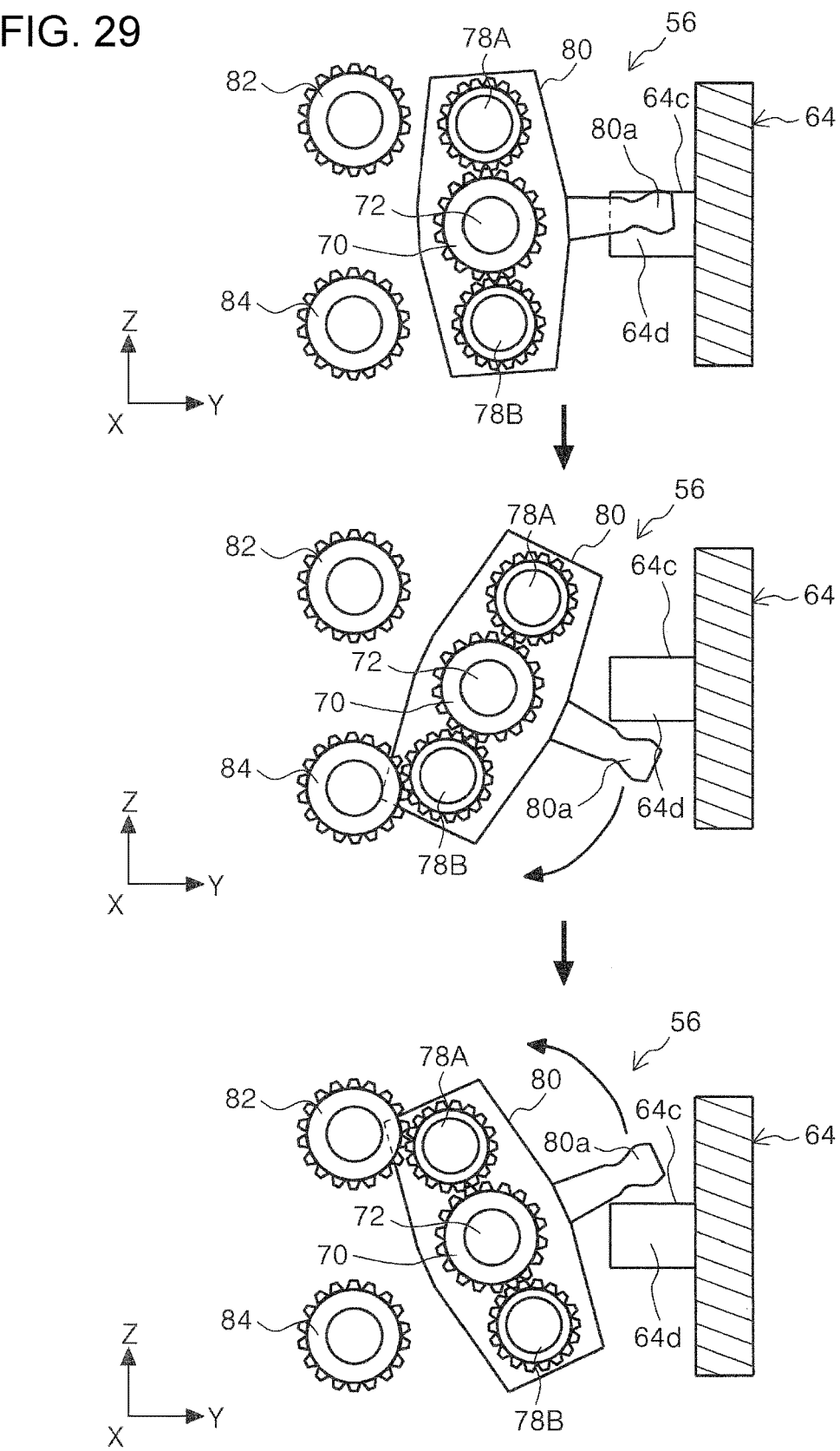
FIG. 29 is a schematic diagram explaining the retry operation.

FIG. 25 is a graph explaining a reverse rotation driving amount of the drive motor when surface pressure is released, FIG. 26 is a flowchart of the control of the release of the surface pressure of the first motive force transmission state when a recording operation of a medium is performed, FIG. 27 is a flowchart of a retry operation, and FIGS. 28, 29, and 30 are schematic diagrams explaining the retry operation.

Figure 31:
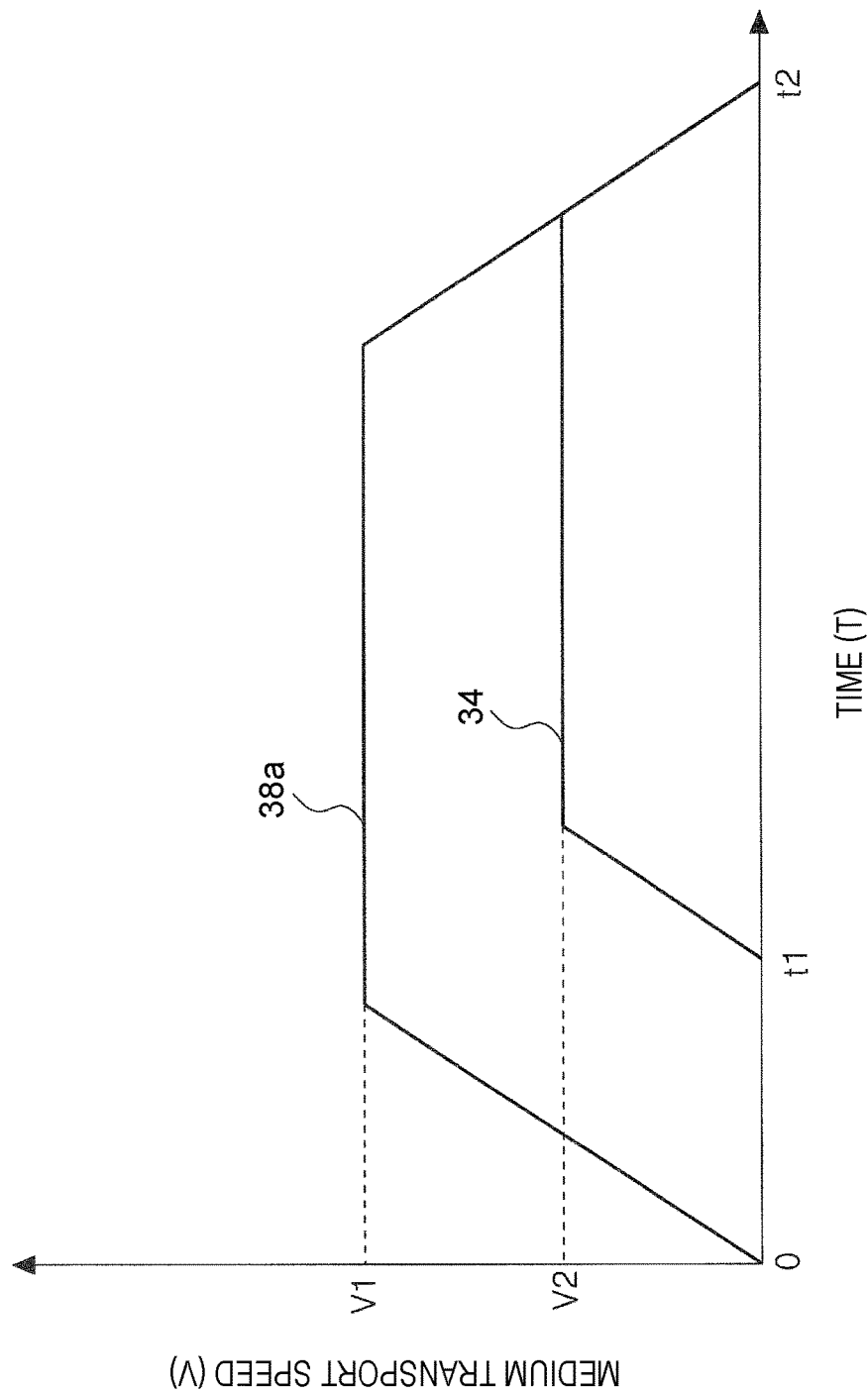
FIG. 31 is a time chart illustrating the drive states of the feed roller and the transport roller pair in the control which reduces bending.
Figure 32:
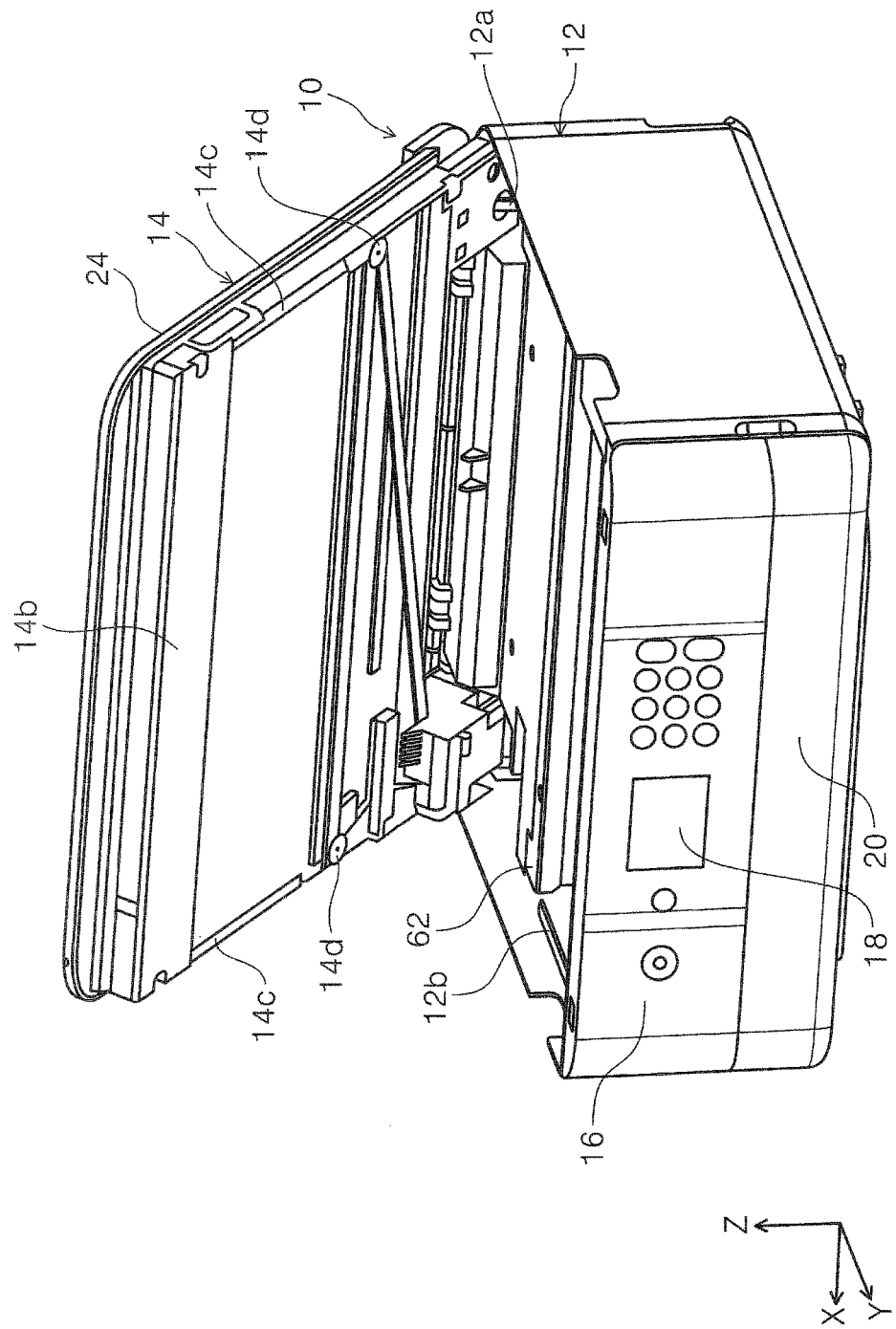
FIG. 32 is a perspective view of a state in which a scanner portion is opened with respect to an apparatus main body in the printer.
Figure 33:
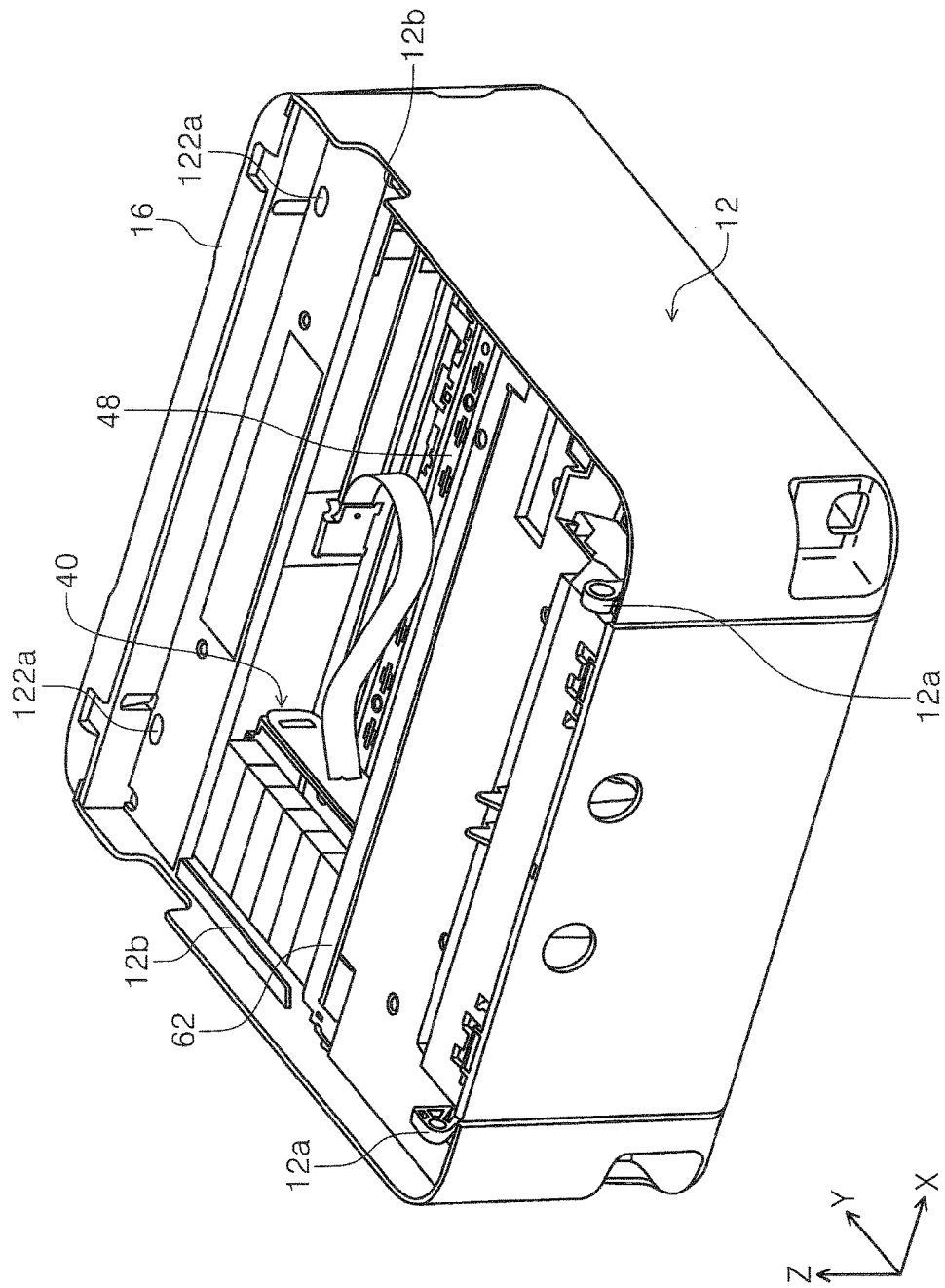
FIG. 33 is a perspective view of the apparatus main body as viewed from a diagonal rear side and from above.

FIG. 31 is a time chart illustrating the drive states of the feed roller and the transport roller pair in the control which reduces bending, FIG. 32 is a perspective view of a state in which a scanner portion is opened with respect to an apparatus main body in the printer, and FIG. 33 is a perspective view of the apparatus main body as viewed from a diagonal rear side and from above.

Figure 34:
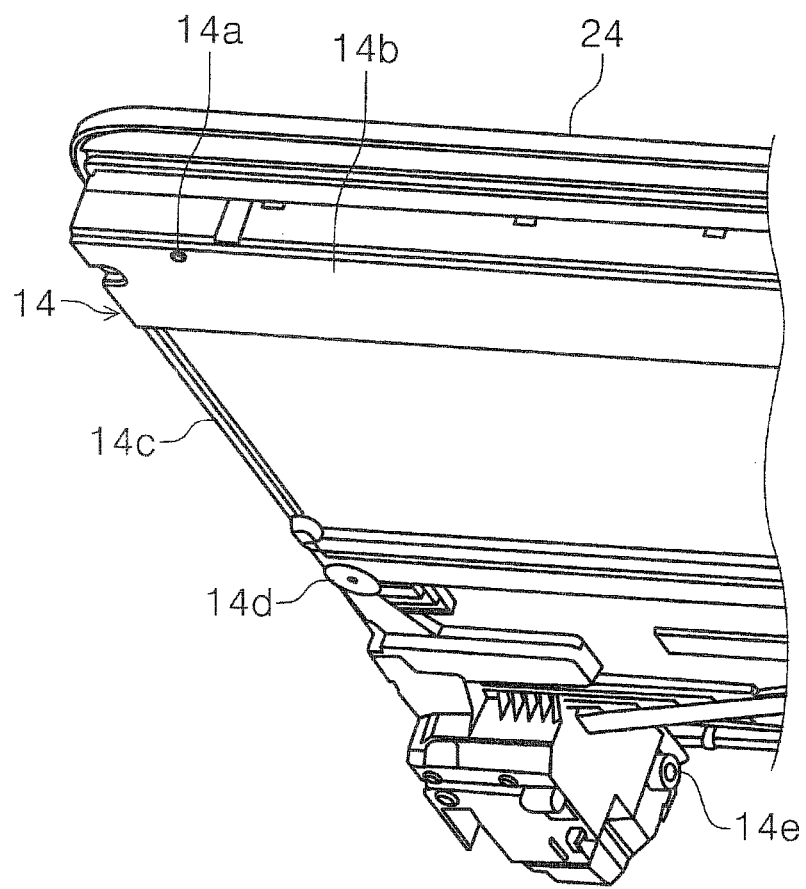
FIG. 34 is a perspective view illustrating a bottom portion of a left side end portion of the scanner portion.
Figure 35:
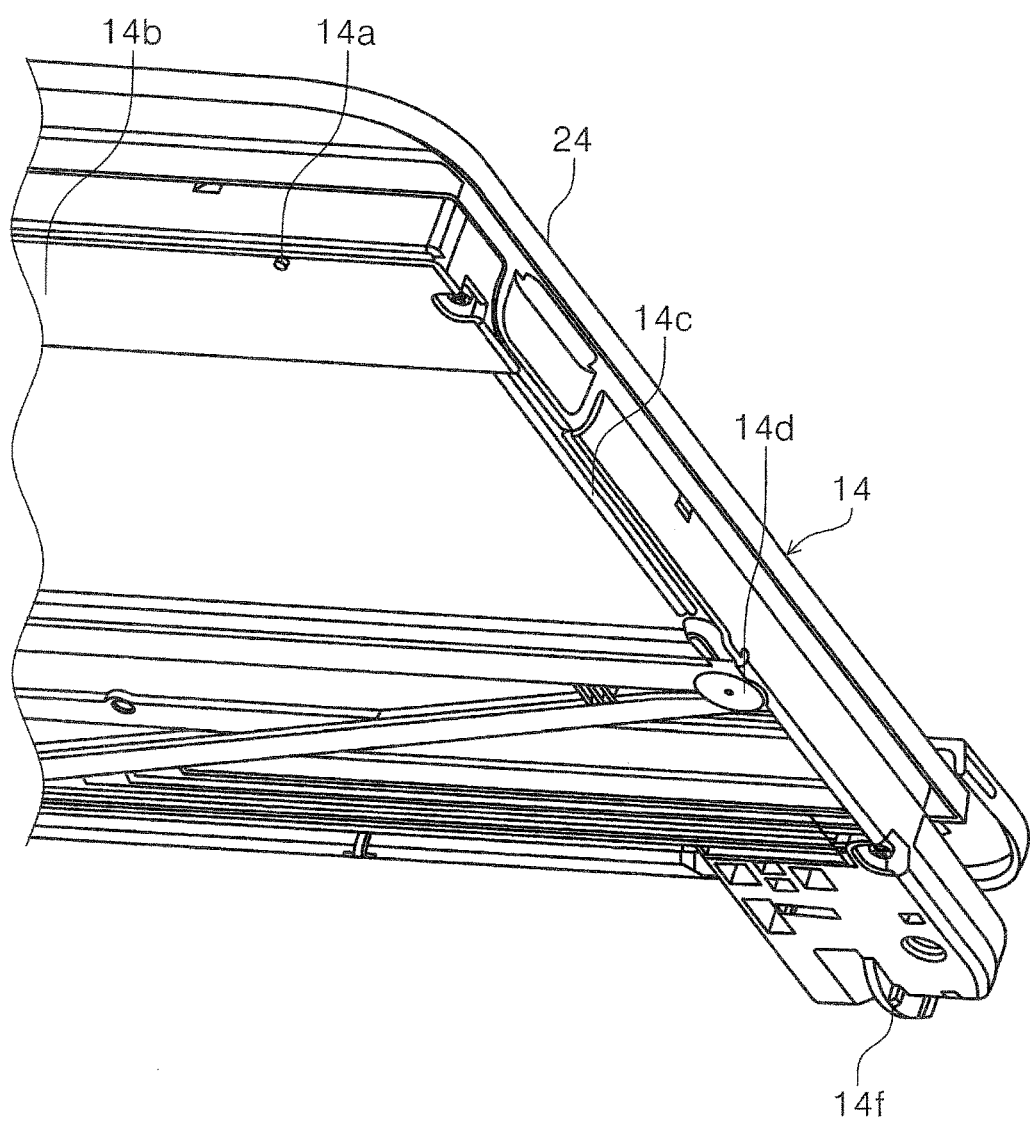
FIG. 35 is a perspective view illustrating a bottom portion of a right side end portion of the scanner portion.
Figure 36:
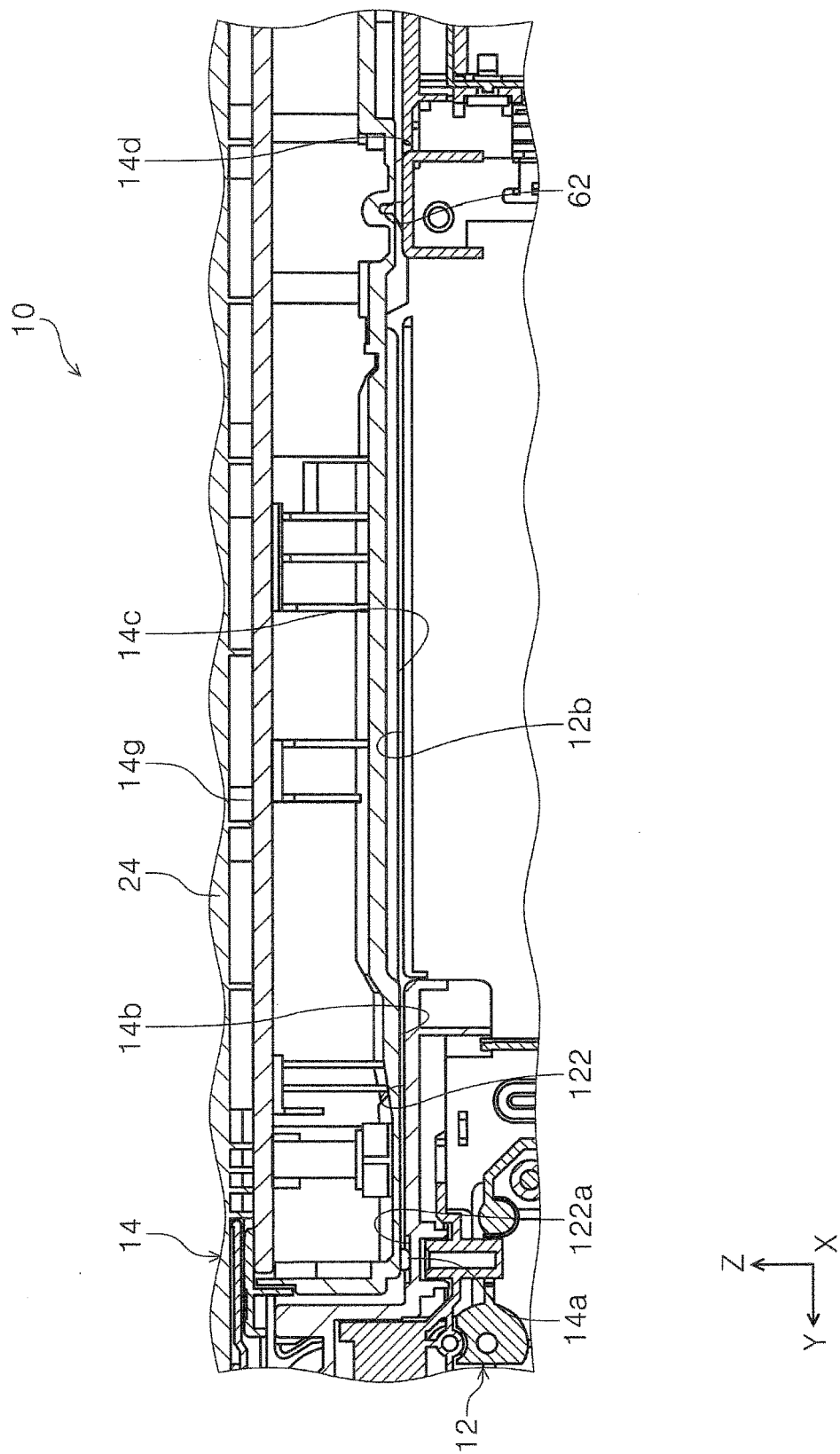
FIG. 36 is a lateral sectional diagram illustrating a state in which the scanner portion is closed on the apparatus main body.

FIG. 34 is a perspective view illustrating a bottom portion of a left side end portion of the scanner portion, FIG. 35 is a perspective view illustrating a bottom portion of a right side end portion of the scanner portion, and FIG. 36 is a lateral sectional diagram illustrating a state in which the scanner portion is closed on the apparatus main body.

In the X-Y-Z coordinate system illustrated in the drawings, an X direction indicates width direction of a recording medium, that is, an apparatus width direction, a Y direction indicates a transport direction of the recording medium in a transport path inside the recording apparatus, that is, an apparatus depth direction, and a Z direction indicates an apparatus height direction.

First Example

Outline of Printer

A description will be given of the overall configuration of the printer 10 with reference to FIG. 1. The printer 10 is configured as an ink jet printer as an example of a recording apparatus. The printer 10 is configured as a multifunction device which is provided with an apparatus main body 12 and a scanner portion 14. An operation unit 16 is provided on the apparatus front side of the apparatus main body 12 to be capable of rotationally moving with respect to the apparatus main body 12. A display unit 18 such as a display panel is provided on the operation unit 16.

A cover 20 is disposed under the operation unit 16 on the apparatus front side of the apparatus main body 12. A paper output tray 22 is provided in the apparatus main body 12. The paper output tray 22 is configured to be capable of switching between a state of being housed inside the apparatus main body 12 (FIG. 2) and a state of being opened to the apparatus front side of the apparatus main body 12 (not illustrated).

In the present example, the scanner portion 14 is connected to the rear side end portion in the apparatus depth direction of the apparatus main body 12 to be capable of rotationally moving, and although not illustrated, by rotationally moving the scanner portion 14 to the apparatus rear side, the scanner portion 14 is configured to expose the top portion of the apparatus main body 12. The cover 24 is attached to the top portion of the scanner portion 14 to be capable of rotationally moving with respect to the scanner portion 14. By causing the cover 24 to rotationally move on the scanner portion 14, it is possible to expose a document placement surface 14g (FIG. 36) which is provided on the scanner portion 14 and it is possible to set the document on the document placement surface 14g. In the present example, the document placement surface 14g is formed by a flat glass plate, for example.

Next, referring to FIG. 2, a medium housing portion 26 which houses the medium is provided on the bottom portion of the apparatus main body 12. In the present example, the medium housing portion 26 is configured to be attachable and detachable with respect to the apparatus main body 12 from the apparatus front side. The cover 20 is attached to be capable of rotationally moving with respect to the medium housing portion 26.

A pickup roller 28 is provided above the medium housing portion 26 on the rear side inside the apparatus main body 12. The pickup roller 28 is configured to be capable of rotationally moving to pivot on a rotational movement shaft 30. By coming into contact with a medium P which is housed in the medium housing portion 26, the pickup roller 28 transports the medium P which is the topmost of the media which are housed in the medium housing portion 26 along a medium transport path 32 to the downstream side in the transport direction. The thick line which is given the reference numeral P in FIG. 2 illustrates a path of the medium P which is transported along the medium transport path 32.

A feed roller 34 is provided on the downstream side of the pickup roller 28 in the medium transport path 32. Driven rollers 36a, 36b, 36c, and 36d are provided in the periphery of the feed roller 34 to be capable of being driven to rotate with respect to the feed roller 34.

The medium P which is transported by the pickup roller 28 is transported to a transport roller pair 38 (FIGS. 3 and 4) which is provided on the downstream side in the transport direction via the feed roller 34 and the driven rollers 36a, 36b, and 36c. The transport roller pair 38 in the present example is provided with a transport drive roller 38a (FIG. 2) which receives a drive force from a roller drive motor 55 (FIG. 3) and is rotationally driven and a transport driven roller 38b (FIG. 4) which is driven to rotate with respect to the transport drive roller 38a.

A carriage 40 (the double-dot-dash line portion of FIG. 2 and FIG. 4) is provided on the downstream side in the transport direction of the transport roller pair 38. The carriage 40 is configured to be capable of reciprocal movement in the apparatus width direction due to a carriage drive unit 42, that is, rightward in the apparatus width direction which is a first direction and leftwards in the apparatus width direction which is a second direction.

As illustrated in FIG. 22, for example, the carriage drive unit 42 is provided with a carriage drive motor 98 and an endless belt 100. The carriage drive motor 98 is disposed on the end portion on the left side in the apparatus width direction. A drive pulley (not illustrated) is attached to the carriage drive motor 98. Meanwhile, a driven pulley (not illustrated) is provided on the end portion of the right side in the apparatus width direction of the apparatus main body 12. The endless belt 100 is attached to the drive pulley and the driven pulley (not illustrated). A portion of the endless belt 100 is gripped by the carriage 40 on the rear side of the carriage 40.

A recording head 44 (FIGS. 18 and 19) is provided on the bottom portion of the carriage 40. In the present example, the recording head 44 is configured to discharge an ink toward the bottom side in the apparatus height direction.

Referring to FIGS. 2, 4, 7, 18, and the like, a guide shaft 46 which extends along the apparatus width direction is inserted into the end portion of the rear side of the carriage 40. The guide shaft 46 supports the carriage 40. When the carriage drive motor 98 is driven, the endless belt 100 is rotationally driven. As a result, the carriage 40 is guided by the guide shaft 46 and is caused to move in the apparatus width direction by the carriage drive unit 42. In the present example, when the carriage drive motor 98 is rotated in a predetermined first rotation direction, the carriage 40 moves from the left to the right in the apparatus width direction, and when the carriage drive motor 98 is rotated in a predetermined second rotation direction, the carriage 40 is set to move from the right to the left in the apparatus width direction.

A medium support unit 48 (FIGS. 2 and 4) is provided under the recording head 44 in a region facing the recording head 44. The medium support unit 48 supports the bottom surface (the surface of the opposite side from the recording surface) of the medium P which is transported to the region facing the recording head 44 by the transport roller pair 38. The recording head 44 discharges ink onto the medium P which is supported by the medium support unit 48 and performs recording on the recording surface of the medium P.

The medium P on which the recording is performed is nipped by an output roller pair 50 which is provided on the downstream side in the transport direction of the recording head 44 is output to the paper output tray 22 which protrudes to the apparatus front side.

Next, referring to FIG. 3, a control unit 52 which serves as a "controller" controls the transport roller pair 38 and the output roller pair 50 via the carriage drive unit 42, the recording head 44, a drive motor 54 which serves as a "drive source", and the roller drive motor 55 (FIG. 3) which is disposed inside the apparatus main body 12 according to input from the operation unit 16, or alternatively, according to an instruction of a print driver which is transmitted from an external computer (not illustrated) which is connected to the printer 10. The control unit 52 is configured as an electrical circuit which is provided with a plurality of electronic components, for example, and is provided inside the apparatus main body 12.

The drive motor 54 which is controlled by the control unit 52 supplies, as appropriate, a drive force to the pickup roller 28, the feed roller 34, a gap adjustment unit 58 (described later), and an ink system 60 (described later) via a switching mechanism 56 (described later).

Regarding Regulating Member

Referring to FIG. 4, a main frame 62 which configures the apparatus main body 12 is provided to extend along the apparatus width direction on the rear side of the carriage 40 in the apparatus depth direction. Referring to FIGS. 5 and 6, a regulating member 64 is attached to the main frame 62 to be capable of moving by sliding along the apparatus width direction. In FIG. 5, an engagement portion 64a is provided on an end portion of the right side in the apparatus width direction on the front side in the apparatus depth direction of the regulating member 64. The engagement portion 64a in the regulating member 64 protrudes to the front side in the apparatus depth direction. The engagement portion 64a is configured to be capable of engaging with an engaged portion 40a (FIGS. 7, 13, and 14) which is provided on the rear side end portion in the apparatus depth direction of the carriage 40.

Referring to FIG. 6, a biasing member locking portion 64b is provided on the end portion of the left side in the apparatus width direction on the regulating member 64 of the rear side in the apparatus depth direction of the main frame 62. A biasing member locking portion 62a is also provided on the main frame 62. An end portion of a biasing unit 66 is locked to the biasing member locking portion 64b of the regulating member 64 and the other end portion of the biasing unit 66 is locked to the biasing member locking portion 62a of the main frame 62. In the present example, the biasing unit 66 is configured as a coil spring, for example. The biasing unit 66 biases the regulating member 64 toward the left in the apparatus width direction (the second direction).

In the regulating member 64, a first regulating portion 64c, an operation allowance portion 64d, and a second regulating portion 64e are provided, in order from the right in the apparatus width direction (the first direction) toward the left in the apparatus width direction (the second direction), on the end portion on the right side in the apparatus width direction.

The first regulating portion 64c protrudes to the rear side in the apparatus depth direction and is configured as a plate-shaped portion which extends along the apparatus depth direction. In the same manner, the second regulating portion 64e protrudes to the rear side in the apparatus depth direction and is configured as a plate-shaped portion which extends along the apparatus depth direction. The operation allowance portion 64d is configured as a recessed portion between the first regulating portion 64c and the second regulating portion 64e in the apparatus width direction.

Drive Motor and Switching Mechanism

Again referring to FIG. 4, the drive motor 54 and the switching mechanism 56 are disposed on the rear side of the main frame 62 in the apparatus depth direction. As illustrated in FIG. 2, in the apparatus depth direction, the drive motor 54 is disposed closer to the rear side in the apparatus depth direction than the recording head 44 of the carriage 40. The drive motor 54 is positioned on the bottom surface of the recording head 44 in the apparatus height direction, that is, is positioned closer to the top side than a head surface 44a. Referring to FIG. 14, a straight line which is given the reference numeral X1 and extends in the apparatus depth direction illustrates the right end portion in the apparatus width direction of the passage region of the maximum size of the medium P which is transported in the medium transport path 32. The drive motor 54 is disposed closer to the left in the apparatus width direction than the position X1 in the apparatus width direction, that is, inside the passage region of the maximum size of the medium P in the medium transport path 32.

Referring to FIG. 8, the drive motor 54 is attached to a drive motor support frame 68 which serves as a "frame". The drive motor support frame 68 is attached, to be capable of rotating, to a shaft 72 which supports a sun gear 70 (described later) such that the sun gear 70 is capable of rotating. The drive motor support frame 68 is configured such that the drive motor 54 is attached to a position which is a distance R1 from a center position of the shaft 72. When the drive motor support frame 68 is caused to rotate using the shaft 72 as the center of rotation, a drive shaft of the drive motor 54 moves around the shaft 72 drawing a circular (the circle of the dot-dash line) trace of a radius R1 centered on the shaft 72.

The drive motor support frame 68 is fixed to the apparatus main body 12 by a fixing unit 74. Accordingly, the rotation which is centered on the shaft 72 of the drive motor support frame 68 is also stopped. The fixing unit 74 is configured as a screw, for example.

In the present example, since the drive motor support frame 68 is configured to be capable of rotating around the shaft 72, when the drive motor support frame 68 is fixed to the apparatus main body 12 by the fixing unit 74, even if the attachment position deviates from a predetermined attachment position (attachment angle) within a range of an assembly error, the distance R1 between the drive shaft of the drive motor 54 which is attached to the drive motor support frame 68 and the shaft 72 is maintained at a fixed level. As a result, since the inter-shaft distance between a drive gear 76 (FIG. 7) and the sun gear 70 which are provided in the drive motor 54 is determined precisely, it is possible to stabilize the meshing between the gears. Accordingly, it is possible to reduce the driving sound (the sound of interference between the teeth of the gears) of the gears which is generated during the rotation of the drive motor 54.

As illustrated in FIGS. 4, 20, and 22, a rotary scale 102 is attached to the opposite side from the side on which the drive gear 76 is provided in the drive motor 54. An encoder sensor 104 which receives a portion of the rotary scale 102 to detect the rotation amount of the rotary scale 102 is provided on the apparatus main body 12. In the present example, the control unit 52 monitors the rotation amount of the rotary scale 102, that is, the driving amount of the drive motor 54 via the encoder sensor 104.

Next, referring to FIGS. 7 and 9, in the apparatus width direction, the switching mechanism 56 is provided on the right side of the drive motor support frame 68. The switching mechanism 56 is provided with the sun gear 70, a first planet gear 78A which serves as a "planet gear", a second planet gear 78B which serves as a "planet gear", a rotational movement member 80, and the regulating member 64.

Referring to FIG. 10, the sun gear 70 is attached to the shaft 72 to be capable of rotating. As illustrated in FIG. 7, the sun gear 70 engages with the drive gear 76 which is provided on the drive shaft of the drive motor 54. In other words, the sun gear 70 is rotationally driven by the drive motor 54 via the drive gear 76. In the present example, the sun gear 70 is configured as a composite gear, and, for example, is provided with a gear which meshes with the drive gear 76 and a gear which meshes with the first planet gear 78A and the second planet gear 78B along the axial line direction.

The rotational movement member 80 is inserted into the shaft 72. The rotational movement member 80 is capable of rotating with respect to the shaft 72. The first planet gear 78A is attached to the top end portion of the rotational movement member 80 to be capable of rotating. The first planet gear 78A meshes with the sun gear 70. Similarly, the second planet gear 78B is attached to the bottom end portion of the rotational movement member 80 to be capable of rotating. The second planet gear 78B also meshes with the sun gear 70. A regulated portion 80a which protrudes from the rotational movement member 80 is provided on the rotational movement member 80.

Referring to FIG. 10, a first meshed gear 82 is provided in a position at which meshing with the first planet gear 78A is possible. The drive force of the drive motor 54 is transmitted to the first meshed gear 82 in a state in which the first meshed gear 82 meshes with the first planet gear 78A. Referring to FIG. 15, a second meshed gear 84 is provided in a position at which meshing with the second planet gear 78B is possible. The drive force of the drive motor 54 is transmitted to the second meshed gear 84 in a state in which the second meshed gear 84 meshes with the second planet gear 78B.

In FIG. 23, a description will be given of the motive force transmission path from the first meshed gear 82 to the feed roller 34. In a state in which the first meshed gear 82 meshes with the first planet gear 78A, the first meshed gear 82 transmits the drive force of the drive motor 54 in the order of a gear 106, a gear 108, a gear 110, a gear 112, and a gear 114. The gear 114 meshes with a sun gear 116a of a planet gear unit 116. The planet gear unit 116 is provided with the sun gear 116a, a planet gear 116b, and a planet gear 116c. The planet gear 116b and the planet gear 116c are configured to be capable of rotational movement around the sun gear 116a. For example, the gear 108 and the gear 110 are configured to have the same shaft and to rotate in the same direction.

In the present example, when the planet gear 116b and the planet gear 116c rotationally move around the sun gear 116a in a counterclockwise direction in FIG. 23, the planet gear 116c meshes with a gear 120. The gear 120 meshes with a gear 118 and transmits the drive force of the drive motor 54, which is transmitted to the gear 120, to the gear 118. Here, in a case in which the first meshed gear 82 is rotationally driven in a counterclockwise direction in FIG. 23 (a first motive force transmission state which is described later), the gear 118 is rotationally driven in a clockwise direction in FIG. 23 by the planet gear 116c and the gear 120. In this state, the planet gear 116b is in a state of not meshing with the gear 118.

Meanwhile, when the planet gear 116b and the planet gear 116c rotationally move around the sun gear 116a in the clockwise direction in FIG. 23, the planet gear 116b meshes with the gear 118 and transmits the drive force of the drive motor 54 to the gear 118. In this state, the planet gear 116c is in a state of not meshing with the gear 120.

Here, when the first meshed gear 82 is rotationally driven in the clockwise direction in FIG. 23 (a second motive force transmission state which is described later), the gear 118 is rotationally driven in the clockwise direction in FIG. 23 by the planet gear 116b.

Therefore, regardless of the rotation direction of the first meshed gear 82, the gear 118 rotates in a predetermined direction in a case in which the drive force is transmitted from the planet gear 116c via the planet gear 116b or the gear 120. In the present example, the gear 118 is configured to transmit the drive force to the feed roller 34. Accordingly, whichever case of the first motive force transmission state and the second motive force transmission state the feed roller 34 is in, the feed roller 34 is caused to rotate in the direction in which the medium P is transported to the downstream side in the transport direction (the counterclockwise direction in FIG. 2).

Regarding Switching of Motive Force Transmission State in Switching Mechanism

Next, a description will be given of the motive force switching of the drive motor 54 by the switching mechanism 56 with reference to FIGS. 7 and 10 to 19. In the present example, the motive force of the drive motor 54 can be selectively switched to any of a first motive force transmission state, a second motive force transmission state, a third motive force transmission state, and a fourth motive force transmission state by the switching mechanism 56.

Regarding First Motive Force Transmission State

First, a description will be given of the first motive force transmission state. Referring to FIG. 7, the carriage 40 is in a state in which the engaged portion 40a is positioned at a position at which the engaged portion 40a does not engage with the engagement portion 64a of the regulating member 64. In this state, the regulating member 64 is biased to the left in the apparatus width direction by the biasing force of the biasing unit 66 and is positioned at a left end portion of a region in which the regulating member 64 is capable of sliding in the apparatus width direction. The first regulating portion 64c of the regulating member 64 is positioned at a position at which the first regulating portion 64c is capable of engaging with the regulated portion 80a of the rotational movement member 80 in the apparatus width direction. This position in the apparatus width direction of the regulating member 64 is a third position. A description is already given of the first position and the second position; however, further description will be given later.

Referring to FIG. 10, the first planet gear 78A and the first meshed gear 82 are in a meshing state. In the present example, the state in which the first planet gear 78A and the first meshed gear 82 are meshing is a first meshing state. In a state in which the regulating member 64 is positioned at the third position, when the sun gear 70 starts the rotation in the clockwise direction (hereinafter referred to as forward rotation) due to the drive motor 54, the first planet gear 78A rotates in the reverse direction with respect to the sun gear 70, that is, rotates in the counterclockwise direction. Here, in the present example, for example, a biasing unit (not illustrated) is provided inside the planet gear 78B and the planet gear 78B is configured to receive lateral pressure from the rotational movement member 80. Accordingly, when the sun gear 70 is caused to rotate forwardly, the planet gear 78B receives the lateral pressure (a load) of the biasing unit (not illustrated) and rotationally moves in the clockwise direction with the rotational movement member 80 while rotating in the counterclockwise direction. In other words, the rotational movement member 80 is configured to rotationally move in the same direction as the rotation direction of the sun gear 70.

As a result, the rotational movement member 80 rotationally moves in the clockwise direction with respect to the shaft 72. Accordingly, the regulated portion 80a of the rotational movement member 80 pushes against the top surface of the first regulating portion 64c (FIGS. 10 and 12). The first regulating portion 64c regulates the rotational movement in the clockwise direction of the rotational movement member 80.

Since the rotational movement of the rotational movement member 80 is regulated by the first regulating portion 64c, the meshing state between the first planet gear 78A and the first meshed gear 82 is maintained. The first meshed gear 82 receives the motive force from the first planet gear 78A to be caused to rotate in the clockwise direction. The first meshed gear 82 transmits the motive force of the drive motor 54 to the feed roller 34 via a plurality of gears (not illustrated). Accordingly, the feed roller 34 is caused to rotate in a direction in which the medium P is transported to the downstream side in the transport direction (the counterclockwise direction in FIG. 2). A state in which the motive force is transmitted to the feed roller 34 by the switching mechanism 56 is the first motive force transmission state.

Regarding Second Motive Force Transmission State

Next, at the third position (FIG. 12), when the sun gear 70 starts the rotation in the counterclockwise direction (hereinafter referred to as reverse rotation) due to the drive motor 54 as illustrated in FIG. 11, the first planet gear 78A and the second planet gear 78B rotate in the reverse direction with respect to the sun gear 70, that is, rotate in the clockwise direction. The rotational movement member 80 rotationally moves in the counterclockwise direction with respect to the shaft 72 through the rotation of the first planet gear 78A and the second planet gear 78B in the clockwise direction. Accordingly, the regulated portion 80a of the rotational movement member 80 rotationally moves in a direction in which the regulated portion 80a is separated from the first regulating portion 64c.

Through the rotational movement of the rotational movement member 80 in the counterclockwise direction, the first planet gear 78A is pressed toward the first meshed gear 82. The first meshed gear 82 receives the motive force from the first planet gear 78A to be caused to rotate in the counterclockwise direction. The first meshed gear 82 transmits the motive force of the drive motor 54 to the pickup roller 28 and the feed roller 34 via a plurality of gears (not illustrated). Accordingly, the pickup roller 28 and the feed roller 34 are caused to rotate in a direction in which the medium P is transported to the downstream side in the transport direction (the counterclockwise direction in FIG. 2). A state in which the motive force is transmitted to the pickup roller 28 and the feed roller 34 by the switching mechanism 56 is the second motive force transmission state. In the second motive force transmission state, since the first planet gear 78A is pressed toward the first meshed gear 82, the meshing deepens and it is possible to withstand a heavy motive force transmission load as compared to the first motive force transmission state.

Next, referring to FIG. 13, the carriage 40 is moved rightward in the apparatus width direction (the first direction). Accordingly, the engaged portion 40a of the carriage 40 engages with the engagement portion 64a of the regulating member 64. In the state in which the engaged portion 40a is engaged with the engagement portion 64a, when the carriage 40 is moved rightward in the apparatus width direction, the regulating member 64 moves by sliding rightward in the apparatus width direction against the biasing force of the biasing unit 66. As illustrated in FIG. 13, when the regulating member 64 is moved rightward in the apparatus width direction, a state is assumed in which the operation allowance portion 64d of the regulating member 64 moves to a position which overlaps the position of the regulated portion 80a of the rotational movement member 80 in the apparatus width direction. This position of the regulating member 64 in the apparatus width direction is the second position.

At the second position, when the sun gear 70 of the switching mechanism 56 of the first meshing state is caused to rotate forward, the rotational movement member 80 rotationally moves in the clockwise direction in FIG. 10. At this time, since the regulated portion 80a of the rotational movement member 80 is positioned at the operation allowance portion 64d, the regulated portion 80a is displaced from the top side to the bottom side of the first regulating portion 64c in the apparatus height direction without being regulated by the regulating member 64.

In a state in which the regulated portion 80a is displaced to the bottom side of the first regulating portion 64c in the apparatus height direction, when the carriage 40 is further moved rightward in the apparatus width direction (the first direction), the regulating member 64 also moves rightward in the apparatus width direction from the second position. Accordingly, as illustrated in FIG. 14, in the apparatus width direction, the position of the second regulating portion 64e of the regulating member 64 is a position at which it is possible to engage with the regulated portion 80a of the rotational movement member 80. This position of the regulating member 64 in the apparatus width direction is the first position. In FIG. 14, the carriage 40 is in a state of being positioned at the right end portion of the movement region in the apparatus width direction of the carriage 40, that is, at the home position.

Regarding Third Motive Force Transmission State

Next, a description will be given of the third motive force transmission state with reference to FIG. 15. FIG. 15 illustrates a state in which the rotational movement member 80 rotationally moves in the clockwise direction and the second planet gear 78B meshes with the second meshed gear 84. In the present example, the state in which the second planet gear 78B and the second meshed gear 84 are meshing is a second meshing state.

In the second meshing state (FIG. 15) and a state in which the regulating member 64 is positioned at the first position (FIG. 14), when the sun gear 70 starts the forward rotation (the rotation in the clockwise direction) due to the drive motor 54, the first planet gear 78A and the second planet gear 78B rotate in the reverse direction with respect to the sun gear 70, that is, rotate in the counterclockwise direction. The rotational movement member 80 rotationally moves in the clockwise direction with respect to the shaft 72 through the rotation of the first planet gear 78A and the second planet gear 78B in the counterclockwise direction. Accordingly, the regulated portion 80a of the rotational movement member 80 separates from the bottom surface of the second regulating portion 64e.

Through the rotational movement of the rotational movement member 80 in the clockwise direction, the second planet gear 78B is pressed toward the second meshed gear 84. The second meshed gear 84 receives the motive force from the second planet gear 78B to be caused to rotate in the clockwise direction. The second meshed gear 84 transmits the motive force of the drive motor 54 to the gap adjustment unit 58 via a plurality of gears (not illustrated). In the present example, a state in which the motive force is transmitted to the gap adjustment unit 58 by the switching mechanism 56 is the third motive force transmission state. In the third motive force transmission state, since the second planet gear 78B is pressed toward the second meshed gear 84, the meshing deepens and it is possible to withstand a heavy motive force transmission load as compared to the fourth motive force transmission state (described later).

Describing the gap adjustment unit 58, when the motive force is transmitted to the guide shaft 46 (FIGS. 4 and 14) via a plurality of gears from the second meshed gear 84, the guide shaft 46 is caused to rotate. Here, eccentric cam members (not illustrated) are attached to both end portions in the apparatus width direction of the guide shaft 46. The pair of eccentric cam members (not illustrated) is supported by corresponding support members (not illustrated) which are provided on the apparatus main body 12. In other words, when the guide shaft 46 is caused to rotate, the distance between the center of the guide shaft 46 and the support members (not illustrated) in the apparatus height direction changes due to the eccentric cam members (not illustrated). As a result, the position (the height) in the apparatus height direction of the carriage 40 through which the guide shaft 46 is passed changes. Accordingly, the distance, that is, the gap between the head surface 44a of the recording head 44 which is provided on the bottom portion of the carriage 40 and the medium support unit 48 changes.

Regarding Fourth Motive Force Transmission State

Next, a description will be given of the fourth motive force transmission state with reference to FIGS. 16 and 17. In the second meshing state (FIG. 16) and a state in which the regulating member 64 is positioned at the first position (FIG. 14), when the sun gear 70 starts the reverse rotation (the rotation in the counterclockwise direction) due to the drive motor 54, the first planet gear 78A and the second planet gear 78B rotate in the reverse direction with respect to the sun gear 70, that is, rotate in the clockwise direction. The rotational movement member 80 rotationally moves in the counterclockwise direction with respect to the shaft 72 through the rotation of the first planet gear 78A and the second planet gear 78B in the clockwise direction. Accordingly, the regulated portion 80a of the rotational movement member 80 pushes against the bottom surface of the second regulating portion 64e (FIGS. 16 and 17). The second regulating portion 64e regulates the rotational movement in the counterclockwise direction of the rotational movement member 80.

Since the rotational movement of the rotational movement member 80 is regulated by the second regulating portion 64e, the meshing state between the second planet gear 78B and the second meshed gear 84 is maintained. The second meshed gear 84 receives the motive force from the second planet gear 78B to be caused to rotate in the counterclockwise direction. The second meshed gear 84 transmits the motive force of the drive motor 54 to the ink system 60 via a plurality of gears (not illustrated). A state in which the motive force is transmitted to the ink system 60 by the switching mechanism 56 is the fourth motive force transmission state.

Here, a description will be given of the ink system 60 with reference to FIGS. 18 to 20. The ink system 60 is provided with a suction pump 86, a cap driving unit 88, a cap 90, and a wiper 92. As illustrated in FIG. 20, the ink system 60 is disposed on the right end portion in the apparatus width direction. As illustrated in FIG. 18, the ink system 60 is disposed on the bottom portion of the apparatus main body 12 in the apparatus height direction.

In the ink system 60, the suction pump 86 is disposed on the rear side in the apparatus depth direction and the cap driving unit 88, the cap 90, and the wiper 92 are disposed on the front side of the suction pump 86 in the apparatus depth direction. The cap 90 is connected to the suction pump 86 by a waste ink tube 94. The guide shaft 46 which guides the carriage 40 is disposed on the top side of the suction pump 86 in the apparatus height direction.

The cap 90 is disposed at the home position of the carriage 40 in the apparatus width direction and is disposed to face the head surface 44a of the recording head 44 on the bottom side of the recording head 44. The cap 90 is configured to be capable of switching between an uncapped state (FIG. 18) in which the cap 90 is separated from the head surface 44a of the recording head 44 by the cap driving unit 88 and a capped state (FIG. 19) in which the cap 90 is in contact with the head surface 44a.

Referring to FIG. 20, the wiper 92 is disposed on the left of the cap 90 in the apparatus width direction. The wiper 92 is configured to switch between a state (not illustrated) in which the wiper 92 protrudes toward the recording head 44 in the apparatus height direction and a state (FIG. 20) in which the wiper 92 separates from the recording head 44 according to the switching operation between the capped state and the uncapped state of the cap 90. In the present example, the operation of the wiper 92 is configured such that a time lag occurs so that the operation of the wiper 92 deviates from the operation of the cap 90.

FIG. 18 illustrates the third motive force transmission state. In this state, the motive force of the drive motor 54 is not transmitted to the ink system 60. Therefore, the cap 90 is in a state of being separated from the head surface 44a of the recording head 44, that is, the uncapped state. Meanwhile, since the motive force is not supplied to the gap adjustment unit 58, the guide shaft 46 rotates in a clockwise direction in order to adjust the gap.

Next, as illustrated in FIG. 19, when the motive force of the drive motor 54 is transmitted to the ink system 60 (the fourth motive force transmission state), the cap driving unit 88 displaces the cap 90 from the uncapped state (FIG. 18) which is a state in which the cap 90 is separated from the recording head 44 to the top side in the apparatus height direction and transitions the cap 90 to the capped state (FIG. 19) in which the cap 90 is in contact with the recording head 44. Accordingly, the head surface 44a of the recording head 44 is covered by the cap 90.

When the suction pump 86 is driven by the motive force of the drive motor 54, the suction pump 86 generates a negative pressure in the cap 90 via the waste ink tube 94 which connects the cap 90 to the suction pump 86. According to the negative pressure, the suction of the ink from the nozzles of the recording head 44 is performed and it is possible to relieve the clogging or the entrance of bubbles to the nozzles. The waste ink which is generated in the cap 90 is sucked by the suction pump 86 via the waste ink tube 94.

To summarize the above description, in the present example, by switching the motive force transmission state of the switching mechanism 56, it is possible to supply the motive force of the single drive motor 54 to a plurality of driving targets, and thus, it is possible to reduce the number of drive motors and it is possible to obtain a reduction in the cost. In the present example, when feeding the medium P, since it is possible to perform the switching between the second motive force transmission state in which the pickup roller 28 and the feed roller 34 are driven and the first motive force transmission state in which the feed roller 34 is driven by merely switching the rotation direction of the sun gear 70 and so the drive motor 54, it is possible to reduce mechanical sound in the motive force switching operation during the feeding of the medium P.

Regarding Surface Pressure Release Operation

Regarding Surface Pressure Release Operation in First Motive Force Transmission State Next, a description will be given of the surface pressure release operation in the first motive force transmission state (FIG. 10) and the fourth motive force transmission state (FIG. 16). First, a description will be given of the surface pressure release operation in the first motive force transmission state. As illustrated in FIG. 24, when starting the recording operation of the medium P, the control unit 52 assumes the second motive force transmission state, that is, causes the pickup roller 28 and the feed roller 34 to be rotationally driven to transport the medium P which is housed in the medium housing portion 26 to the downstream side in the transport direction. After transporting the medium P to the downstream side in the transport direction by a predetermined amount (at least a transport amount at which the leading end of the medium P is nipped by the feed roller 34 and the driven roller 36a), the control unit 52 switches from the second motive force transmission state (the state in which both the pickup roller 28 and the feed roller 34 are rotationally driven) to the first motive force transmission state (the state in which the pickup roller 28 is stopped and the feed roller 34 is rotationally driven) and transports the medium P.

The control unit 52 performs skew rectification control including bending control with respect to the medium P. Specifically, when the leading end of the medium P reaches the transport roller pair 38, the control unit 52 continues the rotation of the feed roller 34 in a state in which the transport roller pair 38 is caused to stop and pushes the leading end of the medium P into the transport roller pair 38. Accordingly, the medium P assumes a state (the state of the solid line which is given the reference numeral P-1 in FIG. 24) in which bending is formed between the feed roller 34 and the transport roller pair 38 in the medium transport path 32 as illustrated in FIG. 24. As a result, it is possible to suppress an oblique motion state, a so-called skewed state of the medium P.

In the state in which bending is formed in the medium P, the feed roller 34 maintains the bending state of the medium P against a force apt to return to the original state from the bending state of the medium P. Therefore, a state is assumed in which a load is applied to the feed roller 34. Here, the load which is applied to the feed roller 34 acts on the first planet gear 78A and the rotational movement member 80 via the gear 118 (FIG. 23) and the first meshed gear 82. As a result, the force of the regulated portion 80a of the rotational movement member 80 pushing against the top surface of the first regulating portion 64c, that is, the surface pressure (for example, the force generated between the regulated portion 80a and the first regulating portion 64c when the regulated portion 80a pushes against the first regulating portion 64c in FIG. 10) increases.

In this state, the control unit 52 rotationally drives the transport roller pair 38 to transport the medium P to a region facing the recording head 44 and performs the recording. At this time, there is a case in which the carriage 40 returns to the home position during the performance of the recording operation on the medium P and performs a flushing operation in which the ink is discharged from the nozzles of the recording head 44 toward the cap 90.

During the performance of the recording operation of the carriage 40, since the feed roller 34 (FIG. 2) transports the medium P to the downstream side in the transport direction according to the ink discharge operation from nozzle rows of the recording head 44, the switching mechanism 56 is in the first motive force transmission state (FIG. 10) in which the motive force is transmitted to the feed roller 34. In this state, when the carriage 40 is to be moved from the recording operation performance region (FIG. 7) to the home position (FIG. 14) in the apparatus width direction, the regulating member 64 also moves from the third position (FIG. 7) to the first position (FIG. 14).

Here, in the first motive force transmission state (FIG. 10), the regulated portion 80a of the rotational movement member 80 presses the top surface of the first regulating portion 64c. In this state, when the regulating member 64 moves from the left to the right in the apparatus width direction, that is, to the home position side, the regulated portion 80a enters the operation allowance portion 64d and impedes the movement of the regulating member 64 and so the carriage 40, or even, in the worst case, the regulating member 64 and the regulated portion 80a may be damaged.

Therefore, in a case in which the flushing is performed during the performance of the recording operation, initially, the rotation of the drive motor 54 is reversed to cause the rotation of the sun gear 70 which is rotating forward to rotate in reverse. Accordingly, the rotational movement member 80 starts rotational movement in the counterclockwise direction in FIG. 10. As a result, the regulated portion 80a which presses the top surface of the first regulating portion 64c until this time separates from the top surface of the first regulating portion 64c and the surface pressure which acts on the first regulating portion 64c until this time is released.

The carriage 40 is moved from the recording operation performance region (FIG. 7) to the home position (FIG. 14). At this time, since the regulated portion 80a separates from the top surface of the first regulating portion 64c and rotationally moves in the counterclockwise direction in FIG. 10, when the regulating member 64 transitions from the third position (FIG. 7) to the second position (FIG. 13), the regulated portion 80a does not enter the operation allowance portion 64d. Accordingly, the regulating member 64 is capable of moving from the third position (FIG. 7) to the first position (FIG. 14).

As a result, since the head surface 44a of the recording head 44 is positioned at a position facing the cap 90, it is possible to discharge the ink from the recording head 44 to perform the flushing. In this example, since the switching mechanism 56 maintains the first meshing state, the motive force is not supplied to the suction pump 86 and the suction of the discharged ink by the suction pump 86 via the cap 90 is not performed. In a case in which the suction of the ink which is discharged toward the cap 90 during the flushing is performed, when the regulating member 64 is positioned at the second position, it is possible to drive the suction pump 86 by causing the regulated portion 80a to rotationally move to switch the switching mechanism 56 from the first meshing state to the second meshing state to set the switching mechanism 56 to the fourth motive force transmission state.

In a case in which the medium P causes jamming inside the medium transport path 32, as described above, after performing the surface pressure release operation in the first motive force transmission state, the regulating member 64 is moved to the first position (FIG. 14), the rotation of the drive motor 54 is reversed again, and the rotation of the sun gear 70, which is rotating in reverse, is reversed to cause the sun gear 70 to rotate forward. Accordingly, the rotational movement member 80 starts the rotational movement in the clockwise direction in FIG. 10. As a result, the regulated portion 80a presses the top surface of the second regulating portion 64e at the first position. In this state, the motive force of the drive motor 54 is transmitted to the feed roller 34 and the feed roller 34 rotates. Accordingly, it is possible to promote the outputting of the medium P which causes jamming inside the medium transport path 32.

Regarding Surface Pressure Release Operation in Fourth Motive Force Transmission State First, a description will be given of the surface pressure release operation in the fourth motive force transmission state. In a state in which the carriage 40 is positioned at the home position and the switching mechanism 56 is in the fourth motive force transmission state, a wiping operation is started by the wiper 92. In a state in which the carriage 40 is positioned at a wiping completion position after the wiping operation, there is a case in which the suction pump 86 is caused to operate to suck the ink which remains inside the cap 90.

To give a more detailed description, when the switching mechanism 56 causes the sun gear 70 to rotate forward (to rotate in the clockwise direction in FIG. 16) in the fourth motive force transmission state (FIG. 16), the cap 90 is displaced to the bottom side in the apparatus height direction from the capped state (FIG. 19) and assumes the uncapped state (FIG. 18). At this time, in accordance with the operation of the cap 90, the wiper 92 also assumes a state of being lowered to the bottom side in the apparatus height direction from the state in which the wiper 92 protrudes to the recording head 44 side. Subsequently, when the sun gear 70 is caused to rotate in reverse (to rotate in the counterclockwise direction in FIG. 16) again to assume the fourth motive force transmission state, the wiper 92 is lifted before the cap 90 due to a time lag and assumes a state of protruding to the recording head 44 side.

In this state, that is, in the fourth motive force transmission state, the regulated portion 80a is pushed against the bottom surface of the second regulating portion 64e. In this state, when the carriage 40 is moved from the home position to the left in the apparatus width direction, the regulating member 64 also moves from the first position (FIG. 14) toward the second position (FIG. 13) and there is a case in which the regulated portion 80a enters the operation allowance portion 64d. Therefore, in order to avoid the regulated portion 80a entering the operation allowance portion 64d, the rotation of the sun gear 70 is caused to rotate forward to separate the regulated portion 80a from the bottom surface of the second regulating portion 64e. In other words, the surface pressure release operation is performed.

The wiping operation (the cleaning of the head surface 44a) of the head surface 44a of the recording head 44 is performed by the wiper 92 by moving the carriage 40 from the home position to the left in the apparatus width direction (the second direction) in a state in which the wiper 92 is in contact with the head surface 44a of the recording head 44. In accordance with this operation, the regulating member 64 moves from the first position (FIG. 14) to the third position (FIG. 7).

After the completion of the wiping operation, since a state is assumed in which the surface pressure of the regulated portion 80a is released, the sun gear 70 is caused to rotate in reverse (to rotate in the counterclockwise direction in FIG. 16) to push the regulated portion 80a against the bottom surface of the first regulating portion 64c. Accordingly, since the fourth motive force transmission state is assumed again in the switching mechanism 56, it is possible to operate the suction pump 86 to perform the suction of the ink which remains inside the cap 90. In a state in which the remaining ink inside the cap 90 is sucked, the carriage 40 is positioned at a position which is deviated to the left in the apparatus width direction from the position facing the cap 90.

Regarding Control of Surface Pressure Release

Here, to describe the control of the control unit 52 during the surface pressure release, the control unit 52 monitors the rotation amount of the drive motor 54 using the encoder sensor 104 and controls the rotation amount. In the present example, in order to release the surface pressure in the first motive force transmission state or the second motive force transmission state as described above, the rotation of the drive motor 54 is switched to the reverse direction in each state. At this time, for example, when the drive motor 54 is driven to rotate in reverse more than necessary in the first motive force transmission state, the state of the meshing between the planet gear 116c and the gear 120 is released and the feed roller 34 assumes a state of being capable of rotating freely (a neutral state). As a result, the feed roller 34 is pushed by the medium P, rotates in the reverse direction from the transport direction, it is not possible to maintain the bending of the medium P between the feed roller 34 and the transport roller pair 38, and the bending state of the medium P assumes a reduced or lost state. As a result, a disturbance arises in the transport speed of the medium P and the transport precision of the medium P worsens.

When the reverse rotation driving amount of the drive motor 54 increases, the first motive force transmission state switches to the second motive force transmission state, the pickup roller 28 also assumes a rotating state, a state is assumed in which the medium P is pushed from the upstream side in the transport path, and the transport precision of the medium P worsens.

Here, the reverse rotation driving amount of the drive motor 54 which is necessary for the surface pressure release is set to A (hereinafter referred to as a surface pressure release necessary reverse rotation driving amount). The surface pressure release necessary reverse rotation driving amount A is reduced as the medium P is transported to the downstream side in the transport direction in accordance with the recording operation. This is because the bending amount between the feed roller 34 and the transport roller pair 38 is reduced according to the transporting of the medium P and the surface pressure is also reduced.

Meanwhile, the reverse rotation driving amount at which the meshing state between the planet gear 116c and the gear 120 is released and the feed roller 34 assumes a state of being capable of freely rotating (the neutral state) is set to B (hereinafter referred to as a feed roller neutral driving amount). In the present example, the surface pressure release necessary reverse rotation driving amount A and the feed roller neutral driving amount B are in a relationship of A<B.

In FIG. 25, the curved line which is given the reference numeral B schematically illustrates the change in the feed roller neutral driving amount B of the feed roller 34. In FIG. 25, the curved line which is given the reference numeral A schematically illustrates the change in the surface pressure release necessary reverse rotation driving amount A. The horizontal axis of FIG. 25 illustrates the transport amount of the medium P after the recording is started and each of the passes, the first pass and the second pass, means a single movement operation (one way or reciprocal) of the carriage 40. The vertical axis illustrates the reverse rotation driving amount of the drive motor 54.

A reverse rotation driving amount C-1 is a value which is set as the driving amount of the drive motor 54 at which the drive motor 54 is caused to rotate in reverse during the recording operation of the medium P to release the surface pressure. In the present example, for example, the reverse rotation driving amount C-1 is set in a range which does not exceed a minimum value B-2 of the feed roller neutral driving amount B during the performance of the recording operation as illustrated in FIG. 25. The reverse rotation driving amount C-1 is set in a range which is greater than the surface pressure release necessary reverse rotation driving amount A and does not exceed the switching driving amount from the first motive force transmission state to the second motive force transmission state in the drive motor 54 (the driving amount at which the pickup roller 28 and the feed roller 34 enter the rotating state).

However, in the initial pass, that is, the first pass when starting the recording operation of the medium P, since the bending amount of the medium P is great, the surface pressure release necessary reverse rotation driving amount A also increases. In FIG. 25, the surface pressure release necessary reverse rotation driving amount A in the first pass is A-1. Therefore, during the performance of the recording operation, there is a concern that the sufficient surface pressure releasing may not be performed in the first pass with the reverse rotation driving amount C-1 which is the optimal reverse rotation driving amount. Therefore, in the present example, the reverse rotation driving amount in the first pass when starting the recording operation is set to the reverse rotation driving amount C-2 which is greater than the reverse rotation driving amount C-1. The reverse rotation driving amount C-2 is set to be smaller than the feed roller neutral driving amount B-1 in the first pass such that the feed roller 34 does not assume the neutral state. More specifically, as illustrated in FIG. 25, the reverse rotation driving amount C-2 is set to a value greater than or equal to the surface pressure release necessary reverse rotation driving amount A-1 in the first pass. It is preferable that the reverse rotation driving amount C-2 be set to a value greater than the surface pressure release necessary reverse rotation driving amount A-1 in a range not exceeding the feed roller neutral driving amount B, that is, a value having slack with respect to the surface pressure release necessary reverse rotation driving amount A-1.

For example, in a case in which the recording operation of the medium P is completed, the control unit 52 may set the reverse rotation driving amount for releasing the surface pressure to C-3 which is greater than C-1 and C-2. In other words, in a case in which the medium P is output, even if the feed roller 34 assumes the neutral state, the recording on the medium P is completed and there is no influence on the recording quality of the medium P, therefore, the reverse rotation driving amount of the surface pressure release can be made larger than the feed roller neutral driving amount B in order to prioritize the surface pressure release. Accordingly, it is possible to perform the surface pressure release more accurately.

In FIG. 26, a description is given of the flow of the surface pressure release during the recording operation. In the following description, for example, the description will be given with the surface pressure release in the first motive force transmission state as a premise. After starting the recording operation (step S1), the control unit 52 monitors whether or not it is necessary to move the carriage 40 to the home position (HP) side, that is, in the −X direction to a position at which the operation allowance portion 64d passes through the position of the regulated portion 80a (step S2).

The recording operation in step S1 includes an ink discharging operation in the recording head 44 onto the medium P in the first pass such as a medium transport operation (a cuing operation) in which the control unit 52 transports the medium P to the region facing the recording head 44 after the skew rectification control which includes the bending control.

In a case in which the control unit 52 determines that it is necessary to move the carriage 40 to the home position side to a position at which the operation allowance portion 64d passes through the position of the regulated portion 80a (Yes in step S2), the control unit 52 determines what kind of pass the pass of the carriage 40 is (step S3).

In a case in which the pass of the carriage 40 is the first pass, the reverse rotation driving amount is set to C-2 (FIG. 25) (step S4). In a case in which the pass of the carriage 40 is recording in the second pass or later, the reverse rotation driving amount is set to C-1 (FIG. 25) (step S5). In a case in which the pass of the carriage 40 is the second pass or later and the recording is completed, the reverse rotation driving amount is set to C-3 (FIG. 25) (step S6).

In a case in which borderless recording is performed on the medium P, examples of a case in which the carriage 40 is moved to the home position side to a position at which the operation allowance portion 64d passes through the position of the regulated portion 80a include an operation for detecting a side edge of the home position side of the medium P and a flushing operation in which nozzle clogging prevention is performed by discharging the ink into the cap 90 (FIG. 19). When performing these operations, it is necessary to release the surface pressure of the first motive force transmission state in the switching mechanism 56.

Next, the control unit 52 performs the surface pressure release operation based on one of the reverse rotation driving amounts C-1, C-2, and C-3 which are set (step S7). Specifically, the control unit 52 switches the rotation direction of the drive motor 54 from the forward rotation direction to the reverse rotation direction and drives the drive motor 54 by the driving amount of one of the reverse rotation driving amounts C-1, C-2, and C-3 which are set to release the surface pressure.

Next, after releasing the surface pressure, the control unit 52 moves the carriage 40 to the home position side (step S8). At this time, the control unit 52 monitors the drive load of the carriage drive motor 98, for example, monitors whether the voltage value or the current value of the carriage drive motor 98 is less than a predetermined threshold (step S9).

In a case in which the drive load of the carriage drive motor 98 is less than the predetermined threshold (Yes in step S9), the control unit 52 continues the movement of the carriage 40 to the home position side and subsequently performs a predetermined operation (the side edge detection, the flushing operation, or the like) (step S10).

After performing the predetermined operation, for step S11, the control unit 52 returns the carriage 40 to the recording performance region from the home position side, and in a case in which the recording is not completed (No in step S12), the control unit 52 restarts the recording operation. In a case in which the recording is completed (Yes in step S12), the carriage 40 may be held at the home position in this state.

Here, in step S9, in a case in which the drive load of the carriage drive motor 98 exceeds the predetermined threshold (No in step S9), the control unit 52 performs a lock release operation for step S13. A description will be given later of the lock release operation; however, the lock release operation of step S13 and step S8 which is subsequently performed again configure the "retry operation" of the invention.

After performing the lock release operation, the control unit 52 checks a performance count of the lock release operation for step S14. In a case in which the performance count of the lock release operation is less than or equal to a predetermined count (n times) (No in step S14), the process returns to step S8.

In a case in which the performance count of the lock release operation exceeds the predetermined count (n times) (Yes in step S14), the control unit 52 assumes an error state and completes the operation.

Regarding Retry Operation

Next, in FIGS. 27 to 30, for example, a description will be given of the lock release operation in a case in which the surface pressure release operation fails in the first motive force transmission state (a case of No in step S9 of FIG. 26). Hereinafter, in the top portion of FIG. 28, it is assumed that the carriage 40 is moved to the home position side in a state (a state in which the pressing of the first regulating portion 64c by the regulated portion 80a is maintained) in which the surface pressure release is not sufficiently performed in the surface pressure release operation in the first motive force transmission state (the state in which the regulated portion 80a presses the first regulating portion 64c). The top portion of FIG. 28 illustrates the third position of the regulating member 64.

Accordingly, for example, as illustrated in the top portion of FIG. 29, the regulated portion 80a of the rotational movement member 80 assumes a state in which the regulated portion 80a enters the operation allowance portion 64d of the regulating member 64 due to the surface pressure. Remaining in this state, when the carriage 40 is moved to the home position side, as illustrated in the middle portion of FIG. 28, the regulated portion 80a assumes a state of being in contact with the second regulating portion 64e. When the movement of the carriage 40 to the home position side is continued in this state, the regulated portion 80a enters a state of being pressed by the second regulating portion 64e and a state is assumed in which the movement of the carriage 40 to the home position side is regulated (a locked state). As a result, the drive load of the carriage drive motor 98 assumes a state of exceeding a predetermined load (a state of exceeding a predetermined threshold).

In this case, the control unit 52 attempts the restoration of the carriage 40 to the ordinary state after once returning the carriage 40 a little. Specifically, in step S15 of FIG. 27, the carriage drive motor 98 is caused to rotate in the second rotation direction by a predetermined amount. Accordingly, as illustrated in the bottom portion of FIG. 28, the carriage 40 moves by a predetermined amount to the recording region side of the opposite side from the home position and the contact state between the regulated portion 80a and the second regulating portion 64e (the locked state) is released.

Next, in step S16, the control unit 52 switches the rotation direction of the drive motor 54 from the reverse rotation direction (the rotation direction during the surface pressure release operation in the first motive force transmission state) to the forward rotation direction and causes the drive motor 54 to rotate in the forward rotation direction by a predetermined first driving amount. Here, the first driving amount is the driving amount of the drive motor 54 in a case in which the motive force transmission state is switched from a state in which the first planet gear 78A meshes with the first meshed gear 82 in the switching mechanism 56 (the second motive force transmission state) to a state in which the second planet gear 78B meshes with the second meshed gear 84 (the third motive force transmission state).

Accordingly, as illustrated in the middle portion of FIG. 29, the rotational movement member 80 rotationally moves in the clockwise direction, leaves the operation allowance portion 64d from a state in which the regulated portion 80a enters the operation allowance portion 64d, and the position of the regulated portion 80a is displaced to the position of a case in which the third motive force transmission state is assumed.

Next, for step S17, the control unit 52 switches the rotation direction of the drive motor 54 from the forward rotation direction to the reverse rotation direction as illustrated in the bottom portion of FIG. 29 and causes the drive motor 54 to rotate in the reverse rotation direction by a predetermined second driving amount. Here, the second driving amount is set to a driving amount at which the position of the regulated portion 80a of the rotational movement member 80 is displaced from the position in the third motive force transmission state to a position at which the regulated portion 80a leaves the operation allowance portion 64d and the surface pressure in the first motive force transmission state is released. For step S18, the control unit 52 switches the rotation direction of the carriage drive motor 98 from the second rotation direction to the first rotation direction and rotationally drives the carriage drive motor 98. Accordingly, a state is assumed in which the movement of the carriage 40 to the home position side (step S8 of FIG. 26) may be restarted.

As a result, as illustrated by the change from the top portion to the bottom portion of FIG. 30, the restricting member 64 is capable of switching from the third position to the first position.

Regarding Purpose of Providing Operation Allowance Portion

Next, a description will be given of the purpose of providing the operation allowance portion 64d in the regulating member 64. Referring to FIG. 21, an engagement portion 96a which engages with the carriage 40 is provided on the end portion of the right in the apparatus width direction (the first direction) of a regulating member 96. The regulating member 96 is provided to extend along the apparatus width direction, and a regulating portion 96b which regulates the regulated portion 80a of the rotational movement member 80 is provided on the end portion of the left in the apparatus width direction (the second direction). In other words, a configuration is adopted in which the regulating member 96 is not provided with an operation allowance portion.

The top portion of FIG. 21 illustrates a state in which the carriage 40 is positioned closer to the left in the apparatus width direction (the second direction) than the home position. In this state, the regulated portion 80a is regulated by the regulating portion 96b. The middle portion of FIG. 21 illustrates a state in which the carriage 40 is positioned at the home position. Even in this state, the regulated portion 80a is regulated by the regulating portion 96b. The bottom portion of FIG. 21 illustrates a state in which the carriage 40 further moves from the home position to the right in the apparatus width direction (the first direction) side, the carriage 40 engages with the engagement portion 96a of the regulating member 96, and the engagement portion 96a is pressed to the right in the apparatus width direction (the first direction) such that the regulating member 96 is moved to the right in the apparatus width direction (the first direction).

The regulating state of the regulated portion 80a of the regulating portion 96b is released due to the regulating member 96 moving to the right in the apparatus width direction. Accordingly, even in the switching mechanism which uses the regulating member 96, it is possible to switch between the first meshing state and the second meshing state, and thus, it is possible to perform the switching between the first motive force transmission state, the second motive force transmission state, the third motive force transmission state, and the fourth motive force transmission state by causing the rotation of the drive motor 54 to be forward rotation or reverse rotation.

However, in the switching mechanism which uses the regulating member 96, if the carriage 40 is not moved from the home position further to the right in the apparatus width direction (the first direction), that is, to a position on the outside with respect to the home position, it is not possible to perform the switching of the motive force transmission and the movement region of the carriage 40 in the apparatus width direction increases in size. As a result, the apparatus size in the apparatus width direction increases.

To handle this, in the present example, by providing the operation allowance portion 64d, which has a recessed shape, between the first regulating portion 64c and the second regulating portion 64e in the regulating member 64, it is possible to switch between the first meshing state and the second meshing state of the switching mechanism 56 at a position closer to the inside than the home position in the movement region of the carriage 40. As a result, it is no longer necessary to move the carriage 40 to the outside of the home position and it is possible to obtain a reduction in the size of the apparatus in the apparatus width direction.

Modification Example (1) In the present example, in the regulating member 64, a configuration is adopted in which the top surface of the first regulating portion 64c is used in the regulation of the regulated portion 80a in the first meshing state and the bottom surface of the second regulating portion 64e is used in the regulation of the regulated portion 80a in the second meshing state; however, instead of this configuration, the bottom surface of the first regulating portion 64c may be used in the regulation of the regulated portion 80a in the first meshing state, the top surface of the second regulating portion 64e may be used in the regulation of the regulated portion 80a in the second meshing state, and further, the number of driving targets of the drive motor 54 may be increased using the bottom surface of the first regulating portion 64c and the top surface of the second regulating portion 64e in addition to the top surface of the first regulating portion 64c and the bottom surface of the second regulating portion 64e.

(2) In the present example, the values of the reverse rotation driving amount of the drive motor 54 are set to C-1, C-2, and C-3 for the surface pressure release and the rotation of the drive motor 54 is controlled using the values which are set during the recording operation and the output operation of the medium P, respectively, to perform the surface pressure release operation; however, in addition, the control in which the surface pressure is lowered may be performed by adjusting the bending amount of the medium P, for example. This is because when the surface pressure is high, the surface pressure release necessary reverse rotation driving amount A in the drive motor 54 also increases.

Here, b reducing the bending of the medium P, it is possible to lower the surface pressure. In the present modification example, bending control is performed in the skew rectification control, bending is generated in the medium P, and the oblique motion of the medium P is reduced. Subsequently, the surface pressure is lowered by reducing the bending. Specifically, there is a method of reducing the bending by driving the transport drive roller 38a in a state in which the feed roller 34 is stopped, a method of introducing a difference in the medium transport speeds of the feed roller 34 and the transport drive roller 38a, and a method of using both aforementioned methods.

In FIG. 31, a description is given of the method of introducing a difference in the medium transport speeds of the feed roller 34 and the transport drive roller 38a. The horizontal axis of FIG. 31 illustrates the drive time of the rollers and the vertical axis is the coordinate axis extending upward on the paper surface and illustrates the medium transport speed.

Initially, the transport drive roller 38a is rotationally driven at a speed V1. Next, the feed roller 34 is driven at a speed V2 with a delay of a time t1 with respect to the transport drive roller 38a. In the present modification example, the relationship between the speeds is V1>V2. Here, since the transport drive roller 38a is rotationally driven while the feed roller 34 is stopped, the leading end of the medium P is transported to the downstream side in the transport direction by the transport roller pair 38 and the bending is reduced. Since even if the feed roller 34 is rotationally driven after the time t1, the medium transport speed V2 of the feed roller 34 is slower than the medium transport speed V1 of the transport drive roller 38a, the bending is further reduced. As a result, since a state is assumed in which the bending of the medium P is reduced at the start of the recording operation of the medium P, it is possible to reduce the surface pressure release necessary reverse rotation driving amount A and it is possible to reliably release the surface pressure.

(3) In the present example, the control method of the surface pressure release in the first motive force transmission state may also be used in the surface pressure release in the fourth motive force transmission state.

To summarize the above description, the printer 10 is provided with the carriage 40 which includes the recording head 44 that performs recording on the medium P and which moves to the right in the apparatus width direction which is the first direction and to the left in the apparatus width direction which is the second direction that is an opposite direction from the first direction, the drive motor 54 which is the motive force source that is shared by a plurality of driving targets, and the switching mechanism 56 which switches the motive force transmission state from the drive motor 54, in which the switching mechanism 56 includes the sun gear 70 which is driven by the drive motor 54, the planet gears 74A and 74B which perform planetary motion around the sun gear 70, the rotational movement member 80 which includes the planet gears 74A and 74B and causes the planet gears 74A and 74B to perform planetary motion by rotationally moving, and the regulating member 64 which engages with the regulated portion 80a which is provided in the rotational movement member 80 to regulate the rotational movement of the rotational movement member 80 and is capable of moving to the right in the apparatus width direction which is the first direction and to the left in the apparatus width direction which is the second direction, in which the regulating member 64 includes, in order from the right side in the apparatus width direction which is the first direction to the left in the apparatus width direction which is the second direction, the first regulating portion 64c which is capable of engaging with the regulated portion 80a, the operation allowance portion 64d which allows the operation of the regulated portion 80a, and the second regulating portion 64e which is capable of engaging with the regulated portion 80a, in which the carriage 40 is provided to be capable of engaging with the regulating member 64 and displaces the regulating member 64 according to movement of the carriage 40, in which the regulating member 64 is positioned at a first position at which the second regulating portion 64e is capable of engaging with the regulated portion 80a when the carriage 40 is positioned at an end portion on the right in the apparatus width direction which is the first direction, and, as the carriage 40 moves from the end portion on the right in the apparatus width direction which is the first direction to the left in the apparatus width direction which is the second direction, is displaced in order of a second position at which the operation allowance portion 64d is capable of receiving the regulated portion 80a and a third position at which the first regulating portion 64c is capable of engaging with the regulated portion 80a.

According to this configuration, the regulating member 64 is configured such that when the carriage 40 is positioned at the end portion on the right in the apparatus width direction which is the first direction, the regulating member 64 is positioned at the first position at which the second regulating portion 64e is capable of engaging with the regulated portion 80a, and as the carriage 40 moves from the end portion on the right in the apparatus width direction which is the first direction to the left in the apparatus width direction which is the second direction, the regulating member 64 is displaced in order of the second position at which the operation allowance portion 64*d* is capable of receiving the regulated portion 80*a* (that is, a position at which it is possible to switch the motive force transmission state) and the third position at which the first regulating portion 64*c* is capable of engaging with the regulated portion 80*a*. In other words, since the second position of the regulating member 64 at which it is possible to switch the motive force transmission state can be assumed when the carriage 40 moves from the end portion on the right in the apparatus width direction which is the first direction to the left side in the apparatus width direction which is the second direction, it is not necessary for the carriage 40 to move further to the outside than the end portion of the first direction when switching the motive force transmission state and it is possible to suppress the enlargement of the movement region of the carriage 40.

The printer 10 is provided with the biasing unit 66 which biases the regulating member 64 to the left in the apparatus width direction which is the second direction. According to this configuration, the regulating member 64 is capable of reliably maintaining the first position even in a state in which the engagement between the regulating member 64 and the carriage 40 is released, in other words, even in a state in which the carriage 40 moves from the end portion on the right in the apparatus width direction which is the first direction to the left side in the apparatus width direction which is the second direction. In other words, it is possible to reliably maintain the motive force transmission state.

The printer 10 is provided with the first planet gear 78A and the second planet gear 78B as the planet gears 78A and 78B, and the first meshed gear 82 which meshes with the first planet gear 78A to obtain motive force and the second meshed gear 84 which meshes with the second planet gear 78B to obtain motive force, in which it is possible to switch between the first meshing state in which the first planet gear 78A meshes with the first meshed gear 82 and the second meshing state in which the second planet gear 78B meshes with the second meshed gear 84 due to rotational movement of the rotational movement member 80, in which the first motive force transmission state is assumed as the motive force transmission state in a case in which the sun gear 70 rotates forward in the first meshing state and the second motive force transmission state is assumed as the motive force transmission state in a case in which the sun gear 70 rotates in reverse in the first meshing state, and in which the third motive force transmission state is assumed as the motive force transmission state in a case in which the sun gear 70 rotates forward in the second meshing state and the fourth motive force transmission state is assumed as the motive force transmission state in a case in which the sun gear 70 rotates in reverse in the second meshing state.

According to this configuration, since it is possible to switch between the first, second, third, and fourth motive force transmission states, it is possible to form various motive force transmission states using the single drive motor 54.

The rotation direction of the sun gear 70 in the first motive force transmission state and the fourth motive force transmission state is a rotation direction in which the regulated portion 80*a* comes into contact with the first regulating portion 64*c* or the second regulating portion 64*e*, and the control unit 52 which controls the drive motor 54 switches the rotation direction of the drive motor 54 to the reverse direction in a case in which the regulating member 64 is displaced in a direction in which the operation allowance portion 64*d* passes through the position of the regulated portion 80*a* in at least one of the first motive force transmission state and the fourth motive force transmission state.

In the first motive force transmission state and the fourth motive force transmission state, since the regulated portion 80*a* pushes against the first regulating portion 64*c* or the second regulating portion 64*e*, when the regulating member 64 is displaced in this state, there is a concern that the regulated portion 80*a* will enter the operation allowance portion 64*d* and assume a locked state in this state or that the regulated portion 80*a* will leave the operation allowance portion 64*d* and be unintentionally switched to another motive force transmission state.

According to this configuration, since the control unit 52 which controls the drive motor 54 switches the rotation direction of the drive motor 54 to the reverse direction in a case in which the regulating member 64 is displaced in a direction in which the operation allowance portion 64*d* passes through the position of the regulated portion 80*a* in at least one of the first motive force transmission state and the fourth motive force transmission state, it is possible to reduce or lose the surface pressure.

The plurality of driving targets include the feed roller 34 which is provided on the upstream side of the transport roller pair 38 which transports the medium P to the recording position of the recording head 44 and transports the medium P toward the transport roller pair 38, the feed roller 34 is driven in a rotation direction which transports the medium P to the downstream side in at least the first motive force transmission state, and the control unit 52 is capable of performing bending control in which bending is formed in the medium P between the feed roller 34 and the transport roller pair 38 and in at least the first motive force transmission state, increases the reverse rotation driving amount, which is the driving amount when the drive motor 54 is caused to rotate in the reverse direction, as the degree of bending becomes greater.

When bending is formed in the medium P between the feed roller 34 and the transport roller pair 38, the torque increases and the surface pressure increases when driving the feed roller 34 and the reverse rotation driving amount (the surface pressure release necessary reverse rotation driving amount) A which is necessary for causing the surface pressure to be lost also increases.

Therefore, according to this configuration, since the reverse rotation driving amount C-1 is increased the greater the degree of the bending, the control unit 52 is capable of appropriately causing the surface pressure to be lost.

The control unit 52 increases the reverse rotation driving amount C-3 after the recording onto the medium P is completed to an amount greater than the reverse rotation driving amount C-1 during the performance of the recording onto the medium P. According to this configuration, it is possible to reliably cause the surface pressure to be lost. In addition, since the reverse rotation driving amount C-3 is increased after the recording onto the medium P is completed is increased, the recording quality is not adversely influenced.

The printer 10 is provided with the carriage drive motor 98 which is the drive source of the carriage 40, the control unit 52 monitors the drive load of the carriage drive motor 98 in a case in which the regulating member 64 is displaced in a direction in which the operation allowance portion 64*d* passes through the position of the regulated portion 80*a* by driving the carriage drive motor 98 in the first rotation direction to move the carriage 40, and in a case in which the drive load exceeds a predetermined threshold, a retry operation is performed once the carriage drive motor 98 is driven by a predetermined amount in the second rotation direction which is the reverse of the first rotation direction.

When the regulating member 64 is displaced by moving the carriage 40, there is a concern that when the regulated portion 80a enters the operation allowance portion 64d, the carriage 40 will be unable to move any further, enter a locked state, and it becomes impossible to perform further recording operations.

According to this configuration, the control unit 52 monitors the drive load of the carriage drive motor 98, and since the control unit 52 performs the retry operation in a case in which the drive load exceeds a predetermined threshold, a return to the ordinary state, that is, relief from the state in which the regulated portion 80a enters the operation allowance portion 64d and is locked can be anticipated.

The retry operation which is performed when in the first motive force transmission state includes an operation of causing the carriage drive motor 98 to rotate in reverse after the drive motor 54 is driven in a direction in which the motive force transmission state is switched to the third motive force transmission state.

When the drive motor 54 is caused to rotate in reverse from the state in which the regulated portion 80a enters the operation allowance portion 64d, there is a concern that the first motive force transmission state will be exceeded and the motive force transmission state will be switched to the second motive force transmission state. Such a situation is not preferable in a configuration in which the transporting of the medium P is adversely influenced when the motive force transmission state is switched from the first motive force transmission state to the second motive force transmission state during the recording. In a configuration in which the third motive force transmission state does not influence the transporting of the medium P, it is preferable to use the lack of influence of the third motive force transmission state on the transporting of the medium P.

Therefore, in a case in which the control unit 52 performs the retry operation and instead of causing the drive motor 54 to rotate in reverse right away, switches to the third motive force transmission state once and then causes the drive motor 54 to rotate in reverse. Once the motive force transmission state is switched to the third motive force transmission state once, it is possible to set the appropriate reverse rotation driving amount for causing the regulated portion 80a to leave the operation allowance portion 64d in an ordinary manner without switching to the second motive force transmission state. As a result, it is possible to appropriately perform the retry operation.

The printer 10 further includes the drive motor support frame 68 which supports the drive motor 54, and the drive motor support frame 68 is provided to be capable of rotating centered on the shaft 72 which supports the sun gear 70 such that the sun gear 70 is capable of rotating and is fixed due to the rotation which is centered on the shaft 72 being stopped by the fixing unit 74. According to this configuration, the positional relationship between the drive motor 54 and the sun gear 70 is stabilized. Therefore, in a configuration in which the drive gear 76 is provided in the drive motor 54 and the drive gear 76 is caused to mesh with the sun gear 70, the positional relationship between the drive gear 76 and the sun gear 70 is stabilized and so it is possible to obtain operational effects such as the capability to suppress unwanted sound during the rotation.

The drive motor 54 is positioned on the rear side with respect to the recording head 44 in the apparatus depth direction, is positioned closer to the top side than the head surface 44a of the recording head 44 in the apparatus height direction, and is positioned inside the passage region X1 on a medium of the maximum size in the apparatus width direction.

Regarding Configuration of Scanner Portion

Next, a description will be given of the relationship between the apparatus main body 12 and the scanner portion 14 in FIGS. 32 to 36. In FIG. 32, the scanner portion 14 is configured to be capable of rotationally moving with respect to the apparatus main body 12 to pivot on the rear side of the apparatus main body 12 and to be capable of switching between the closed state (FIG. 1) and the open state (FIG. 32).

A plurality of hinge portions 12a is provided on the rear side of the apparatus main body 12 in the apparatus depth direction leaving an interval between the hinge portions 12a in the apparatus width direction. A front top portion housing 122 is provided on the front side in the apparatus depth direction inside the apparatus main body 12. Two recessed portions 122a which are recessed to the bottom side in the apparatus height direction, for example, are formed in the front top portion housing 122.

In the apparatus main body 12, the main frame 62 is provided on the rear side in the apparatus depth direction of the front top portion housing 122, more specifically, on the rear side of the movement region of the carriage 40. An eaves portion 12b is provided between the front top portion housing 122 and the main frame 62 in the apparatus depth direction. The eaves portion 12b is provided to extend in the apparatus depth direction at the end portion of the right side and the end portion of the left side in the apparatus width direction of the apparatus main body 12.

Next, in FIGS. 34 and 35, two convex portions 14a are formed on the bottom surface of the front side (the free-end side) in the apparatus depth direction of the scanner portion 14 leaving an interval between the convex portions 14a in the apparatus width direction. A first receiving surface 14b is formed on the rear side of the convex portions 14a in the apparatus depth direction. On the rear side in the apparatus depth direction of the first receiving surface 14b, ribs 14c which extend in the apparatus depth direction on the end portion of the left side and the end portion of the right side in the apparatus width direction of the scanner portion 14.

Second receiving surfaces 14d are formed on the rear sides of the ribs 14c in the apparatus depth direction. On the end portion of the rear side in the apparatus depth direction of the scanner portion 14, a rotational movement shaft 14e (FIG. 34) is provided on the end portion of the left side in the apparatus width direction and a rotational movement shaft 14f (FIG. 35) is provided on the end portion of the right side in the apparatus width direction. The rotational movement shafts 14e and 14f are received by the corresponding hinge portions 12a of the rear side in the apparatus depth direction of the apparatus main body 12.

FIG. 36 illustrates a state in which the scanner portion 14 is closed with respect to the apparatus main body 12. In the closed state, the convex portions 14a of the scanner portion 14 are received by the recessed portions 122a of the front top portion housing 122 of the apparatus main body 12. In this state, the convex portions 14a come into contact with the recessed portions 122a and are supported by the recessed portions 122a. In a state in which the scanner portion 14 is closed with respect to the apparatus main body 12, the scanner portion 14 is supported by the four points of the convex portions 14a which are in contact with the recessed portions 122a and the rotational movement shafts 14e and 14f which are supported by the hinge portions 12a.

Meanwhile, in this state, the front top portion housing 122 and the first receiving surface 14b are in a state of facing each other with a predetermined interval left therebetween. The ribs 14c and the eaves portion 12b of the apparatus main body 12 are in a state of facing each other with a predetermined space left therebetween. Additionally, the second receiving surfaces 14d and the main frame 62 are in a state of facing each other with a predetermined interval left therebetween.

Here, in a case in which a pressing force from the top side in the apparatus height direction acts on the scanner portion 14, in a state in which the scanner portion 14 is supported by only the convex portions 14a and the rotational movement shafts 14e and 14f, the scanner portion 14 assumes a state in which both end support beams are bent in the apparatus depth direction. As a result, the scanner portion 14 assumes a state of being bent to the bottom side by the pressing force. When this bending amount is great, there is a case in which the document placement surface 14g which is formed of a flat glass plate is damaged.

In the present example, in a case in which a pressing force greater than or equal to a predetermined magnitude acts on the scanner portion 14, the scanner portion 14 bends. As a result, the first receiving surface 14b comes into contact with the front top portion housing 122 and is supported by the front top portion housing 122. Similarly, the ribs 14c also come into contact with the eaves portion 12b of the apparatus main body 12 and are supported by the eaves portion 12b. Additionally, the second receiving surfaces 14d also come into contact with the main frame 62 and are supported by the main frame 62. As a result, since the scanner portion 14 is supported by multiple points with respect to the apparatus main body 12, it is possible to reduce the bending amount of the scanner portion 14 and it is possible to suppress or to prevent the damage to the document placement surface 14g.

In the present embodiment, the switching mechanism 56 according to the invention is applied to an ink jet printer which serves as an example of the recording apparatus; however, it is also possible to apply the switching mechanism 56 to other liquid ejecting apparatuses in general.

Here, liquid ejecting apparatuses are not limited to recording apparatuses such as printers, photocopiers, and facsimiles in which an ink jet recording head is used and discharge ink from the recording head to perform recording on a recording medium, and also include apparatuses which eject, instead of the ink, a liquid corresponding to the use of the apparatus onto an ejection target medium corresponding to a recording medium from a liquid ejecting head corresponding to the ink jet recording head to cause the liquid to adhere to the ejection target medium.

In addition to the recording head, examples of the liquid ejecting head include a color material ejecting head which is used in the manufacture of color filters of liquid crystal displays and the like, an electrode material (conducting paste) ejecting head which is used in electrode formation of an organic EL display, a face emission display (FED), or the like, a bio-organic matter ejecting head which is used in the manufacture of bio chips, and a sample ejecting head which serves as a precision pipette.

The invention is not limited to the examples and may be modified in various ways within the scope of the invention described in the claims, and the modifications should be construed as being included in the invention.

The entire disclosure of Japanese Patent Application No. 2017-035196, filed Feb. 27, 2017, and No. 2017-155674, filed Aug. 10, 2017, is expressly incorporated by reference herein.

What is claimed is:

1. A recording apparatus comprising:
   a carriage which includes a recording head that performs recording on a medium and which moves in a first direction and a second direction that is an opposite direction from the first direction;
   a motive force source which is shared by a plurality of driving targets; and
   a switching mechanism which switches a motive force transmission state from the motive force source,
   wherein the switching mechanism includes
      a sun gear which is driven by the motive force source,
      a planet gear which is driven by the sun gear,
      a rotational movement member which causes the planet gear to perform planetary motion, and
      a regulating member which engages with a regulated portion which is provided in the rotational movement member to regulate rotational movement of the rotational movement member and is capable of moving in the first direction and the second direction,
   wherein the regulating member includes, in order from the first direction side toward the second direction side
      a first regulating portion which is capable of engaging with the regulated portion,
      an operation allowance portion which allows an operation of the regulated portion, and
      a second regulating portion which is capable of engaging with the regulated portion,
   wherein the carriage is provided to be capable of engaging with the regulating member and displaces the regulating member according to movement of the carriage,
   wherein the regulating member is positioned at a first position at which the second regulating portion is capable of engaging with the regulated portion when the carriage is positioned at an end portion of the first direction which is a standby position of the carriage, and, as the carriage moves from the end portion of the first direction to the second direction, is displaced in order of a second position at which the operation allowance portion is capable of receiving the regulated portion and a third position at which the first regulating portion is capable of engaging with the regulated portion,
   wherein in a case in which the regulating member is at the third position, based on a rotation direction of the sun gear, for the motive force transmission state, a first motive force transmission state or a second motive force transmission state is assumed, and
   wherein in a case in which the regulating member is at the first position, based on the rotation direction of the sun gear, for the motive force transmission state, a third motive force transmission state or a fourth motive force transmission state is assumed.

2. The recording apparatus according to claim 1, further comprising:
   a biasing unit which biases the regulating member in the second direction.

3. The recording apparatus according to claim 1, further comprising:
   a first planet gear and a second planet gear as the planet gears; and a first meshed gear which meshes with the first planet gear to obtain motive force and a second meshed gear which meshes with the second planet gear to obtain motive force, wherein switching between a first meshing state in which the first planet gear meshes with the first meshed gear and a second meshing state in which the second planet gear meshes with the second meshed gear due to rotational movement of the rotational movement member is possible, wherein the first motive force transmission state is assumed in a case in which the sun gear rotates forward in the first meshing state and the second motive force transmission state is assumed in a case in which the sun gear rotates in reverse in the first meshing state, and wherein the third motive force transmission state is assumed in a case in which the sun gear rotates forward in the second meshing state and the fourth motive force transmission state is assumed in a case in which the sun gear rotates in reverse in the second meshing state.

4. The recording apparatus according to claim 3, wherein the rotation direction of the sun gear in the first motive force transmission state and the fourth motive force transmission state is a rotation direction in which the regulated portion comes into contact with the first regulating portion or the second regulating portion, and wherein a controller which controls the motive force source switches the rotation direction of the motive force source to a reverse direction in a case in which the regulating member is displaced in a direction in which the operation allowance portion passes through a position of the regulated portion in at least one of the first motive force transmission state and the fourth motive force transmission state.

5. The recording apparatus according to claim 4, wherein the plurality of driving targets include an intermediate roller which is provided on an upstream side of a transport roller which transports the medium to a recording position of the recording head and transports the medium toward the transport roller, wherein the intermediate roller is driven in a rotation direction which transports the medium to a downstream side in at least the first motive force transmission state, and wherein the controller is capable of performing bending control in which bending is formed in the medium between the intermediate roller and the transport roller and in at least the first motive force transmission state, increases a reverse rotation driving amount, which is a driving amount when the motive force source is caused to rotate in the reverse direction, as the degree of bending becomes greater.

6. The recording apparatus according to claim 5, wherein the controller increases the reverse rotation driving amount after recording onto the medium is completed to an amount greater than the reverse rotation driving amount during performance of the recording onto the medium.

7. The recording apparatus according to claim 5, further comprising:

a carriage drive motor which is a drive source of the carriage, wherein the controller monitors a drive load of the carriage drive motor in a case in which the regulating member is displaced in a direction in which the operation allowance portion passes through a position of the regulated portion by driving the carriage drive motor in a first rotation direction to move the carriage, and wherein in a case in which the drive load exceeds a predetermined threshold, a retry operation is performed once the carriage drive motor is driven by a predetermined amount in a second rotation direction which is the reverse of the first rotation direction.

8. The recording apparatus according to claim 7, wherein the retry operation which is performed when in the first motive force transmission state includes an operation of causing the motive force source to rotate in reverse after the drive source is driven in a direction in which the motive force transmission state is switched to the third motive force transmission state.

9. The recording apparatus according to claim 1, further comprising:

a frame which supports the motive force source, wherein the frame is provided to be capable of rotating centered on a shaft which supports the sun gear such that the sun gear is capable of rotating and is fixed due to the rotation which is centered on the shaft being stopped by a fixing unit.

10. The recording apparatus according to claim 1, wherein the motive force source is positioned on a rear side with respect to the recording head in the apparatus depth direction, is positioned closer to a top side than the head surface of the recording head in the apparatus height direction, and is positioned inside a passage region on a medium of a maximum size in the apparatus width direction.

* * * * *